(12) United States Patent
Lipton et al.

(10) Patent No.: US 10,850,406 B2
(45) Date of Patent: Dec. 1, 2020

(54) NON-PLANAR SHEARING AUXETIC STRUCTURES, DEVICES, AND METHODS

(71) Applicant: Massachusetts Institute of Technology, Cambridge, MA (US)

(72) Inventors: Jeffrey Ian Lipton, Medford, MA (US); Robert MacCurdy, Belchertown, MA (US); Lillian Chin, Cambridge, MA (US); Daniela Rus, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 174 days.

(21) Appl. No.: 15/965,711

(22) Filed: Apr. 27, 2018

(65) Prior Publication Data

US 2018/0311833 A1 Nov. 1, 2018

Related U.S. Application Data

(60) Provisional application No. 62/630,739, filed on Feb. 14, 2018, provisional application No. 62/491,089, filed on Apr. 27, 2017.

(51) Int. Cl.
*B25J 15/12* (2006.01)

(52) U.S. Cl.
CPC .............. *B25J 15/12* (2013.01); *Y10S 901/32* (2013.01)

(58) Field of Classification Search
CPC ... B25J 7/00; B25J 15/02; B25J 15/024; B25J 15/08; B25J 15/10; B25J 15/12; Y10S 901/32; Y10S 901/36

(Continued)

(56) References Cited

U.S. PATENT DOCUMENTS 8,302,696 B2 * 11/2012 Williams ................ E21B 41/00
166/207
8,652,602 B1 2/2014 Dolla
(Continued)

OTHER PUBLICATIONS

Chin, et al., "Compliant Electric Actuators Based on Handed Shearing Auxetics.", 2018 IEEE International Conference on Soft Robotics (RoboSoft), Jul. 9, 2018.
(Continued)

*Primary Examiner* — Dean J Kramer
(74) *Attorney, Agent, or Firm* — Nutter McClennen & Fish LLP

(57) ABSTRACT

Non-planar shearing auxetic structures, devices, and methods are provided herein. In some embodiments, a non-planar shearing auxetic structure can include a mathematically compact surface with an auxetic pattern of repeating unit cells. The shearing auxetic structure can have a contracted configuration and an expanded configuration, and, when in the compact configuration, can be configured to move to the expanded configuration while generating a net shear on the surface. Shearing auxetic structures can have handedness and, in some embodiments, multiple handed shearing auxetic structures can be joined to create rigid or semi-rigid composite structures, e.g., by arranging differently-handed structures concentrically wherein two or more structures lock against each other. Handed shearing auxetic structures can also provide actuators to convert rotation or other motion to translation, volume expansion, bending, twisting, etc. These structures have many applications, e.g., deployable structures such as pressure vessels, space habitats, fluid carrying vessels, soft robotics, toys, etc.

53 Claims, 42 Drawing Sheets

(58) Field of Classification Search
USPC .................................. 294/192, 213, 86.42
See application file for complete search history.

(56) References Cited

U.S. PATENT DOCUMENTS

| | | | |
|---|---|---|---|
| 9,376,796 B2* | 6/2016 | Ma | E04B 1/1903 |
| 9,492,930 B2* | 11/2016 | Galloway | B25J 15/0023 |
| 2013/0298759 A1* | 11/2013 | Rotinat-Libersa | B25J 9/06 |
| | | | 92/90 |
| 2013/0344601 A1* | 12/2013 | Soman | A61L 27/14 |
| | | | 435/396 |
| 2015/0345479 A1* | 12/2015 | Mark | F03G 3/00 |
| | | | 74/126 |
| 2016/0361821 A1* | 12/2016 | Lessing | B25J 15/12 |
| 2017/0129110 A1* | 5/2017 | Ohm | B25J 9/1045 |
| 2018/0194106 A1* | 7/2018 | Tibbits | B32B 1/00 |

OTHER PUBLICATIONS

Felt, W et al., "A Closed-Form Kinematic Model for Fiber-Reinforced Elastomeric Enclosures.", Journal of Mechanisms and Robotics, vol. 10, Issue 1, Feb. 2018.
Grima, JN et al., "Auxetic behaviour from connected different-sized squares and rectangles.", Proceedings of the Royal Society, vol. 467, Issue 2126, pp. 439-458, Aug. 4, 2010.
Grima, JN et al., "On the auxetic properties of generic rotating rigid triangles.", Proceedings of the Royal Society, vol. 468, Issue 2139, pp. 810-830, Nov. 18, 2011.
Lipton, et al., "Handedness in Shearing Auxetics Creates Rigid and Compliant Structures.", Science, vol. 360, Issue 6389, pp. 632-635, May 11, 2018.

* cited by examiner

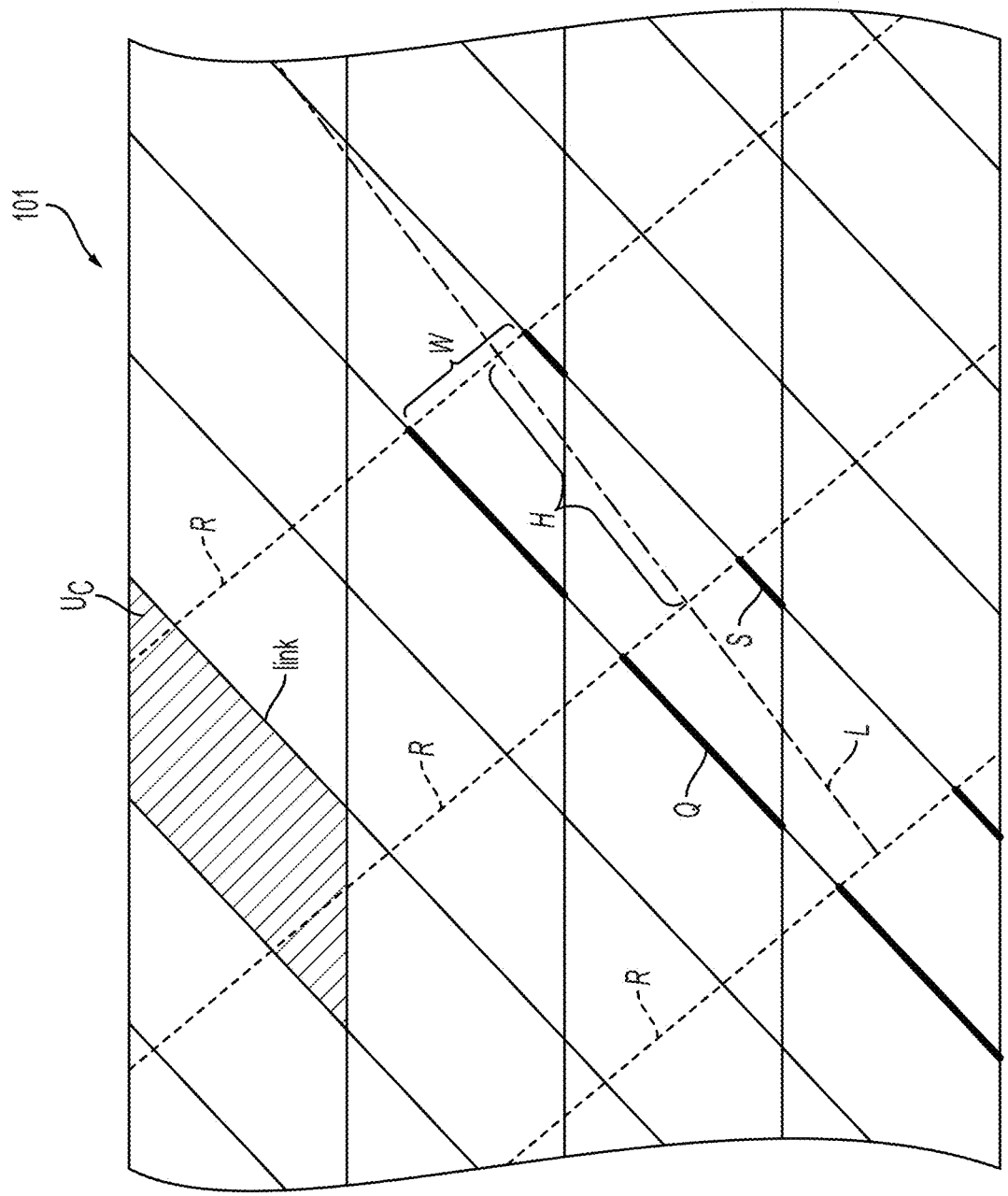

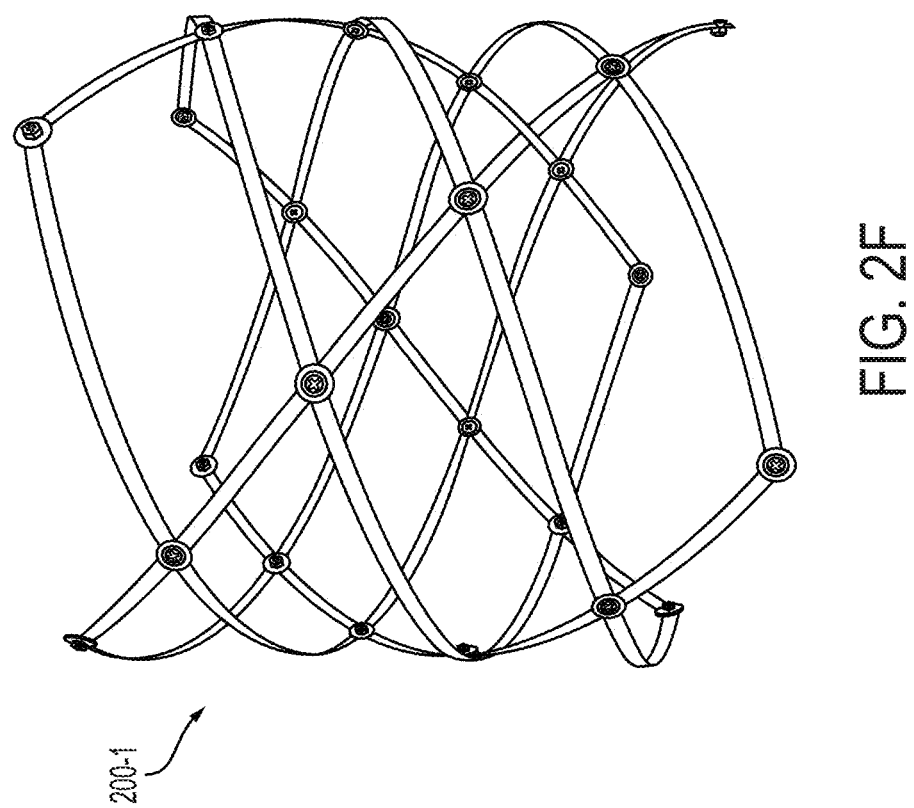

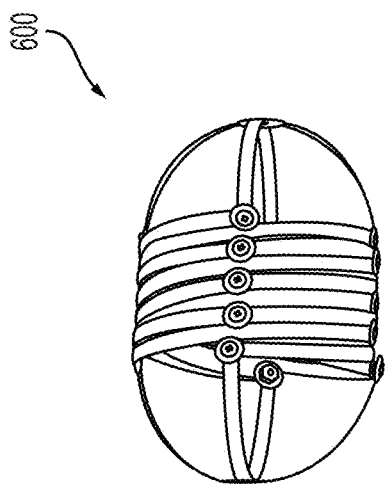
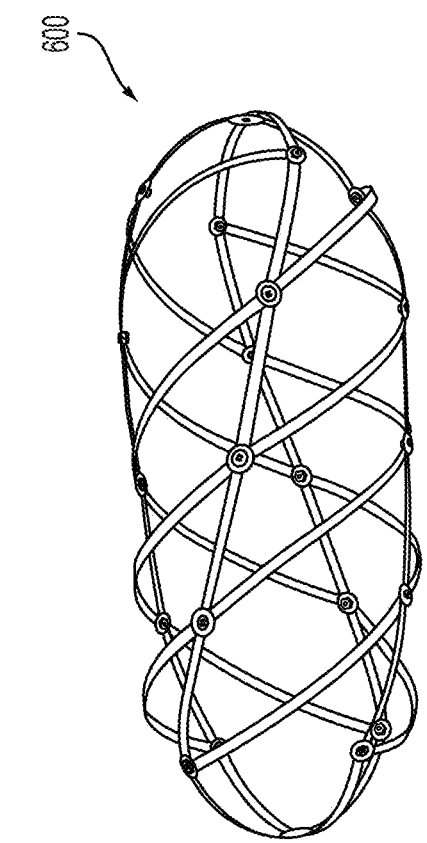
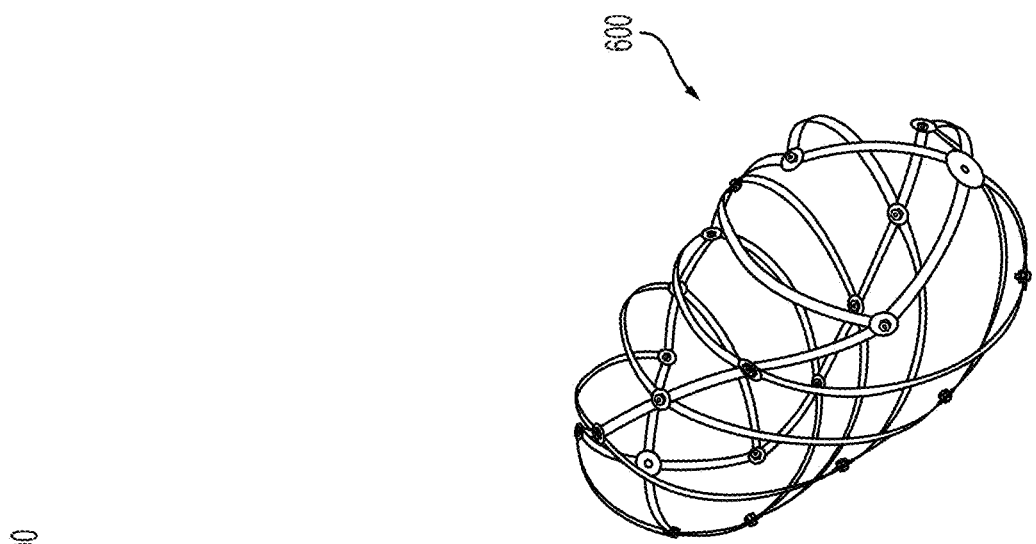
FIG. 6A
FIG. 6B
FIG. 6C

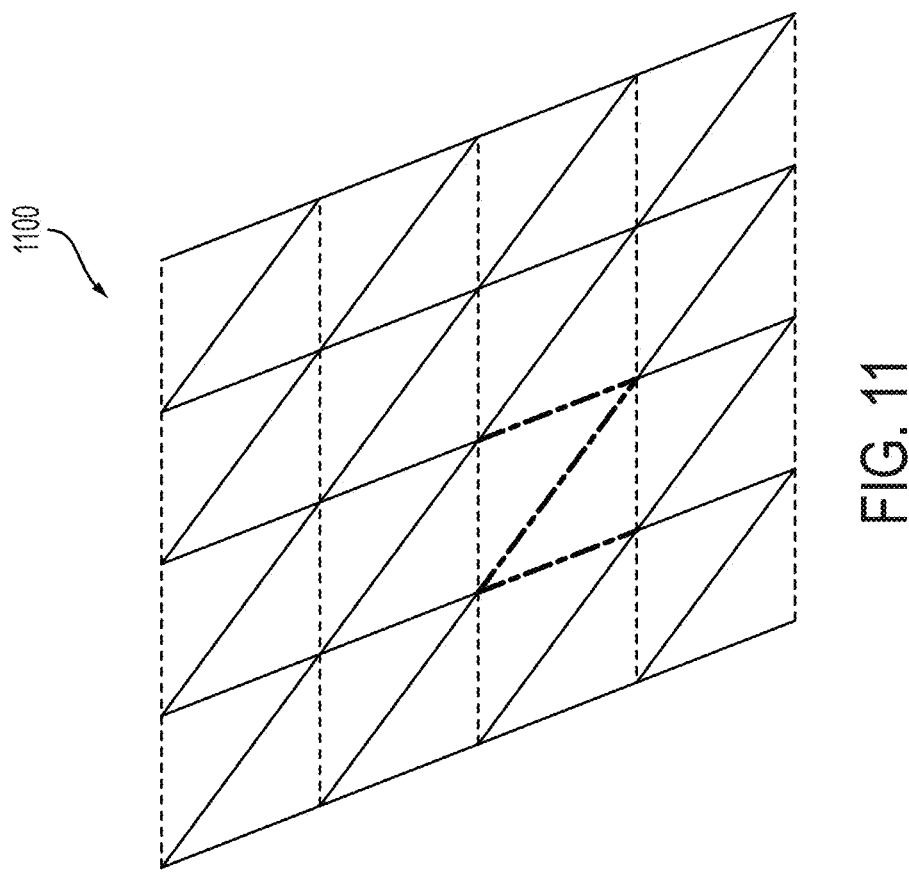

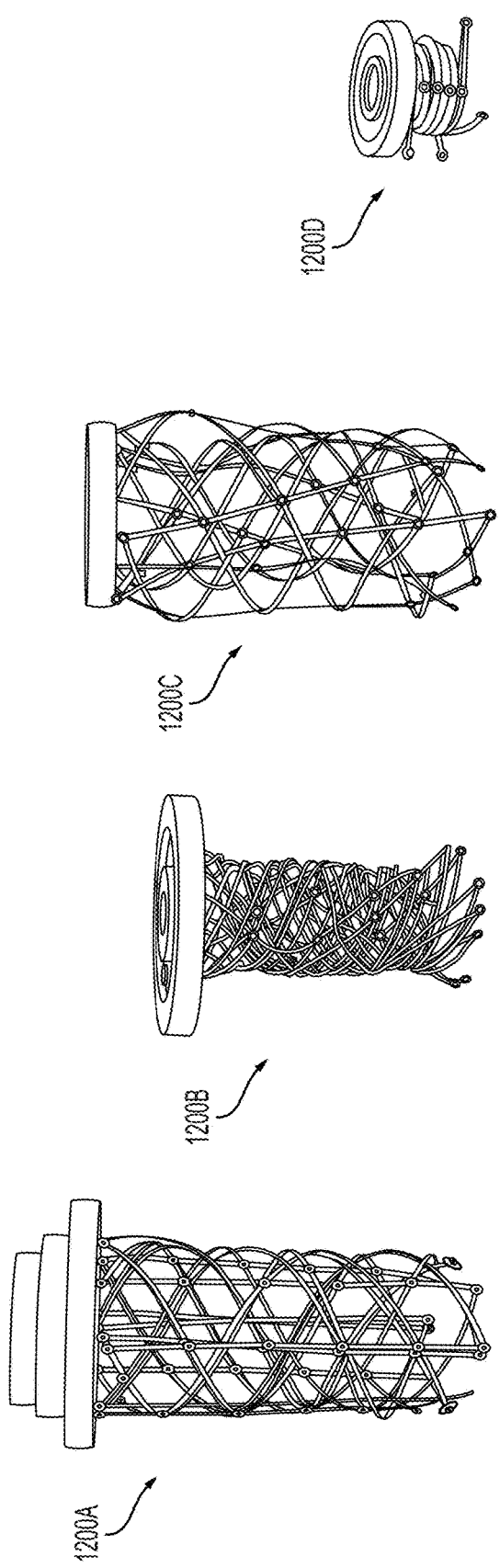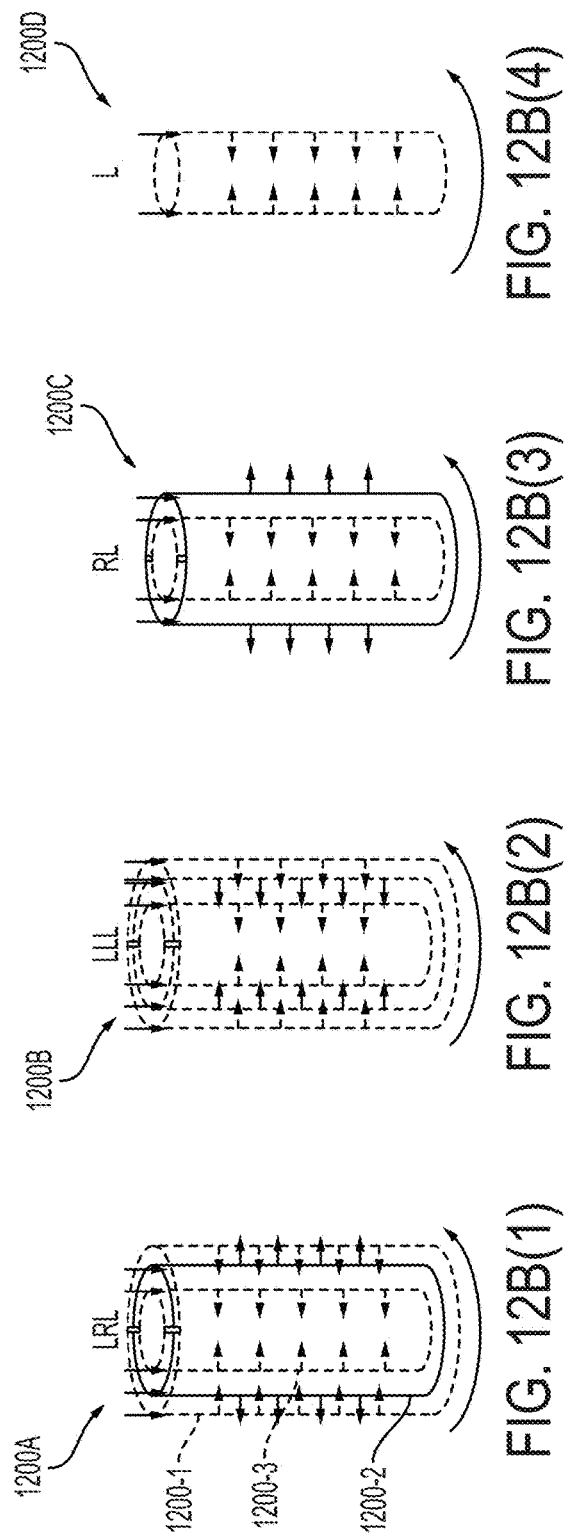

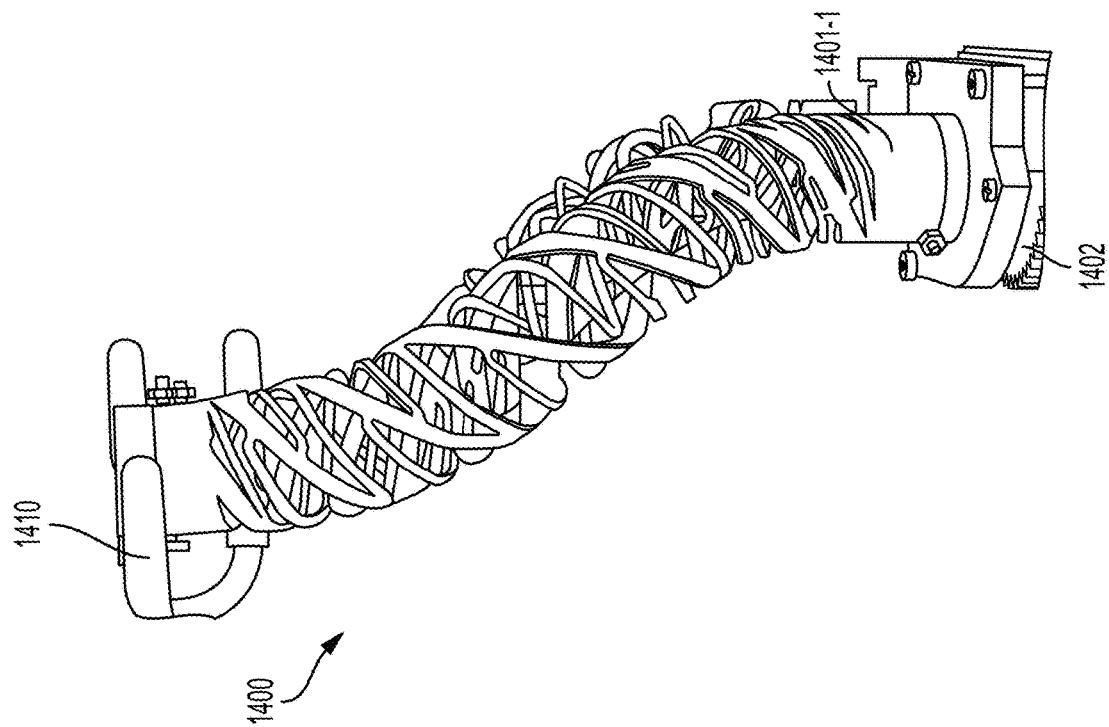
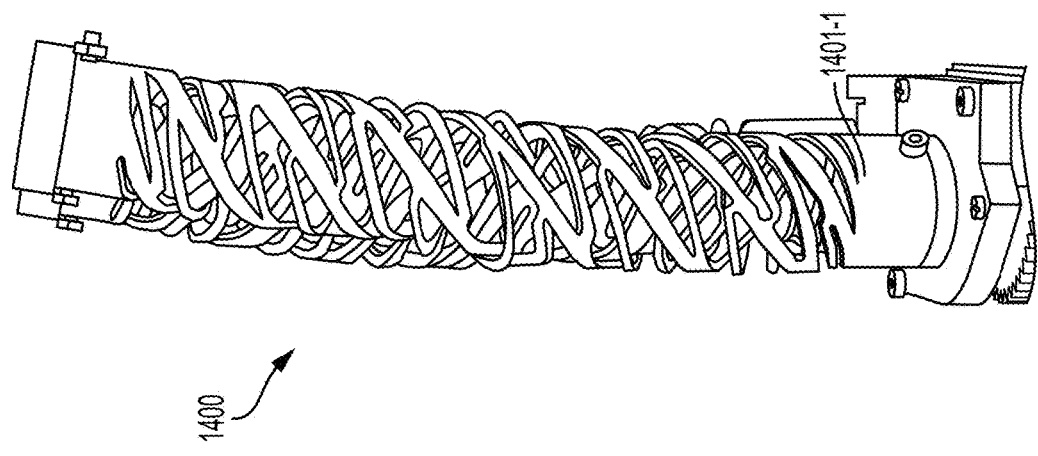
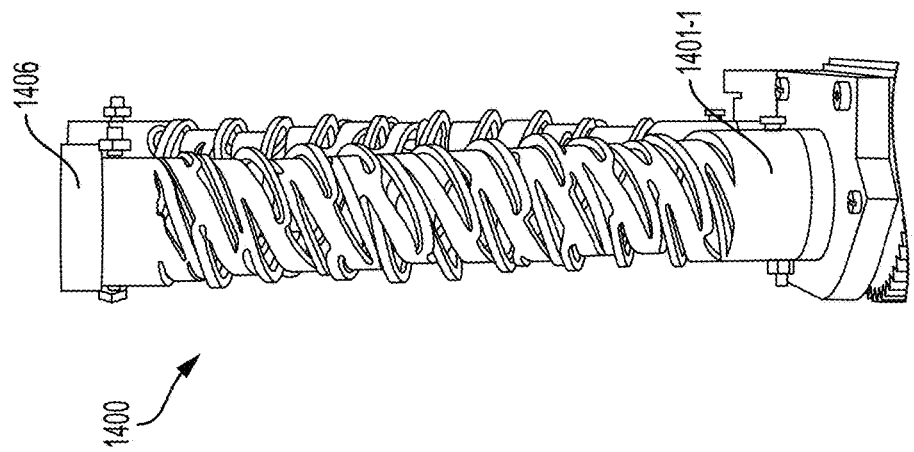
FIG. 14E
FIG. 14F
FIG. 14G

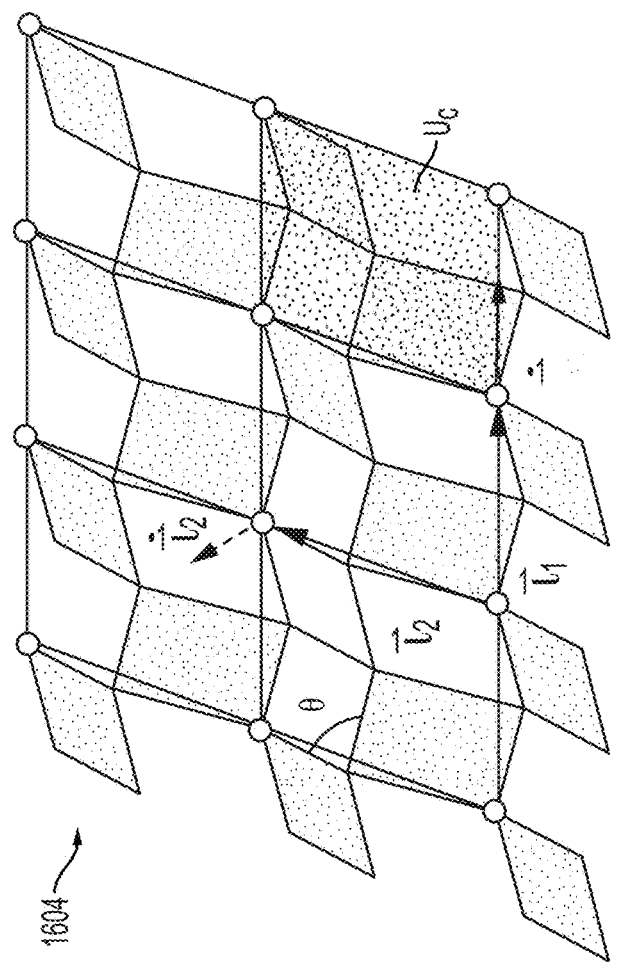
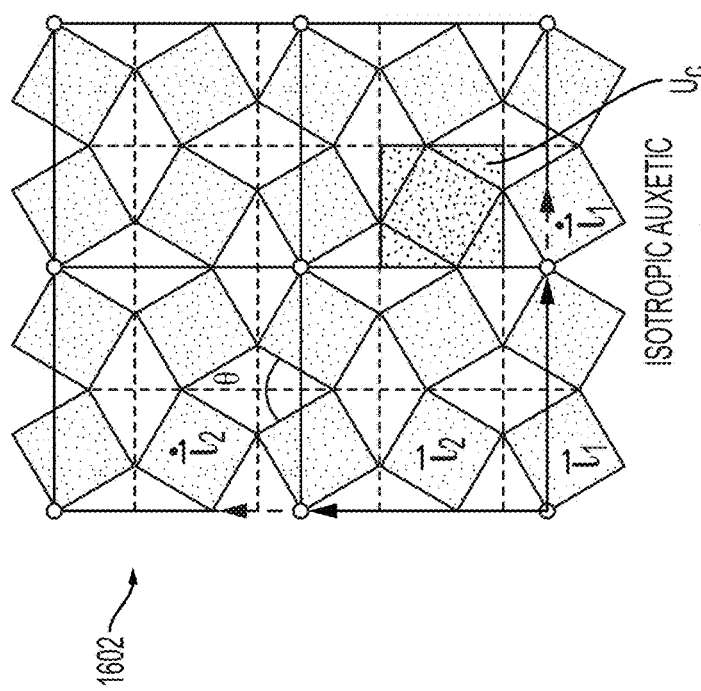

| $\overline{S}_a$ | $\overline{S}_m$ | $\overline{A}_n$ | $\overline{B}_o$ | $\overline{E}_p$ |
|---|---|---|---|---|
| | $\overline{S}_{a+m}$ | $\overline{A}_{a+n}$ | $\overline{B}_{a-o}$ | $\overline{E}_{a-p}$ |
| $\overline{A}_b$ | $\overline{A}_{b+m}$ | $\overline{S}_{b+n}$ | $\overline{E}_{b-o}$ | $\overline{B}_{b-p}$ |
| $\overline{B}_c$ | $\overline{B}_{c+m}$ | $\overline{E}_{c+n}$ | $\overline{S}_{c-o}$ | $\overline{A}_{c-p}$ |
| $\overline{E}_d$ | $\overline{E}_{d+m}$ | $\overline{B}_{d+n}$ | $\overline{A}_{d-o}$ | $\overline{S}_{c-p}$ |

FIG. 17

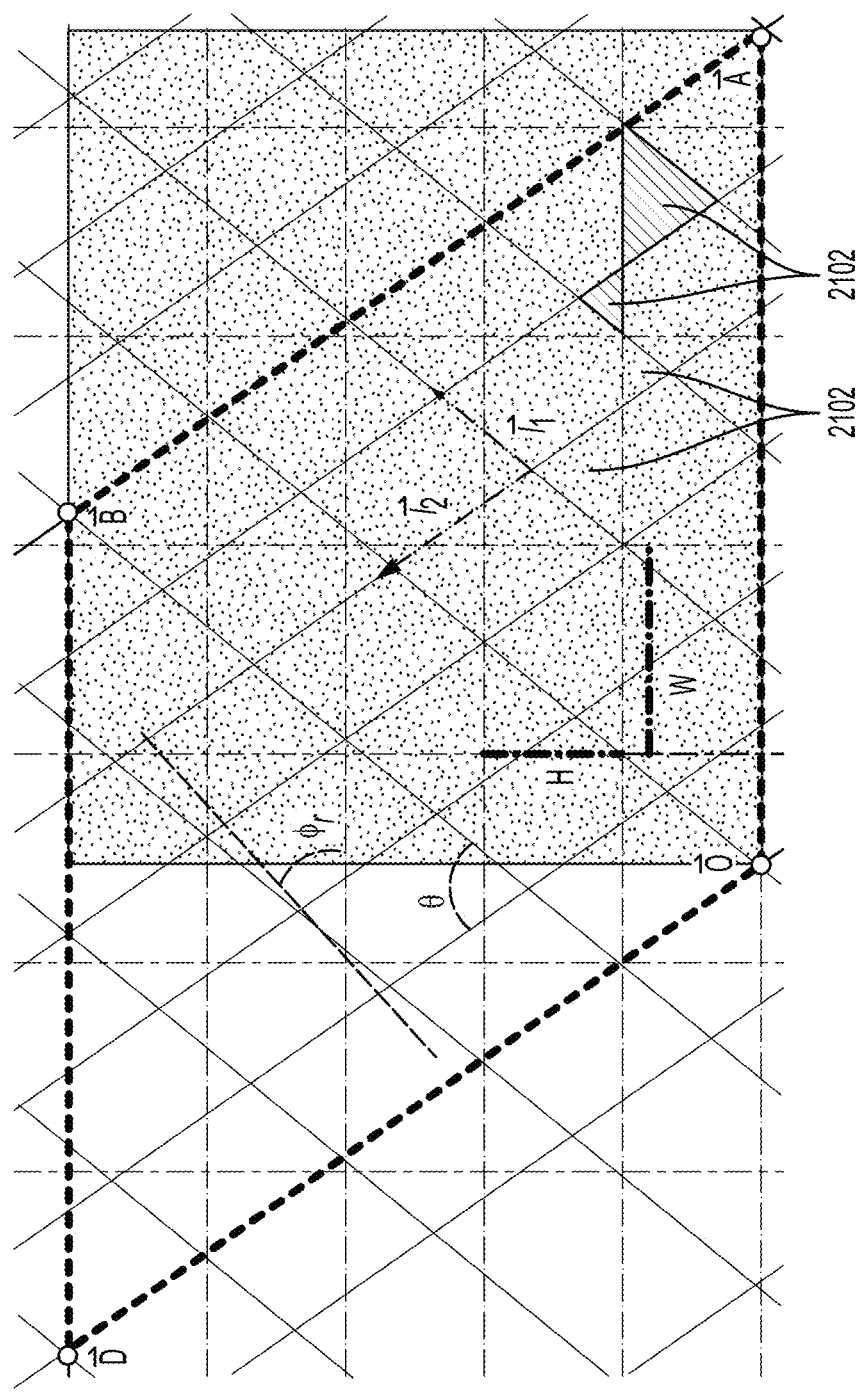

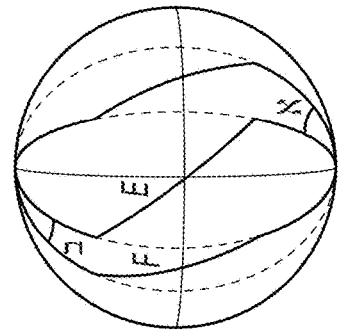
FIG. 23C
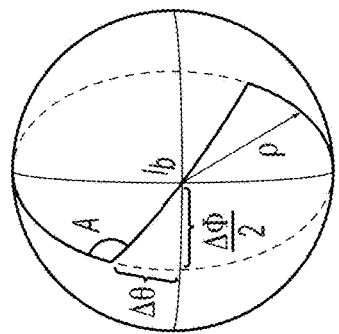
FIG. 23B
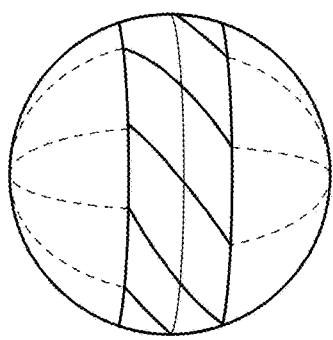
FIG. 23A
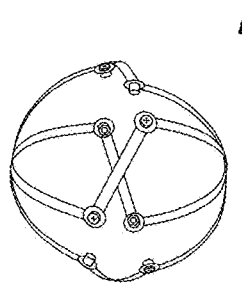
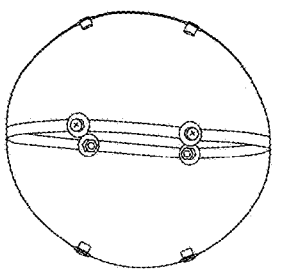
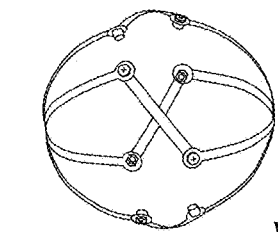
FIG. 23D
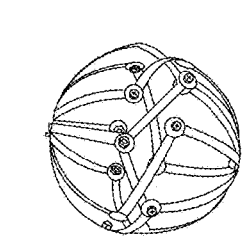
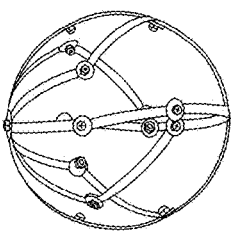
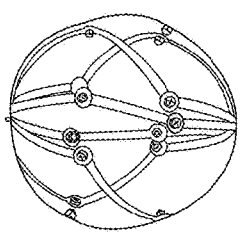
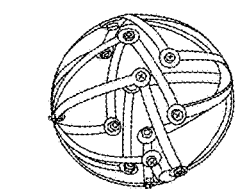
FIG. 23E

NON-PLANAR SHEARING AUXETIC STRUCTURES, DEVICES, AND METHODS

CROSS REFERENCE TO RELATED APPLICATIONS

This application claims priority to and the benefit of U.S. Provisional Application No. 62/491,089, filed on Apr. 27, 2017, and titled "Devices and Methods Having Non-Planar Directional Shearing Auxetic Cells," and 62/630,739, filed on Feb. 14, 2018, and titled "Compliant Actuators Using Handed Shearing Auxetics." The entire contents of each of these applications is incorporated herein by reference.

GOVERNMENT RIGHTS

This invention was made with Government support under Grant Nos. EFRI-1240383 and CCF-1138967 awarded by the National Science Foundation (NSF). The Government has certain rights in the invention.

FIELD

The present disclosure relates to auxetic structures and, more specifically, to non-planar shearing auxetic structures, devices, and methods.

BACKGROUND

Auxetic materials can increase in area when a strain is applied thereto. Auxetic materials are traditionally modeled as a network of unit cells formed of elements pivotally coupled to one another. These unit cells are arranged or tiled according to a periodic pattern to form a two-dimensional surface that can itself form an auxetic structure. The symmetry of the unit cells in the auxetic pattern dictates the mechanics of the auxetic material and structure. Moreover, the movement of the elements of a single unit cell and of the auxetic pattern as a whole are driven by the internal angle between two elements in the unit cells. As the angle between the two elements varies, the areas of all of the unit cells expand or contract.

Conventional auxetic structures are either isotropic or anisotropic. Isotropic auxetic structures can be characterized by a Poisson ratio of −1 and can expand uniformly in a direction perpendicular to the direction of applied tension. Anisotropic auxetic structures can be characterized by a Poisson ratio less than zero but greater than −1 and do not expand uniformly in response to tension. Conventional auxetics deform in a predefined manner dictated by the design of the unit cells, the symmetries of the tilings of the unit cells, and the internal angles of their elements. This means that the rigidity or stiffness of conventional auxetics, and the energy required to deform elements or joints of the auxetic structure, are likewise predefined. Conventional auxetics and auxetic structures are therefore limited in that they cannot switch or interchange between being rigid and compliant. The individual unit cells of the structure may shear locally, but the symmetries of the tiling can result in no net, or global, shearing of the structure.

Shearing auxetic structures are another kind of auxetic structure having a Poisson ratio below zero and where the area of each of the unit cells expands or contracts as each of the unit cells shears, producing a net shear. Shearing auxetics can expand at different rates and in different directions while shearing.

Shearing auxetic structures can experience both local and global, or net, shear. For example, there are structures where the unit cells shear as they expand but the net structure does not experience any shear. Such a structure can be said to have local but not global, or net, shearing. For example, a structure can experience counterbalanced local shearing that results in no net shearing of the structure (e.g., the oppositely-twisting poles of the Hoberman Twist-O toy). In net shearing structures, each unit cell shears while expanding or contracting and they predominantly shear in the same direction.

Shearing auxetic structures can be handed or unhanded. Unhanded shearing auxetic structures can be expanded using either of opposed shear forces, depending on their internal angles between elements. In unhanded shearing auxetic structures, further application of force beyond a maximum auxetic extension causes the unit cells to contract. Handed shearing auxetic structures expand in response to shear force in a first direction and contract in response to an oppositely directed shear force. And deformation beyond a maximum auxetic extension causes the unit cells to cease being auxetic.

Auxetic structures can also be distinguished by the nature of the structure itself as either planar or non-planar. Prior work has focused on shearing auxetic tiling patterns for planar surfaces. Such surfaces have zero Gaussian curvature, are not compact, and have no curvature in any direction. Accordingly, there is a need to develop shearing auxetics that can be tiled over non-planar surfaces, including surfaces that are mathematically compact in at least one direction, such as spheres, spheroids, cylinders, capsules, and combinations thereof.

Development of such structures could address a number of shortcomings in various fields. For example, in a number of fields requiring deployable structures, such as aerospace, robotics, oil industry, architectural fields such as construction and tunneling, and even novelty toys, conventional structures often utilize separate locking mechanisms or three-dimensional truss structures to make a deployable curved structure rigid, e.g., after expansion from a compact to a deployed state. There is a need for improved structures that can be thinner and easier to transport and deploy. Other fields can benefit from shearing auxetic non-planar structures as well. For example, the development of such structures could find use in robotics to address shortcomings in actuators and other components. For example, conventional soft robotic applications often employ pneumatic, hydraulic, or cable-driven actuators that can be complex and expensive.

SUMMARY

The present disclosure provides in some embodiments curved or non-planar shearing auxetic structures, i.e., shearing auxetic patterns that can tile a surface that is mathematically compact in at least one direction, such as a sphere, spheroid, cylinder, capsule, or other non-planar shape. Embodiments of such shearing auxetic structures having a net handedness, e.g., that expand only in response to net shear in one direction, can be utilized to create self-locking deployable structures, e.g., for use as pressure vessels, etc. These structures can also be utilized to create actuators having varying degrees of freedom that can convert rotation, e.g., from a rotary driver such as an electric motor, into translation, bending, twisting, volume expansion, etc.

In one aspect, a non-planar shearing auxetic structure is provided that can include a surface that is mathematically compact in at least one direction. The surface can include a plurality of repeating unit cells arranged according to an auxetic pattern and each unit cell can be defined by a plurality of elements and by an internal angle between two of the plurality of elements that are connected together by a pivot joint. Further, the plurality of unit cells can be connected to one another by pivot joints. The shearing auxetic structure can have a first contracted configuration and a second expanded configuration and the shearing auxetic structure, when in the first compact configuration, can be configured to move to the second expanded configuration while generating a net shear on the surface.

The structures, devices, and methods described herein can have a number of additional features and/or variations, all of which are within the scope of the present disclosure. In some embodiments, for example, the shearing auxetic structure can be formed from a continuous material and the pivot joints connecting the plurality of elements can be living hinges. In other embodiments, the plurality of elements can be discrete components connected together by a mechanical pivot joint. The plurality of elements can be formed from a variety of materials and, in some embodiments, the plurality of elements can be formed of a material that can flex perpendicularly to the surface of the structure as the structure expands or contracts, but does not extend in length. Further, the plurality of elements can have a variety of forms, including links, polygons, curves, etc. Still further, in various embodiments, the surface can have any of a variety of shapes. For example, the surface can have a shape of any of a cylinder, a sphere, a spheroid, a capsule, and combinations thereof in certain embodiments.

In some embodiments, the auxetic structure can have a handedness such that it is biased to move to the second expanded configuration only when net shearing to one of the right or the left. Moreover, in some embodiments, the shape of the shearing auxetic structure can be any of a sphere and a spheroid, the auxetic pattern can be unhanded, at least one of the plurality of elements can constrain the shearing auxetic structure to any of a marginally-stable and a bi-stable configuration. In certain embodiments, the at least one of the plurality of elements that constrains the shearing auxetic structure can move off the surface as the structure moves between the first and second configurations. In various embodiments, the handedness of the shearing auxetic structure can be imparted in a variety of manners. For example, in some embodiments the auxetic pattern can be handed and impart the handedness on the shearing auxetic structure. In other embodiments, the auxetic pattern can be unhanded and aligned over the surface in a manner that imparts the handedness on the shearing auxetic structure. In still other embodiments, the auxetic pattern can be unhanded and one of the plurality of elements can limit movement to impart the handedness on the shearing auxetic structure.

Moreover, in some embodiments the structure can be biased to the first compact configuration or the second expanded configuration. Beyond the structure as a whole, in various embodiments the unit cells can have a variety of shapes. For example, in some embodiments, each of the plurality of unit cells can have a polygon shape. Further, in certain embodiments, the shearing auxetic structure can further include a second shearing auxetic structure having a same handedness as the shearing auxetic structure.

In some embodiments, the structure can further include a lining coupled to any of the plurality of elements and pivot joints. For example, the lining can be disposed on an exterior side of the plurality of elements and pivot joints in certain embodiments, but can be disposed on an interior side of the plurality of elements and pivot joints in some embodiments. The lining can, in some embodiments, be elastic.

In another aspect, a composite structure is provided that can include a plurality of differently-handed shearing auxetic structures that each form a non-planar shape. Each shearing auxetic structure can include a plurality of handed tiles repeating over a surface of the respective non-planar shape. The plurality of handed tiles can each include a plurality of elements connected together with a pivot joint, and the plurality of handed tiles can be connected to one another by pivot joints. Further, the plurality of differently-handed shearing auxetic structures can lock against one another to form a semi-rigid or rigid structure.

As with the system described above, a number of variations and additional features are possible. For example, in some embodiments the plurality of differently-handed shearing auxetic structures can include two structures that form a semi-rigid structure that is self-supporting and compliant. In other embodiments, the plurality of handed shearing auxetic structures can include three concentrically-disposed structures and the middle structure can have a different handedness from the other two structures.

In certain embodiments, the plurality of differently-handed shearing auxetic structures can be disposed adjacent to one another. In some embodiments, the plurality of differently-handed shearing auxetic structures can be concentrically disposed relative to one another. Further, in some embodiments, a handedness of each of the plurality of differently-handed shearing auxetic structures along a concentric sequence can be different, such that the handedness of adjacent handed shearing auxetic structures is the opposite of one another.

The shearing auxetic structures can be assembled in a variety of manners. In some embodiments, for example, the plurality of differently-handed shearing auxetic structures can each be formed from a continuous material and the pivot joints connecting the plurality of elements can be living hinges. In other embodiments, the plurality of elements can be discrete components connected together by a mechanical pivot joint. Moreover, the structures can have any of a variety of non-planar shapes. In some embodiments for example, the non-planar shape can be any of a cylinder, a sphere, a spheroid, a capsule, and combinations thereof.

In some embodiments, the composite structure can further include a lining coupled to at least one of the plurality of shearing auxetic structures. For example, the lining can be disposed around the plurality of shearing auxetic structures in certain embodiments, but can be disposed within the plurality of shearing auxetic structures in some embodiments. In certain embodiments, the lining can be disposed between two of the plurality of shearing auxetic structures. Further, the lining can be elastic in some embodiments.

In another aspect, an actuator is provided that can include at least one pair of shearing auxetic structures, wherein the at least one pair includes at least one structure that shears toward the left and one structure that shears toward the right. For example, the at least one pair can include handed or unhanded shearing auxetic structures configured to shear to the left or to the right. The actuator further includes at least one rotary driver coupled to first ends of each structure in the at least one pair of shearing auxetic structures. Further, second ends of each structure in the at least one pair of shearing auxetic structures can be rigidly coupled to one another, and the at least one rotary driver can transfer opposing torques onto each structure in the at least one pair of shearing auxetic structures.

In some embodiments, the at least one rotary driver can include a plurality of rotary drivers and each rotary driver can be coupled to one shearing auxetic structure. In such embodiments, for example, there can be rotary driver for each shearing auxetic structure and they can, for example, be configured to counter-rotate relative to one another. In other embodiments, the actuator can further include at least one gear coupling the at least one rotary driver to both structures in the at least one pair of shearing auxetic structures. This can allow, for example, a single rotary driver to simultaneously apply opposing torques to both shearing auxetic structures in the at least one pair.

A variety of different shearing auxetic structures can be utilized but, in some embodiments, the shearing auxetic structures can be cylinders. Moreover, in some embodiments the rotary driver can be an electric motor.

In certain embodiments, the shearing auxetic structures can be formed from a compliant material to allow bending and other deformation. In some embodiments, each shearing auxetic structure can include a strain-limiting connection extending through a surface thereof that is configured to limit expansion of the cylinder in at least one dimension. In some embodiments, this strain-limiting connection can be formed into a pattern of repeating auxetic unit cells that make up each shearing auxetic structure, such that no additional structure or layer of material is required to provide the strain-limiting feature. Moreover, the strain-limiting connection can cause non-linear movement of the cylinder during expansion. In some embodiments, the non-linear movement can be bending.

In another aspect, an actuator is provided that can include a plurality of pairs of differently-handed shearing auxetic structures, as well as a plurality of rotary drivers configured to apply torque to at least one of the auxetic structures. Moreover, first ends of each shearing auxetic structure in the plurality of pairs can be rigidly coupled to one another.

As noted above, the shearing auxetic structures can have a variety of shapes and sizes. In some embodiments, the shearing auxetic structures can be cylinders. Further, in some embodiments the rotary driver can be an electric motor.

In certain embodiments, the shearing auxetic structures can be formed from a compliant material to allow bending and other deformation. In some embodiments, the plurality of pairs can include two pairs arranged such that the shearing auxetic structures of each pair form a 2×2 grid of shearing auxetic structures with alternating handedness. Depending upon the configuration, in some embodiments the actuator can be capable of 2 degrees of freedom in movement, while in other embodiments the actuator can be capable of 4 degrees of freedom in movement.

In another aspect, a robotic system is provided that can include a gripper including a plurality of shearing auxetic structures that bend as they expand, as well as a rotary driver coupled to at least one shearing auxetic structure In some embodiments, each of the plurality of shearing auxetic structures that bend as they expand can include a pair of differently-handed shearing auxetic structures having first ends thereof rigidly coupled to one another.

In some embodiments, the rotary driver can be configured to simultaneously apply opposing torques to second ends of the pair of differently-handed shearing auxetic structures. Still further, in some embodiments the plurality of shearing auxetic structures can be disposed opposite one another to facilitate grasping an object there between. And in some embodiments, the system can further include any of a pad and a cover disposed over an outer surface of one or more of the plurality of shearing auxetic structures.

Any of the features or variations described above can be applied to any particular aspect or embodiment of the present disclosure in a number of different combinations. The absence of explicit recitation of any particular combination is due solely to the avoidance of repetition in this summary.

BRIEF DESCRIPTION OF DRAWINGS

The present disclosure will be more fully understood from the following detailed description taken in conjunction with the accompanying drawings, in which:

FIG. 1 illustrates a portion of a plane on which unit cells are arranged or tiled to generate a handed cylinder structure, according to an exemplary embodiment;

FIG. 2F illustrates the left handed shearing auxetic cylinder of FIG. 2A in a state of expansion past its maximum linear expansion, according to an exemplary embodiment;

FIG. 6A illustrates a front view of a right handed capsule in a collapsed state, according to an exemplary embodiment;

FIG. 6B illustrates a front view of the right handed capsule of FIG. 6A in a deployed or expanded state, according to an exemplary embodiment;

FIG. 6C illustrates a perspective view of the right handed capsule of FIG. 6A in a deployed or expanded state, according to an exemplary embodiment;

FIG. 11 illustrates a planar 224 pattern design based on the unit cell of the re-entrant honeycomb auxetic tiling, according to an exemplary embodiment;

FIG. 12A(1) illustrates a composite handed auxetic cylinder structure, according to an exemplary embodiment;

FIG. 12A(2) illustrates another composite handed auxetic cylinder structure, according to an exemplary embodiment;

FIG. 12A(3) illustrates another composite handed auxetic cylinder structure, according to an exemplary embodiment;

FIG. 12A(4) illustrates a handed auxetic cylinder structure, according to an exemplary embodiment;

FIG. 12B(1) illustrates the handedness and corresponding forces of the cylinders of the composite handed auxetic cylinder structure of FIG. 12A(1);

FIG. 12B(2) illustrates the handedness and corresponding forces of the cylinders of the composite handed auxetic cylinder structure of FIG. 12A(2);

FIG. 12B(3) illustrates the handedness and corresponding forces of the cylinders of the composite handed auxetic cylinder structure of FIG. 12A(3);

FIG. 12B(4) illustrates the handedness and corresponding forces of the handed auxetic cylinder structure of FIG. 12A(4);

FIG. 14E illustrates a side view of another linear actuator including a compliant composite structure formed of two parallel cylinders in a first state, according to an exemplary embodiment;

FIG. 14F illustrates a side view of the linear actuator of FIG. 14E in a second state, according to an exemplary embodiment;

FIG. 14G illustrates a side view of the linear actuator of FIG. 14E in a third state, according to an exemplary embodiment

FIG. 16A illustrates an isotropic auxetic pattern, according to an exemplary embodiment;

FIG. 16B illustrates a shear auxetic pattern, according to an exemplary embodiment;

FIG. 17 illustrates a multiplication table of transformation of an SABE symmetry group, according to an exemplary embodiment;

FIG. 21A illustrates vectors and other aspects of a planar shearing auxetic pattern used to form a handed shearing auxetic cylinder, according to an exemplary embodiment;

FIG. 23A illustrates a series of identical parallelograms that wrap around an unhanded shearing auxetic sphere structure, according to an exemplary embodiment;

FIG. 23B illustrates tiling formed by linkages on the sphere of FIG. 23A based on the identical parallelograms, according to an exemplary embodiment;

FIG. 23C illustrates linkages of different lengths in the sphere of FIG. 23A, in which the linkages are separated by a fixed angle at one pole, and a variable angle at the other pole of the sphere, according to an exemplary embodiment;

FIG. 23D illustrates various views of a 22N symmetry shearing auxetic tiling of a sphere that is unhanded, according to an exemplary embodiment;

FIG. 23E illustrates various views of a handed shearing auxetic having a pattern with no lines of reflection, according to an exemplary embodiment;

DETAILED DESCRIPTION

Figure 2B:
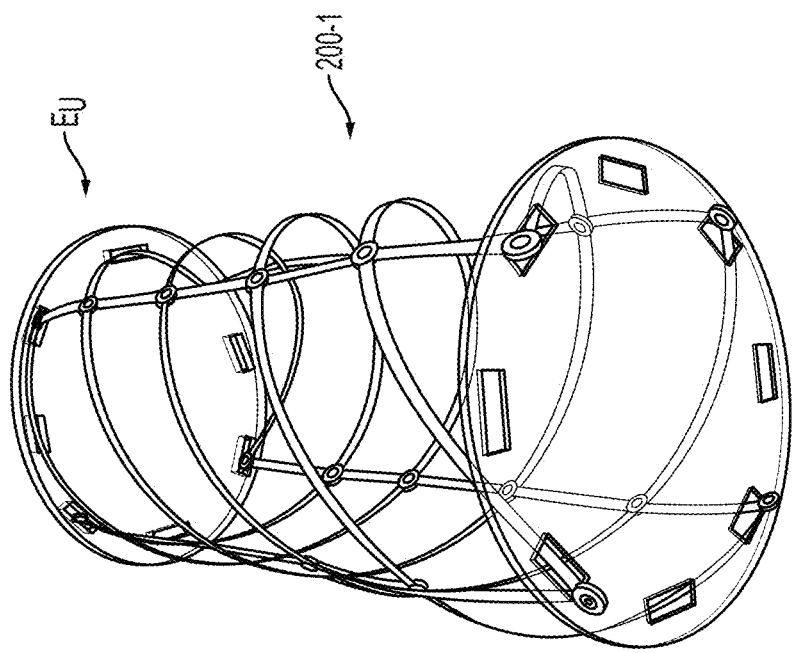
FIG. 2B illustrates a perspective view of the left handed shearing auxetic cylinder of FIG. 2A in the expanded state, according to an exemplary embodiment.

Certain exemplary embodiments will now be described to provide an overall understanding of the principles of the structure, function, manufacture, and use of the structures, devices, and methods disclosed herein. One or more examples of these embodiments are illustrated in the accompanying drawings. Those skilled in the art will understand that the structures, devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure. Further, in the present disclosure, like-numbered components of various embodiments generally have similar features when those components are of a similar nature and/or serve a similar purpose.

Non-planar shearing auxetic structures, devices, and methods are provided herein. Shearing auxetics are made up of repeating unit cells arranged according to an auxetic pattern. The pattern is used to provide a surface of a shearing auxetic structure or device. The unit cells are made up of elements having an angle there between that drives the movement and shearing of the unit cells and pattern. In a handed shearing auxetic structure, when a net shear force in one direction is applied to the structure it can expand, while a net shear force in the opposite direction can cause the handed shearing auxetic structure to contract. Multiple handed shearing auxetic structures can be joined in a concentric arrangement to create a rigid or semi-rigid mechanism. In such an arrangement, adjacent structures can have opposite handedness. In some embodiments, when two handed shearing auxetic structures are concentrically arranged, a net shear, e.g., a twisting force of the mechanism, in one direction can cause the inner structure to expand while the outer structure contracts. Their forces can therefore counteract against one another, such that expansion or contraction movements are prevented. In other embodiments, when three handed shearing auxetic structures are concentrically arranged, a net shear, e.g., a twisting force of the mechanism, in one direction can cause the structure concentrically arranged between inner and outer structures to expand while the inner and outer structures contract. A net shear, e.g., a twisting force of the mechanism, in the opposite direction can cause the structure concentrically arranged between inner and outer structures to contract while the inner and outer structures expand. As a result, either net shear or twisting force can cause the forces of the structures to counteract one another, such that expansion or contraction movements are prevented.

In some embodiments, handed shearing auxetic structures can be arranged non concentrically and parallel to one another. Further, in some embodiments ends of the handed shearing auxetic structures can be joined to each other or to another fixed component that prevents their rotation. If both ends of the handed shearing auxetic structures are joined to one another or to another structure that fixes their position relative to each other, extension of the structures can be prevented because a net shear or twisting force cannot be applied to the structures. This can serve as one method for locking such structures. In other embodiments, as described in more detail below, one end of each of a plurality of differently-handed shearing auxetic structures can be joined together to prevent relative movement there between, and opposite torques can be applied to opposite ends of the structures to induce shearing auxetic expansion or contraction.

In some embodiments, one or more handed shearing auxetic structures can be used to provide an actuator, e.g., by connecting the structures to respective gears and/or motors to drive their movement. Handed shearing auxetic structures can be independently driven to control their expansion and contraction in some embodiments, or a plurality of such structures can be driven simultaneously using gears, etc. Mechanisms made up of multiple handed shearing auxetic structures that are joined to one another can be driven to provide twisting and bending of the structures. Such mechanisms or actuators can be employed in robotic systems, for instance, as grippers. However, it should be understood that the structures, devices, and methods provided herein can be used for a variety of applications, including for chemical frameworks, medical devices (e.g., stents), robotic systems, and deployable engineering structures. Moreover, the rigidizing of structures described herein can be used, for example, in biomedical, architectural, and space applications, among others.

Auxetic structures are scale-independent frameworks made from repeated unit cells (base units) that can expand under tension and that can selectively bond to make rigid or compliant structures or materials. Notably, a mechanical property of auxetic structures is a negative Poisson's ratio, which results in or enables these structures to expand perpendicularly to the direction of tension when they are stretched. The underlying geometric patterns that lead to auxetic behavior or characteristics in auxetic structures are typically scale and material independent. The underlying geometric patterns used to provide auxetic behavior or characteristics can be can be found, for example, at the nanometer scale, at the millimeter scale, and at the meter scale. Moreover, the underlying geometric patterns can be used or relied upon, at least in part, to enable the design of unconventional auxetic metamaterials. As described in further detail herein, the disclosed shearing auxetic structures can be used to design or develop not only planes, but also cylinders, spheres, and other complex surfaces. The non-planar surfaces encompassed herein can be either open or closed structures (or surfaces of structures). Closed structures, such as spheres and capsules, are topologically closed (but may have holes), meaning that a line drawn along any portion of the surface of the closed structure will eventually come back to itself. Open structures such a cylinders without tops and hyperboloids, on the other hand, do not loop back on themselves in all directions. These structures, however, are mathematically compact in at least one direction, e.g., a line drawn along the surface in at least one direction will come back to itself. A cylinder, for example, is closed or mathematically compact around its circumference but not along its length.

As described herein in further detail, shearing auxetic structures can be handed structures. The handedness of shearing auxetic structures can be provided through two-dimensional shearing auxetic material patterns that tile the surface of structures such as planes, cylinders, or spheres. Handedness can be produced in auxetic unit cells that shear as they expand by changing their relative symmetries and alignments. Using the symmetry and alignment rules described herein, handed shearing auxetics can be generated by tiling unit cells to form structures such as planes, cylinders, spheres, spheroids, capsules, and combinations thereof. Handed structures can be designed and/or developed in mirror-image pairs.

Handed shearing auxetics and auxetic materials can be selectively bonded to generate both rigid and compliant structures. Such structures can be used to provide rigid, compliant, or flexible mechanical properties through relative variations in the bonding of their unit cells, as described in further detail herein. For example, structures can become stronger by increasing the amount of inter-layer bonding. In some embodiments, selectively rigid structures can be formed by concentrically aligning multiple handed auxetic structures (e.g., cylinders) such that they can lock to one another. Moreover, in some embodiments, selectively compliant structures can be formed by arranging, in parallel, right- and left-handed structures (e.g., cylinders) that can be coupled to one another at one or more points along their length (e.g., at one or more ends, etc.).

These selectively rigid and/or compliant structures can be deployed and/or actuated. For example, structures can be globally actuated by applying a net shear, such as a twist, or a linear stress or force, which allows for their actuation using conventional motors. As described herein, handed shearing auxetics can be composited to produce both compliant structures that expand while shearing or twisting, as well as deployable structures that can rigidly lock. In some embodiments, the handed shearing auxetics described herein can enable the design and development of, for example, chemical frameworks, medical devices like stents, robotic systems, deployable engineering structures, and other structures and devices.

As noted above, auxetic materials can increase in area when a strain is applied thereto. In some embodiments, auxetic materials can be modeled as a network of elements, such as links (e.g., bars), polygons, and curves, on a 2D plane that form unit cells, which in turn can form auxetic structures. Elements can have both a fixed length and curvature, and they can be connected by a rotary joint such as a pin joint. The symmetry of repeating unit cells (e.g., a repeating pattern) can be used to determine the mechanics of the overall structure. In some embodiments, a planar auxetic structure can be made up of repeating unit cells that can be categorized into one of seventeen wallpaper groups (e.g., symmetry groups).

Each of the unit cells can be modeled as having an internal parameter θ, which refers to or is associated with an angle between elements in the unit cell. That is, the parameter θ which defines a unit cell can be associated with two vectors at or corresponding to each point thereof. A vector $l_1$ can point from the current point to the next point on the unit cell, and a vector $l_2$ can point from the current point to the previous point on the unit cell. These vectors can be combined to form a 2×2 matrix, where $L=[l_1,l_2]$. Thus, as the internal parameter θ varies between a minimum value ($θ_{min}$) and a maximum value ($θ_{max}$), the overall structure can deform and the unit cell can transform, such that $l_1$, $l_2$, and L can transform as a function of θ. This behavior is known as the auxetic trajectory of the auxetic structure. The derivative of the L matrix can be modeled as $$\frac{\partial L}{\partial \theta} = A * L,$$

where A is of the form $$\begin{bmatrix} a_{11} & a_{12} \\ 0 & a_{22} \end{bmatrix}.$$

The area of the unit cell can be modeled as det L. Note that maximum and minimum areas or sizes of the unit cell do not necessarily correspond with maximum and minimum values of θ, i.e., an auxetic cell can achieve a maximum area at a value of θ between $θ_{min}$ and $θ_{max}$. Unit cells that both shear and expand when undergoing strain are referred to herein in some embodiments as shear auxetics or shearing auxetics.

Shearing auxetic structures and/or their unit cells can be thought of as being handed or unhanded. Unhanded structures can refer to structures that, when a discrete flip operation is performed thereon at any point on its auxetic trajectory, the structure is caused to be placed at another point on the auxetic trajectory. In contrast, handed structures can refer to structures that, when a flip operation is performed thereon at any point on its auxetic trajectory, the structure is caused to be placed at a different trajectory that is a mirror image of the original trajectory. In other words, handed structures, when flipped, are not (or do not appear to be) the same structure, while unhanded structures, when flipped, are still (or appear to be) the same structure (though, as explained herein, having a different value of θ of its unit cells).

In some example embodiments, handed unit cells of handed auxetic structures can be formed as follows. First, a repeating pattern of links connected by pin joints can be designed. The repeating pattern of links can form unit cells having a polygon shape. It should be understood that, because polygons can be modeled as a network of three or more elements, a network of links and/or polygons can be referred to herein in some embodiments as elements. The repeating pattern of elements can be designed such that the pattern has no rotational symmetry higher than C3, meaning that a rotation of the pattern by any angle other than 180 degrees or 360 degrees does not bring the pattern back to itself. For example, if the pattern can be rotated 120 degrees and be identical to itself, it is a C3 pattern. If the pattern can be rotated 180 degrees and be identical to itself, it is a C2 pattern. If it is only identical to itself after a 360 rotation, it is a C1 pattern.

In some embodiments, C1 patterns can be classified into handed shearing, non-handed shearing, and non-shearing patterns. To perform such a classification, a repeating point on the pattern can be used as a reference. Vectors $l_1$ and $l_2$ can be used to define the matrix L. Either analytically or numerically L can be differentiated for all values of θ to generate A and numerically or analytically differentiate A as well. If $a_{12}$ is zero for all theta, then the pattern is non-shearing. If for some θ det $$A = 0 \text{ and } tr\left(\frac{\partial A}{\partial \theta}\right) \neq 0$$

then it is a non-handed shearing auxetic. Otherwise, it is a handed shearing auxetic. Handed shearing auxetics can be understood to be a subset of shearing auxetics. If the pattern results in a non-handed shearing auxetic, then adjustments to the lengths of the elements can be made, and the classification process can be repeated.

If a unit cell is a C1 cell (e.g., it has a C1 symmetry) it can be classified into either auxetic or handed shear auxetic. To perform such a classification, the L matrix can be numerically or analytically differentiated and the L matrix can be taken as a function of theta for the pattern, to determine the value of A. If $a_{12}$ is non-zero and det A≠0 over the range of theta, the unit cell is a handed shear auxetic. If the unit cell is simply auxetic, the lengths of the elements can be adjusted and the unit cell classification analysis repeated.

In some embodiments, to compose a handed structure, reflections in the tiling of the cells can be avoided. For example, to make a handed cylinder structure, handed shear auxetic unit cells can be arranged or tiled together on a plane. FIG. 1 illustrates a portion of a plane 101 on which unit cells are arranged or tiled to generate a handed cylinder structure, according to an exemplary embodiment. To design an arrangement or tiling of unit cells (e.g., exemplary unit cell UC, illustrated by the shaded region in FIG. 1) for a handed cylinder structure, a set of perpendicular lines (e.g., lines R and L) can be drawn on the plane of unit cells, as illustrated in FIG. 1. One or more lines R can represent the circumference of the auxetic cylinder, and one or more lines L can represent the length of the auxetic cylinder. The plane 101 can be tiled such that there are N unit cells along the circumference and M unit cells along the length of the cylinder. The ends of the circumference (or circumference lines R) represented on the illustrated plane 101 can be joined with each other to make a cylinder surface. Thus, the cylindrical surface can be said to be made up of N unit cells along the circumference of the cylinder, and M unit cells along the length of the cylinder.

The points where each of the circumference lines intersects with the unit cells can be represented as two vectors Q and S. As shown in FIG. 1, the vectors Q and S extend from the points where the circumference lines R intersect with the unit cells to corners of the unit cells. For each unit cell, its width W and height H can be defined as a function of $\theta$, Q, and S. That is, W and H can be determined by the relative alignment of the handed unit cells with the radial dimensions of the cylinder structure. This can translate into the height and radius of the cylinder structure, for example, such that the length of the cylinder is can be represented or calculated as M*H, and the radius of the cylinder can be represented or calculated as $$\frac{N}{2\pi}W.$$

On two-dimensional surfaces of shearing auxetic structures having at least one mathematically compact dimension (e.g., a sphere, spheroid, cylinder, capsule, and the like, or any 2D surface other than a plane or hyperbolic plane), a shear can be equated or correspond to a twist or twisting force or movement. Accordingly, a tiling or an arrangement of shearing auxetic unit cells functioning as such two-dimensional surfaces of structures (such as a cylinder) can couple a twist of the structure (e.g., cylinder) with a contraction or expansion of the structure (e.g., cylinder) surface. By providing handed shearing auxetic unit cells, the surface of the cylinder or other structure can have a default or preferred direction, such that the structure is twisted in that direction to deploy the structure from a compacted state to an expanded state. As a result of providing handed shearing auxetic cells, unit cells can twist or spin in a preferred direction when the structure is compressed (e.g., pushed, as when the poles or ends are pushed towards each other), and in the opposite direction when the structure is expanded (e.g., pulled, as when the poles or ends are pulled away from each other). In some embodiments, because handed shear auxetic cells have mirror images, a mirror cylinder can be made by using the mirrored unit cells as the base unit.

Figure 2A:
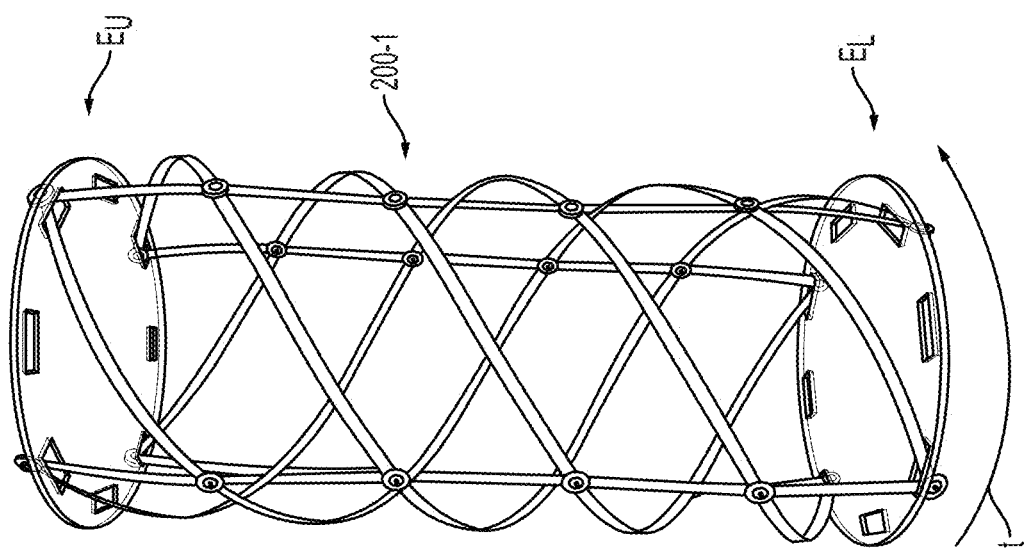
FIG. 2A illustrates a front view of a left handed shearing auxetic cylinder in an expanded state, according to an exemplary embodiment.
Figure 2C:
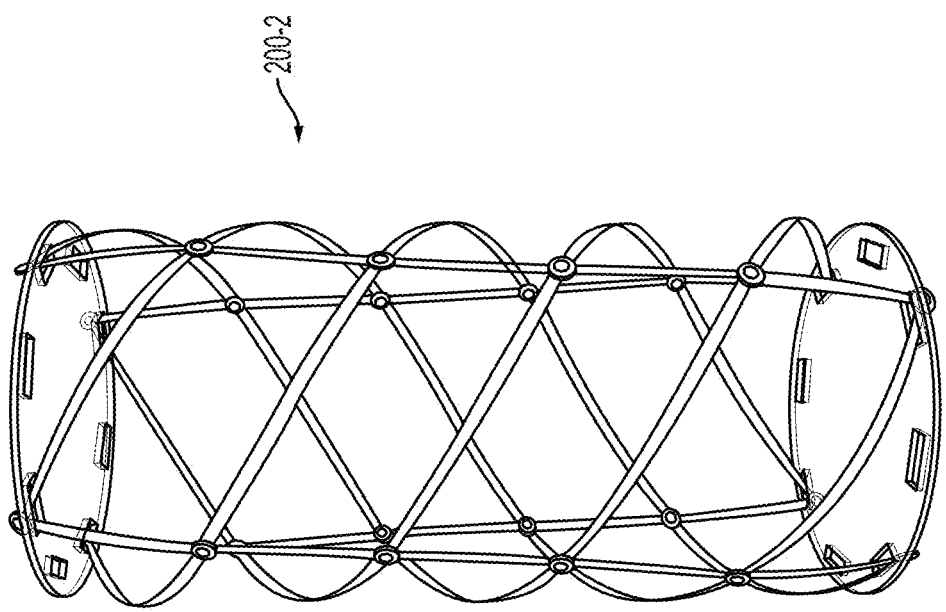
FIG. 2C illustrates a front view of a right handed shearing auxetic cylinder in an expanded state, according to an exemplary embodiment.

FIGS. 2A to 2F illustrate exemplary embodiments of handed shearing auxetic cylinder structures, according to exemplary embodiments. More specifically, FIG. 2A illustrates a front view of a handed shearing auxetic cylinder 200-1 in an expanded state, according to an exemplary embodiment. FIG. 2B illustrates a perspective view of the shearing auxetic cylinder 200-1 in the expanded state similar to that illustrated in FIG. 2A. As shown in FIGS. 2A and 2B, the cylinder 200-1 is in an expanded state, in which its length along its longitudinal axis is at a maximum size. As described above, in its expanded state, the unit cells on the surface of the cylinder 200-1 each have an internal parameter $\theta$ (defined by the angles of its respective links) at a value where the expansion of the cell is at a maximum. The cylinder 200-1 is a handed cylinder and in particular is a left handed cylinder, meaning that it is transitioned from its compacted state to its expanded state by twisting its lower end $E_L$ (relative to the upper end $E_U$) in the twist direction t shown in FIG. 2A. It should be understood that a right handed cylinder (e.g., 200-2 shown in FIG. 2C) can be transitioned from its compacted state to its expanded state when twisted opposite to the direction t shown in FIG. 2A.

Figure 2E:
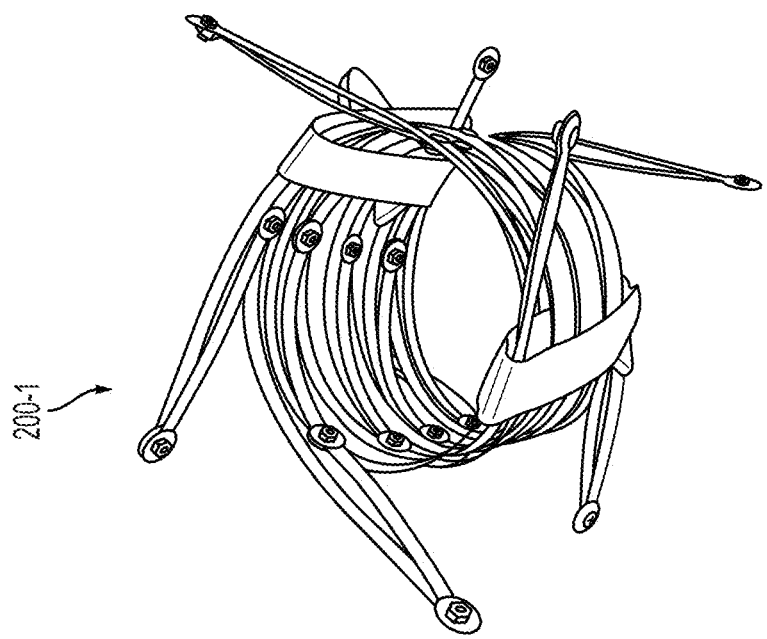
FIG. 2E illustrates a perspective view of the left handed shearing auxetic cylinder of FIG. 2A in the compacted state, according to an exemplary embodiment.
Figure 2D:
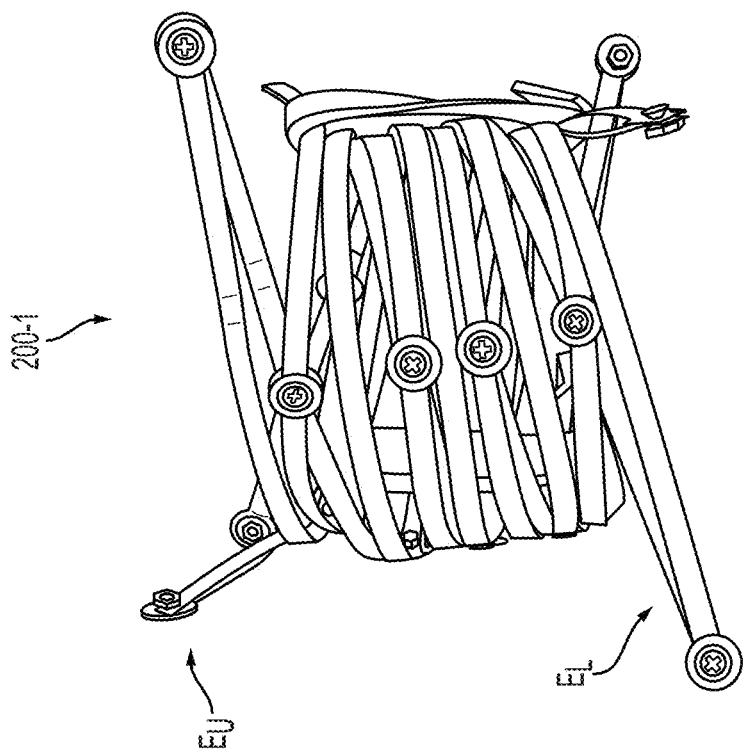
FIG. 2D illustrates a perspective view of the left handed shearing auxetic cylinder of FIG. 2A in a compacted state, according to an exemplary embodiment.

FIG. 2D illustrates a perspective view of the handed shearing auxetic cylinder 200-1 in a compacted state, according to an exemplary embodiment. FIG. 2E illustrates a perspective view of the shearing auxetic cylinder 200-1 in the compacted state, similar to that illustrated in FIG. 2D. As shown in FIGS. 2D and 2E, the cylinder 200-1 is in a compacted state, in which its length along its longitudinal axis is at a minimum size. As described above, in its compacted state, the unit cells on the surface of the cylinder 200-1 each have an internal parameter $\theta$ (defined by the angles of its respective links) at a value where the expansion of the cell is at a minimum. As noted above, the values of maximum auxetic expansion and contraction may or may not align with the maximum and minimum values of $\theta$.

As described herein, handed shearing auxetic structures can deform or lose their shearing auxetic characteristics if they are twisted or moved beyond the maximum or minimum auxetic expansion or contraction limits. FIG. 2F illustrates the cylinder 200-1 in a state of expansion past its maximum linear expansion.

Figure 3B:
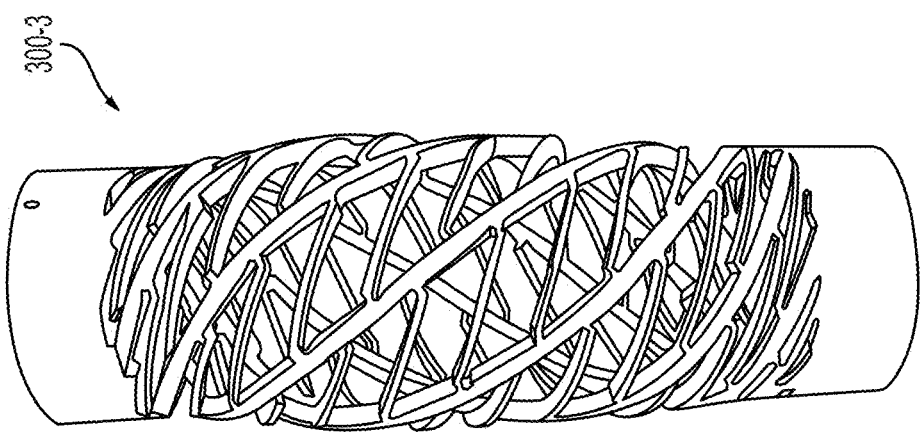
FIG. 3B illustrates a shearing auxetic cylinder formed of Teflon material, according to exemplary embodiments.
Figure 3A:
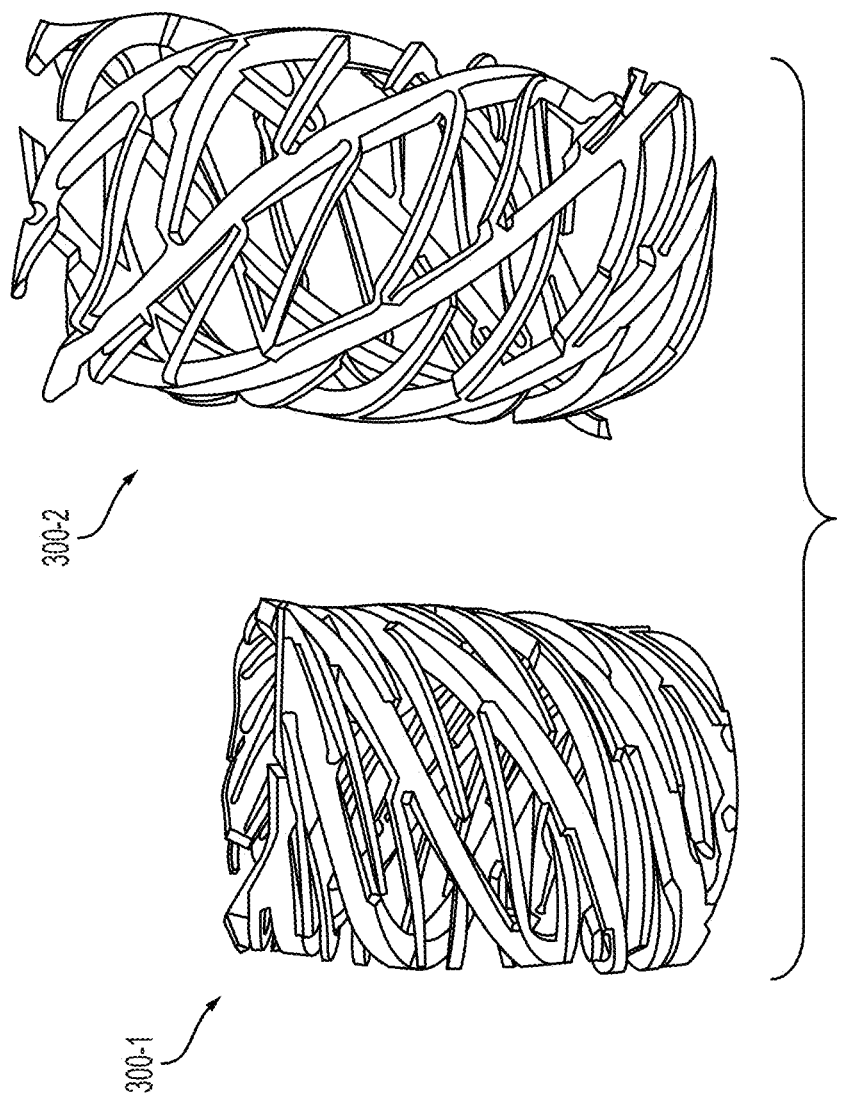
FIG. 3A illustrates shearing auxetic cylinders formed of Teflon material, according to exemplary embodiments.

As described in further detail below, the handed shearing auxetic structures can be formed of various materials. For example, the cylinder 200-1 illustrated in FIGS. 2A to 2F can be formed of flexible metal material (or flexible metal strips) known to those of skill in the art. In contrast, FIGS. 3A and 3B illustrate shearing auxetic cylinders 300-1, 300-2, and 300-3, formed of Teflon material, according to exemplary embodiments. In other embodiments, a variety of other materials can be utilized, including, for example, wood, paper, cardboard, rubber, silicone, carbon fiber, nickel titanium (nitinol) alloys, polyethylene terephthalate (PET), and other compliant materials that can form living hinges. Moreover, as also explained in further detail below, the cylinders can be formed according to various manufacturing methods, including through a laser-cutting process that selectively removes material from a continuous material workpiece to leave a unitary shearing auxetic structure of, for example, links connected by living hinges.

Figure 4A:
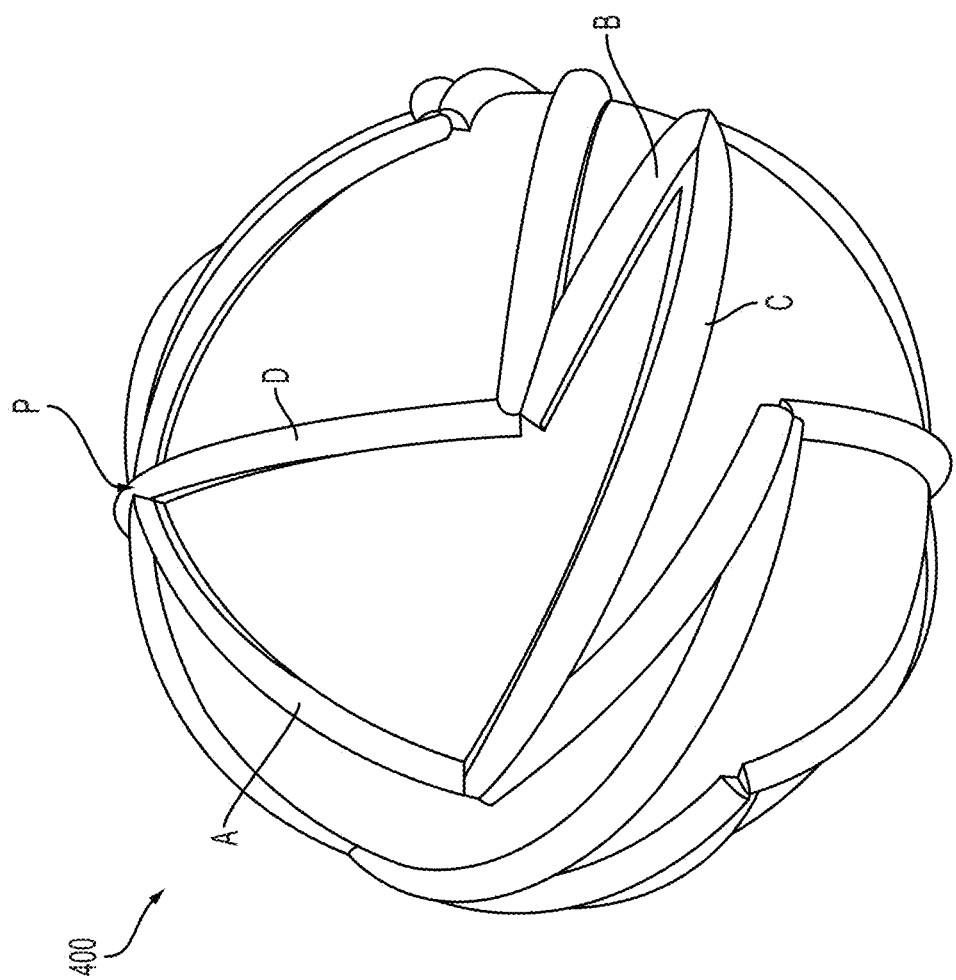
FIG. 4A illustrates a handed shearing auxetic sphere, according to an exemplary embodiment where the handedness is the result of an added limiting element.

As described herein, handed shearing auxetic structures other than cylinders can be formed. For example, to make handed spheres (and spheroids), the surface of the sphere (or spheroid) can be tiled with shearing auxetic unit cells. These unit cells can have N gyroidal symmetry at the poles of the sphere. FIG. 4A illustrates a handed shearing auxetic sphere according to an exemplary embodiment. The auxetic sphere 400 illustrated in FIG. 4A has a surface made up of unit cells that can be defined or represented by 4 elements A, B, C and D. The unit cells of the sphere 400 can have no symmetry, and can correspond to a 226 symmetry group in orbifold notation, as described in further detail below and known to those of skill in the art. Note that the auxetic pattern is not inherently a handed shearing one, but is instead an unhanded shearing auxetic pattern that is made handed by adding the element C as a constraint. That is, element C is not part of the auxetic pattern, but is instead added as a constraint to make the unhanded shearing pattern handed. As described in more detail herein, the element C resides on the surface of the sphere only in its fully expanded and fully compacted configurations. In intermediate configurations, the element C comes on and off the surface and the structure is a spheroid. Such structures can be any of marginally- or mono-stable and bi-stable. A marginally-stable structure can maintain its expanded or open configuration but will transition to its compacted or closed configuration with little energy input, while a bi-stable structure will be stable at both its open/expanded and closed/compacted configurations without easily transitioning there between.

Returning to FIG. 4, in some embodiments, elements A and D can have the same length and can be locked together at a fixed angle at the pole p of the sphere 400. Moreover, in some embodiments, element B can have a length that is in the range of being greater than 0 to N−1−M times the length of A, such that for M, 1≤N−1−M<N. In some embodiments, element C can have twice the length of element B, and elements B and C can be replaced by several rotating polygons in some embodiments. The length of element A can determine the minimum radius of the sphere 400, such that $2\pi R_{min}=4$ times the length of A, with $R_{min}$ representing the minimum radius of the sphere (e.g., the radius of the sphere at its closed state). The collection of elements having a length equal to link A at the pole p of the sphere 400 that are fixed together can define a cap of the sphere.

In some embodiments, the element C can be made of either a single element or an element (e.g., a linkage) that changes length. The length of element C can vary along the auxetic trajectory and can be determined by the lengths of elements B, A, and by the value of N. To allow the sphere 400 to remain a sphere along the auxetic trajectory, a linkage must be placed along the element C such that element C can change in length. This can be accomplished using a diamond linkage, a Z shaped linkage, or the like, as known to those of skill in the art.

Figure 5B:
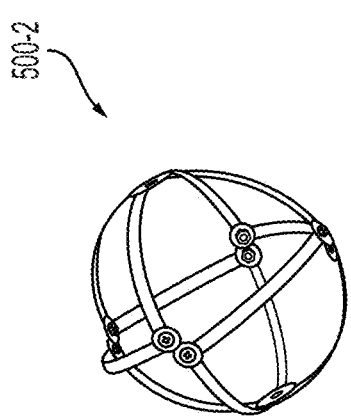
FIG. 5B illustrates an unhanded shearing auxetic sphere in a closed-right state, according to an exemplary embodiment.
Figure 5D:
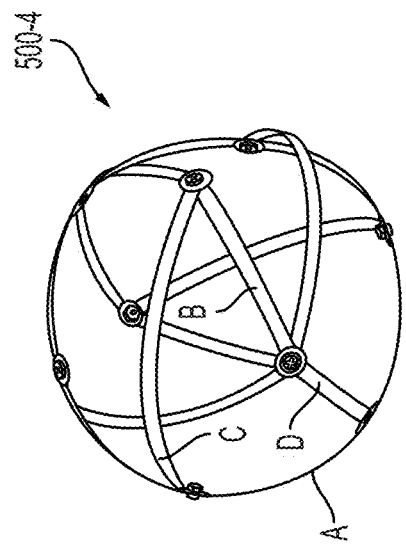
FIG. 5D illustrates a right handed shearing auxetic sphere in an open state and having the first element configuration, according to an exemplary embodiment where the handedness is the result of an added limiting element.
Figure 5A:
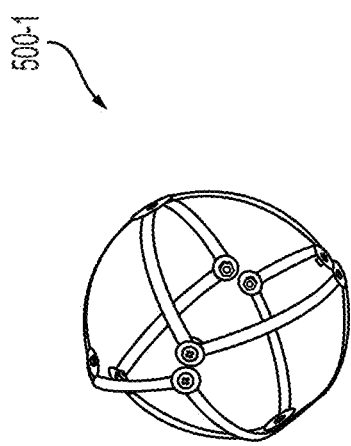
FIG. 5A illustrates an unhanded shearing auxetic sphere in a closed-left state, according to an exemplary embodiment.

If a fixed length section for C is used (rather than linkages or other adjustable-length elements), the element C can make a shape that can transition between other shaped structures and spheres. In some embodiments, a spherical linkage can be defined such that element C is removed, as shown in FIGS. 5A and 5B. The length of the linkage can be calculated between the points where C would have been to determine the maximum and minimum values the length of C can hold. For example, the length of C along the spherical surface at $R_{min}$ of the sphere can be called K. If the length of C is set to be K or greater, there are two sphere states along the auxetic trajectory. Thus, by twisting the sphere 400, the sphere can transition from one sphere shape to another. However, if the length of C is chosen to be less than K, there will be just one spherical state for the structure. Spheres having an element C with a length less than K can be used to make a bi-stable spherical structure, meaning that it can be stabilized at multiple states along the auxetic trajectory. If the sphere is twisted to contract with the length of C being less than K, then the structure will collapse, and the links C will peel off of the sphere surface and move inside of the sphere (e.g. radially internally), thereby forming a sphere of size $R_{min}$ with element C positioned on the inside of the sphere. When the sphere is twisted to open, it will reach the radius where C equals K and remain there, thus making the sphere a bi-stable deployable spherical structure.

Figure 4B:
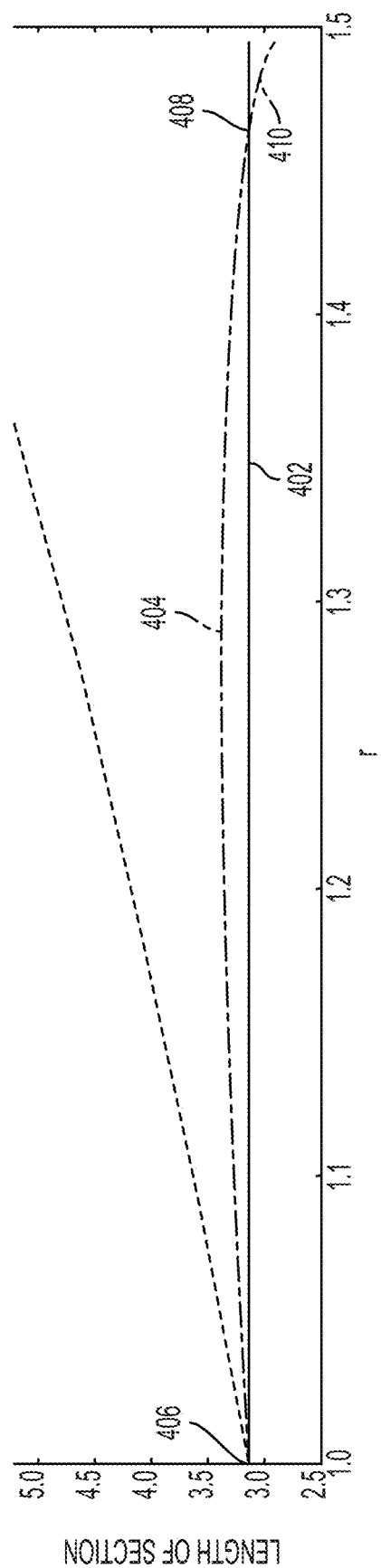
FIG. 4B is a graph illustrating the relationship of the length a unit cell element relative to the radius of the a handed shearing auxetic sphere, according to an exemplary embodiment where the handedness is the result of an added limiting element.
Figure 5C:
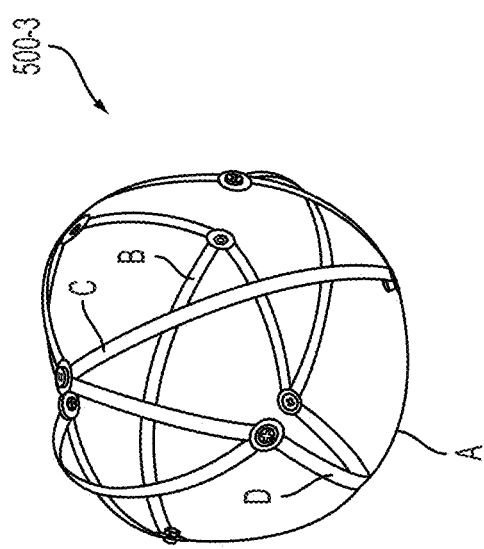
FIG. 5C illustrates a left handed shearing auxetic sphere in an open state and having a first element configuration, according to an exemplary embodiment.
Figure 5F:
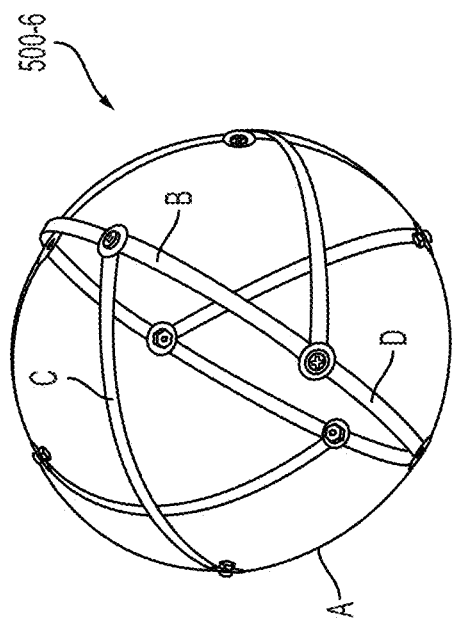
FIG. 5F illustrates a right handed shearing auxetic sphere in an open state and having the second element configuration, according to an exemplary embodiment where the handedness is the result of an added limiting element.
Figure 5E:
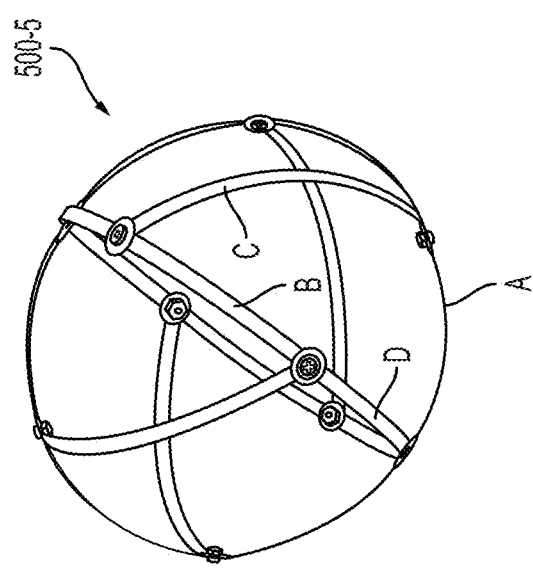
FIG. 5E illustrates a left handed shearing auxetic sphere in an open state and having a second element configuration, according to an exemplary embodiment where the handedness is the result of an added limiting element.
Figure 5H:
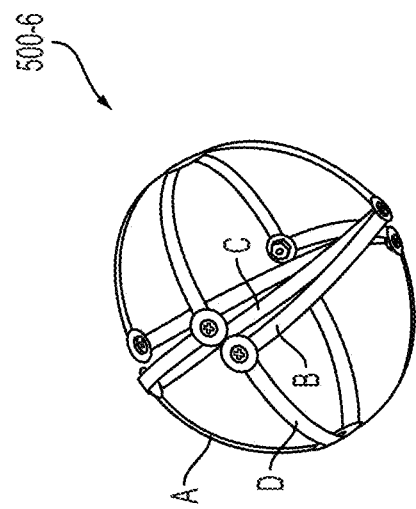
FIG. 5H illustrates the right handed auxetic shearing sphere of FIG. 5F in a closed state and having the second element configuration, according to an exemplary embodiment where the handedness is the result of an added limiting element.
Figure 5J:
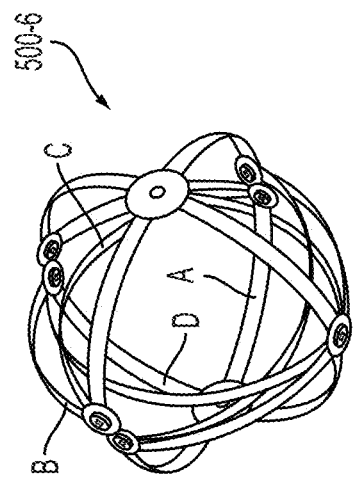
FIG. 5J illustrates the right handed auxetic shearing sphere of FIG. 5F in a further closed state, and having a third element configuration, according to an exemplary embodiment where the handedness is the result of an added limiting element.
Figure 5G:
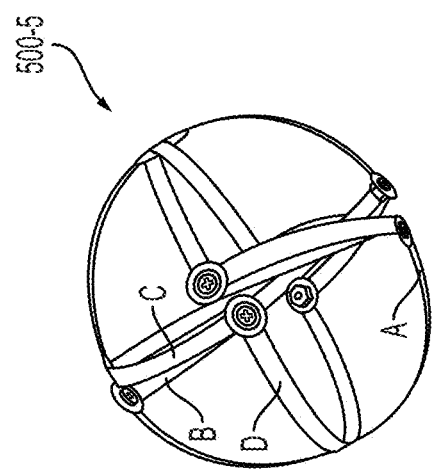
FIG. 5G illustrates the left handed auxetic shearing sphere of FIG. 5E in a closed state and having the second element configuration, according to an exemplary embodiment where the handedness is the result of an added limiting element.

FIG. 4B is a graph illustrating the relationship of the length of element C relative to the radius of the sphere corresponding to element C. More specifically, in FIG. 4B, the length of the element C (measured in length/$R_{min}$ units) is plotted against radius measure r, where r=R/$R_{min}$. The above-mentioned value K is shown by line 402 and line 404 shows the length of element C along the auxetic trajectory of the sphere 400 (i.e., as the radius measure r changes). When the value of K is set as shown, there are two intersections 406, 408 between C and K that represent configurations wherein the element C resides on the surface of the sphere and limits further expansion or contraction. At intermediate points the element C comes off the surface into the interior of the sphere. The illustrated configuration can be referred to as marginally-stable or mono-stable, as the sphere will maintain its configuration in the open, larger radius at point 408, but will readily collapse to its closed configuration at point 406 with little energy input. FIGS. 5C and 5D illustrate embodiments of such marginally-stable structures in an open configuration, and FIGS. 5G and 5H illustrate embodiments of such structures in a closed configuration.

Figure 5I:
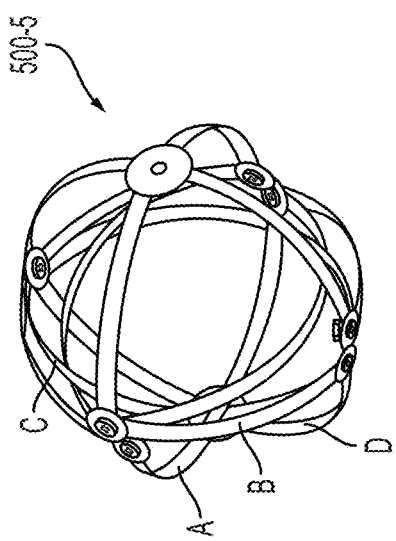
FIG. 5I illustrates the left handed auxetic shearing sphere of FIG. 5E in a further closed state, and having a third element configuration, according to an exemplary embodiment where the handedness is the result of an added limiting element.

Alternatively, if the value of K is reduced (i.e., moved down the y- or length-of-section-C-axis in FIG. 4B), a bi-stable structure can be created that will maintain its open and closed configurations without readily transitioning towards one or the other. This is because K (line 402) will intersect with the length of C (line 404) only at one point (e.g., 410) in an open, larger radius configuration. In such a configuration, the sphere will have a stable closed configuration and a stable open configuration, but the open configuration will not readily transition to the closed configuration as with the marginally-stable configuration above. FIGS. 5E and 5F show embodiments of such bi-stable structures in an open configuration, and FIGS. 5I and 5J illustrate embodiments of such structures in a closed configuration.

Returning to FIG. 5A, a left handed shearing auxetic sphere 500-1 is illustrated in a closed state, according to an exemplary embodiment. FIG. 5B illustrates a right handed shearing auxetic sphere 500-2 in a closed state, according to an exemplary embodiment. As shown in FIGS. 5A and 5B, the spheres 500-1 and 500-2 include unit cells defined by three elements. That is, the spheres 500-1 and 500-2 do not include an element C as described above. Moreover, these structures are unhanded auxetics that can be transformed into handed auxetics by adding the element C to constrain their movement. In contrast, FIGS. 5C to 5J illustrate handed shearing auxetic spheres having unit cells defined by four elements, including the element C (502) described above. As noted above, the element C in these structures is not part of the auxetic pattern and serves to impart a handedness to the structure that would otherwise be unhanded. Further, the inclusion of element C can, in some cases, result in a spheroid rather than a sphere because the element C comes off the spherical surface during transition and lies on the surface only at the minimal and maximal expansion states. Note that elements A, B, C, and D for one unit cell are labeled in each of FIGS. 5C-5J, similarly to FIG. 4.

More specifically, FIG. 5C illustrates a left handed shearing auxetic sphere 500-3 having an element C with a possible length greater than K, in an open state, according to an exemplary embodiment; and FIG. 5D illustrates a right handed shearing auxetic sphere 500-4 having an element C with a possible length greater than K, in an open state, according to an exemplary embodiment. As described above, K represents the length of C at $R_{min}$ of the sphere. In contrast to FIGS. 5C and 5D, FIGS. 5E, 5F, 5I, and 5J illustrate handed shearing auxetic spheres having elements C with possible length values less than K. That is, according to exemplary embodiments, FIG. 5E illustrates a left handed shearing auxetic sphere 500-5 in an open state and having an element C with a possible length value less than K; and FIG. 5F illustrates a right handed shearing auxetic sphere 500-6 in an open state and having an element C with a possible length value less than K. FIG. 5G illustrates the left handed auxetic shearing sphere 500-5 in a closed state and having an element C with a possible length value less than K; and FIG. 5H illustrates the right handed auxetic shearing sphere 500-6 in a closed state and having an element C with a possible length value less than K. FIG. 5I illustrates the left handed auxetic shearing sphere 500-5 in a further closed state, in which the element C has a length value less than K and is collapsed internally away from the surface of the sphere; and FIG. 5J illustrates the right handed auxetic shearing sphere 500-6 in a further closed state, in which the element C has a length value that less than K and is collapsed internally away from the surface of the sphere. FIGS. 5E, 5F, 5I, and 5J thereby illustrate that the spheres 500-5 and 500-6 can be bi-stable, meaning that they can be stabilized at multiple points along the auxetic trajectory.

In some example embodiments, shearing auxetic spheres or spheroids can have holes formed thereon, at one or more of the caps or poles. For example, the area of the sphere where elements A and D meet (e.g., FIG. 4A) can have a ring or similar structure that includes a hole therethrough. This hole can be used to allow access into the interior portion of the sphere structure while still maintaining the functions and properties of the handed shearing auxetic spheres described herein.

As described herein, handed shearing auxetic structures other than cylinders and spheres can be formed. For example, a capsule-shaped shearing auxetic structure can be made by combining a cylinder of N circumferential cells with the hemispheres or caps of a sphere with N polar cells of the same minimum radius. This combination can produce a capsule with the handedness of the cylinder on which the capsule is based and an expansion that is limited by the maximum expansion of the sphere, as described herein. As noted above, handed shearing auxetic capsules can include holes placed or formed on its caps or poles by providing a ring or similar structure that includes a hole at the point where the links A and D meet, to allow access into the inside of the capsule.

FIGS. 6A to 6C illustrate a handed shearing auxetic capsule 600 according to an exemplary embodiment. The capsule 600 is a right handed capsule, though it should be understood that a left handed capsule that can be compressed and expanded (or deployed) by performing an opposite twisting motion than that of the right handed capsule 600 is also possible. In FIG. 6A, the right handed capsule 600 is shown from a front view, in a collapsed state, in which, as described above, its unit cells are defined by an internal parameter θ such that its expansion is at a minimum value. FIGS. 6B and 6C illustrate first and second perspective views of the capsule 600 in a deployed or expanded state, in which the value of the internal parameter θ is such that the expansion of the unit cells is larger than in FIG. 6A. As can be seen in FIGS. 6B and 6C relative to FIG. 6A, the length and width of the capsule 600 can be significantly enlarged or increased.

The handed shearing auxetic structures (e.g., cylinders, spheres, spheroids, capsules, and combinations thereof), surfaces, and/or links described herein can be made out of a variety of materials known to those of skill in the art that substantially maintain their length along the surface of the structure, but that can flex in a direction perpendicular to the surface of the structure. The flexible characteristics of the material of the structures can enable or account for the change in the directional curvature of the structure (e.g., cylinder, sphere, spheroid, capsule, or other partially or totally compact shearing auxetic surface). In some embodiments, the elements and unit cells (e.g., polygons that make up the structure) can be flexible but not extensible. The shearing auxetic structures can, in some embodiments, have or be formed with a preferred or default curvature and twist, but can alternatively be curved or twisted by applying forces at their connecting points.

In some embodiments, the flexible elements forming the unit cells of the structure can be biased to a preferred configuration (e.g., closed, open; collapsed, expanded) of the surface of the structure with internal parameter $\theta_{preferred}$. That is, the internal parameter $\theta_{preferred}$ can correspond to a fully compact state, a fully opened state, or an intermediate state in between. This can change or impact the energy and force required to maintain the structure at each state. For example, a fully expanded cylinder structure can be biased to stay open (in an open state) and require a force to be applied thereto remain closed (in a closed state). On the other hand, a fully compacted cylinder can be biased to stay closed and require a force to be kept open. The shape bias of the structure can be determined by the method of manufacture of the surface and/or its links. If the elements and/or unit cells are formed having specific radius of curvature and twist, for example, that will be the preferred twist and angle of the component in the final structure. If the entire structure is made with a given internal parameter θ then the structure will have a specific preferred radius. Cylinders and capsules can be manufactured with a bias toward any radius of curvature, including a flat surface bias. Spheres, however, can be made with a bias toward a minimum achievable radius. This ensures that all parts of the spherical structure remain close to the surface. If a sphere is made with a bias toward another radius, it can deform when expanded or compressed.

It should be understood that the handed shearing auxetic structures described herein can be made in segments or as a single piece. For example, the structures can be made out of a single continuous piece of material by being three-dimensionally (3D) printed, or through injection molding, laser cutting, water jetting, casting, or molding in place. In some embodiments, if a structure is made from a single continuous piece, then the structure can be made with living hinges replacing pin hinges. Structures can also be made from segments formed from laser-cut/plasma-cut or water jetted strips or from cast, molded, or stamped strips. The hinges can be made from pins, rivets, screws, shoulder screws, other rotating joints, and the like. Moreover, the hinges can be made from living hinges if the strips are bonded together.

In some embodiments, handed shearing auxetic structures can be made with sections or portions thereof having different handedness (e.g., left and right, etc.). For example, multiple handed shear auxetic cylinders can be made of unit cells that are tiled or arranged together to make a shear auxetic region. Such tiling can include translations or rotations but no reflections of the unit cell. In some embodiments, these different handed portions or regions can be composed or combined together to form non-handed structures. That is, non-handed structures can be produced from handed cells by mirroring the different handed shear auxetic regions, and using each of the shear auxetic regions as a unit cell for a meta-tiling of the surface. In some embodiments, meta-tiling refers to a surface tiling that is composed of sub-tilings (e.g., different handed tiling of unit cells). In some embodiments, for each meta-tiled cylinder or capsule there can be a corresponding cylinder or capsule with the opposite handedness. The opposite handedness can be achieved through a simple flip or rotation of the original cylinder.

The handedness of shearing auxetic structures can be used or relied upon to form semi-rigid and rigid structures. In some embodiments, rigid or semi-rigid structures can be formed by globally locking multiple shearing auxetic structures (e.g., using only a few bonds). In some embodiments, semi-rigid structures refer to structures that can be open biased or that can hold themselves open, but can be twisted to collapse with a relatively low twisting force in one direction. Locked structures can be formed for any level of structural openness to produce a stable to semi-stable (or rigid or semi-rigid) state by combining structures of different handedness. This can be accomplished by either concentrically, or in parallel, connecting multiple structures of different handedness. The connections for the connected points of the multiple structures can set or establish a fixed distance and/or angle relative to each other. In some embodiments, bonding or joining of multiple structures can be performed using, for example, pins, bolts, glue, welding, sewing, screws, crimps, zip ties, and/or other components or methods known to those of skill in the art for preventing shear and separation.

For example, two concentric handed shearing auxetic spheres can be joined or bonded using pins that can connect the poles of the spheres. Connecting the poles of the spheres can lock the position and orientation of the structures relative to one another. In some embodiments, a single pin or connection can be placed on the poles of the concentric spheres, enabling the spheres to rotate relative to each other. A second pin can be used to lock the caps of the spheres to one another, thereby fixing the position and orientation of the spheres relative to each other, resulting in the spheres needing to twist together. By virtue of using such pins or connections at both poles of the spheres, a semi-rigid state can be created.

In some embodiments, locking two concentric handed spheres (e.g., right-left, or left-right spheres) can cause the outer sphere to contract and the inner sphere to expand when a twist movement or force is applied to the structure made up of the spheres. Since the spheres are concentric, they can lock against each other as a result of their surfaces expanding and contracting into one another, thereby preventing twisting and resisting further contraction or expansion. As a result, the structure or mechanism made up of concentric spheres is caused or enabled to remain in a rigid state (e.g., open). If the opposite twist (e.g., counter twist) is applied to the mechanism, the outer sphere can expand and the inner sphere can contract. Because the counter-twist state minimizes the energy of the inner sphere but increases the energy stored in the outer sphere, this is a semi-stable state and will not change on its own, although an outside force can be applied thereto and cause it to change states.

Figure 7B:
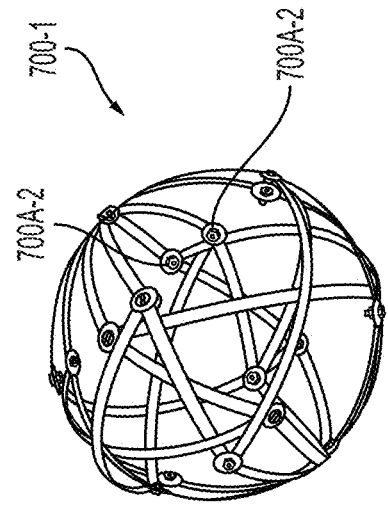
FIG. 7B illustrates a second view of the shearing auxetic half-locking mechanism of FIG. 7A, according to an exemplary embodiment.
Figure 7D:
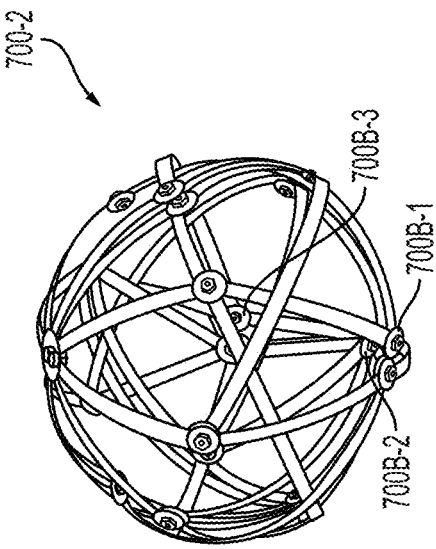
FIG. 7D illustrates a second view of the shearing auxetic fully-locking mechanism of FIG. 7D, according to an exemplary embodiment.
Figure 7A:
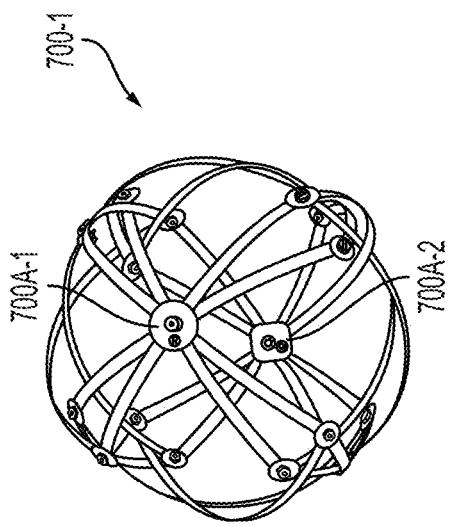
FIG. 7A illustrates a first view of a shearing auxetic half-locking mechanism, according to an exemplary embodiment.

FIGS. 7A-7D illustrate shearing auxetic structures that are composited to be stable at various deployment states despite what their individual behavior might be in the absence of interaction with another structure. For example, FIGS. 7A and 7B illustrate first and second views, respectively, of a shearing auxetic half-locking mechanism 700-1, according to an exemplary embodiment. The mechanism 700-1 is made up of two concentric right and left handed spheres 700A-1 and 700A-2. The mechanism 700-1 is referred to as a half-locking mechanism because it is configured such that a twisting of the mechanism in one direction causes the opposite handed spheres 700A-1 and 700A-2 to expand and collapse into or toward one another, such that their motions driven by the twist are resisted or prevented. A twist in the opposite direction is not locked or prevented by the concentric arrangement of the mechanism, since such a movement would cause the inner sphere to freely collapse while the external sphere freely expands, without any restriction from one another.

Figure 7C:
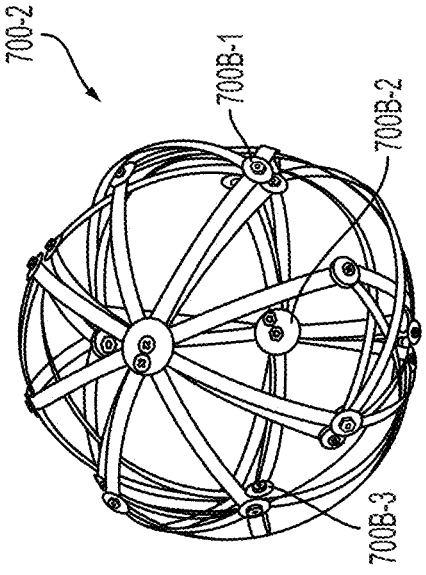
FIG. 7C illustrates a first view of a shearing auxetic fully-locking mechanism, according to an exemplary embodiment.

In some embodiments, three concentric spheres of opposite handedness along the concentric sequence can be coupled or linked to make a rigid or fully locking structure. FIGS. 7C and 7D illustrate a shearing auxetic fully-locking mechanism 700-2, according to an exemplary embodiment. The mechanism 700-2 is made up of three concentric spheres 700B-1, 700B-2, and 700B-3. The three concentric spheres are arranged, in a left-right-left or right-left-right concentric configuration. As a result, when a twist in either direction is applied to the mechanism 700-2, two of the spheres (and/or their surfaces) will compress into each other causing the surfaces or links of the structures to resist the twist force. That is, because the multi-sphere mechanism 700-2 needs to twist in order to collapse or expand, it effectively locks and becomes rigid because any twist applied thereto causes compression of two spheres into each other.

In some embodiments, two or more cylinders can be concentrically arranged and locked together using the methods and mechanisms described herein and known to those of skill in the art. For example, the links of the cylinders at one or more pairs of antipodal points near each of the ends of the cylinders can be locked or bound. Similar to half-locking and fully-locking arrangement of spheres described above in connection with FIGS. 7A to 7D, different handed structures can be concentrically arranged to provide a rigid or semi-rigid structure.

Figure 8A:
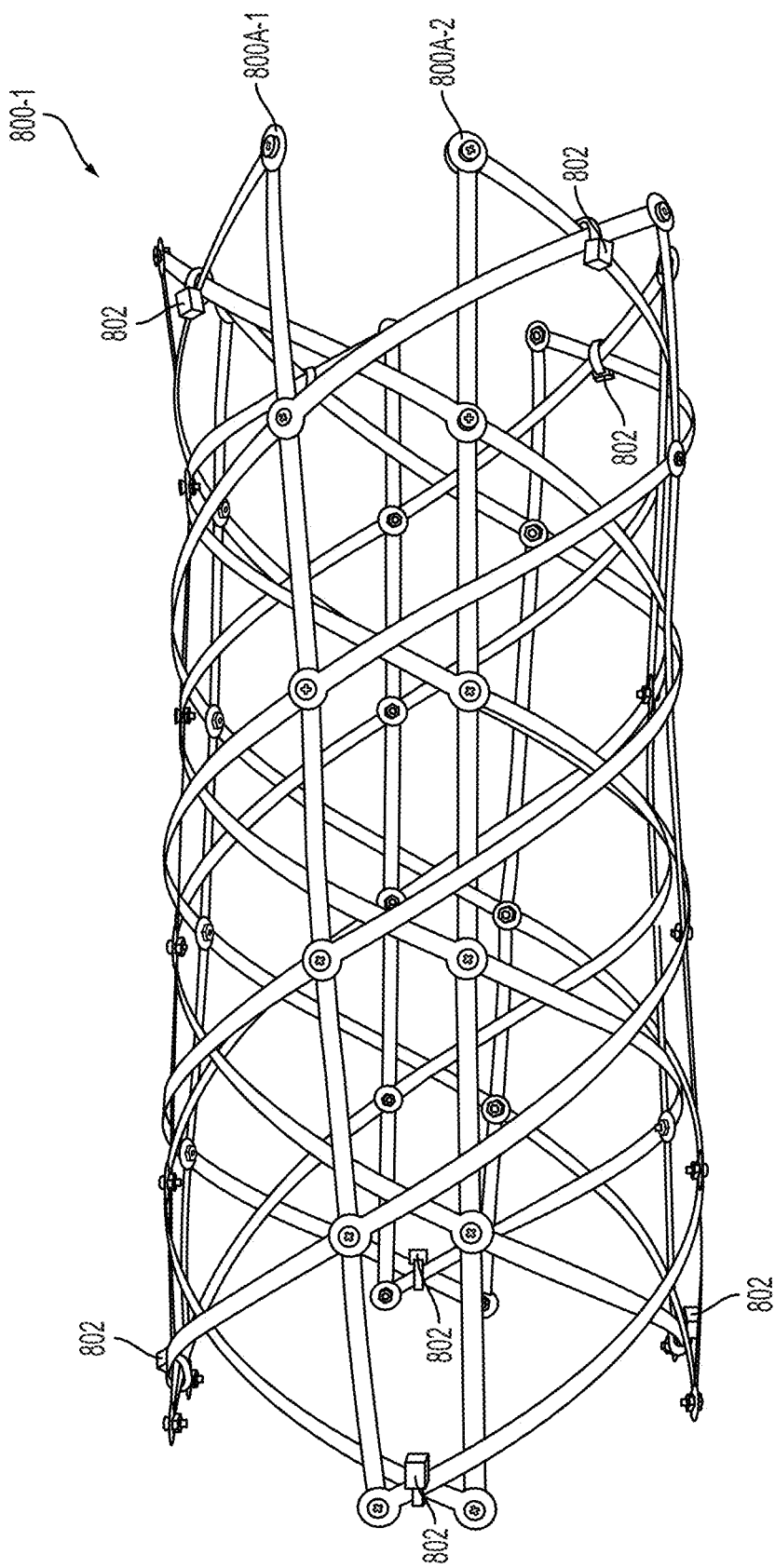
FIG. 8A illustrates a side view of a half-locking shearing auxetic cylinder mechanism, according to an exemplary embodiment.
Figure 8B:
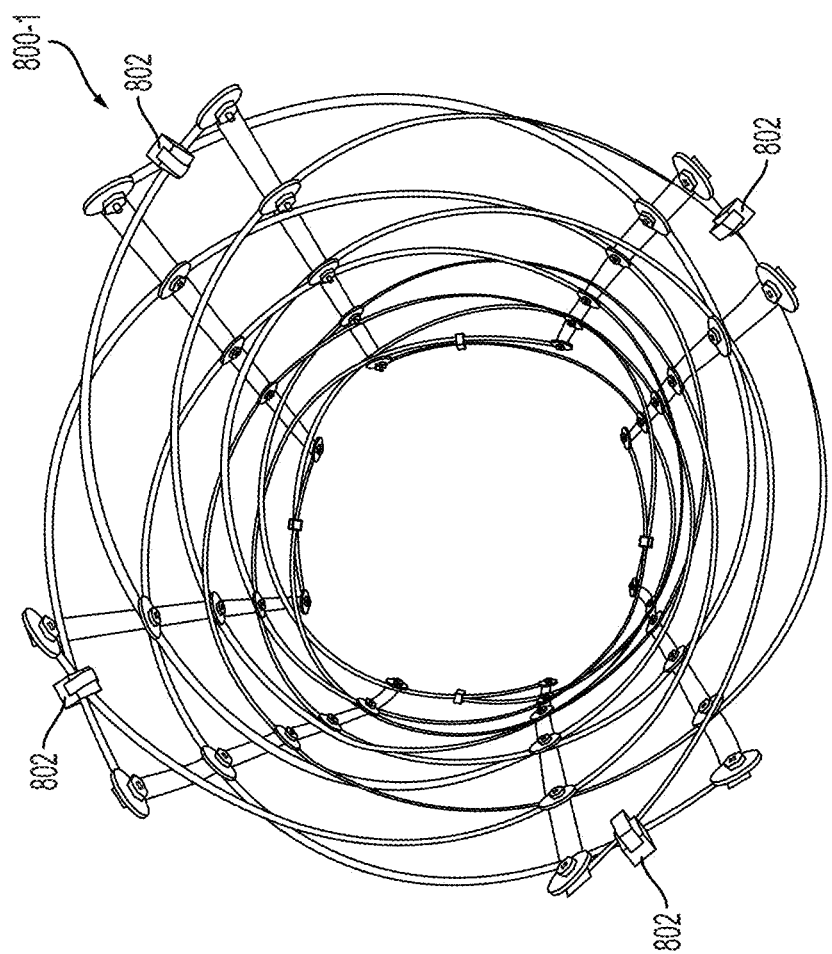
FIG. 8B illustrates a top view of the half-locking shearing auxetic cylinder mechanism of FIG. 8A, according to an exemplary embodiment.

For example, FIG. 8A illustrates a side view of a half-locking shearing auxetic cylinder mechanism 800-1, according to an exemplary embodiment. The half-locking mechanism 800-1 is made up of two cylinders 800A-1 and 800A-2 that have opposite handedness (e.g., left-right, right-left), such that when the mechanism 800-1 is twisted in one direction, the inner cylinder expands while the outer cylinder collapses. The cylinders 800A-1 and 800A-2 thus compress into each other, preventing their desired movement. However, when twisted in the opposite direction, the cylinders 800A-1 and 800A-2 do not compress into each other, and their movement is not restricted by one another. In some embodiments, locking of structures described herein can be performed using ties 802, as illustrated in FIG. 8A, which locks the cylinders 800A-1 and 800A-2 to one another. FIG. 8B illustrates a top view of the half-locking mechanism 800-1 of FIG. 8A.

Figure 8C:
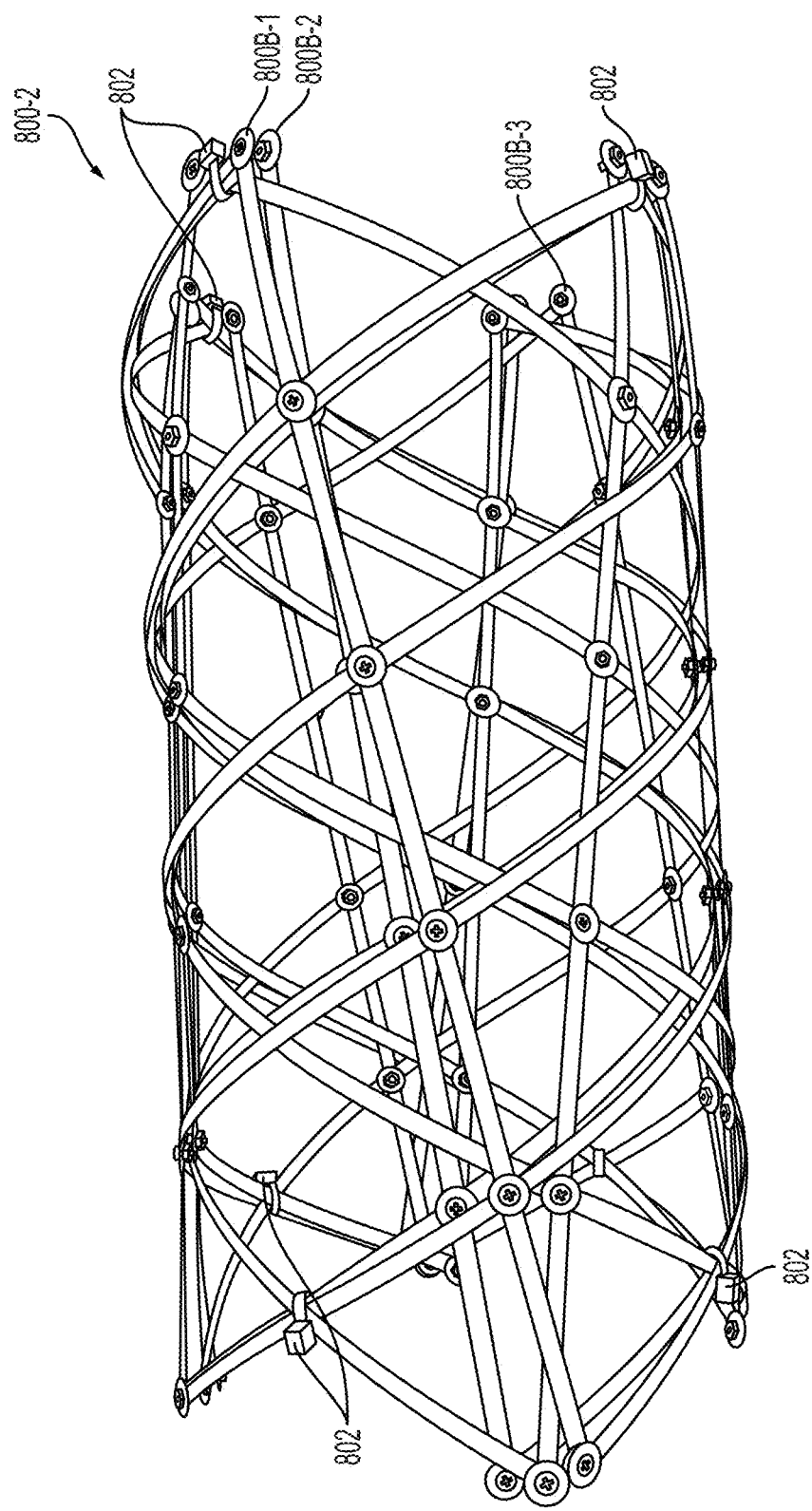
FIG. 8C illustrates a side view of a fully-locking shearing auxetic cylinder mechanism, according to an exemplary embodiment.
Figure 8D:
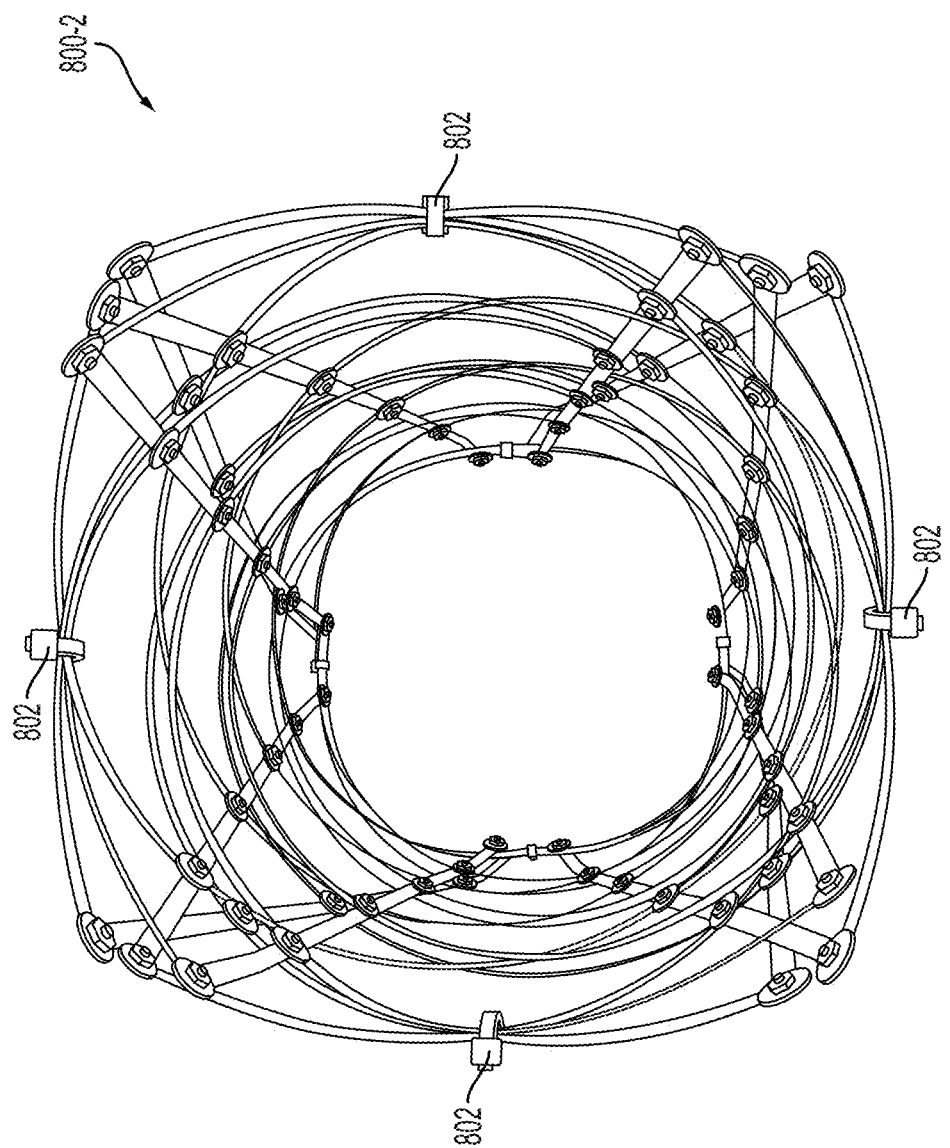
FIG. 8D illustrates a top view of the fully-locking shearing auxetic cylinder mechanism of FIG. 8C, according to an exemplary embodiment.

FIG. 8C illustrates a side view of a fully-locking shearing auxetic cylinder mechanism 800-2, according to an exemplary embodiment. The full-locking mechanism 800-2 is made up of three cylinders 800B-1, 800B-2, and 800B-3 that have opposite handedness along the concentric sequence of cylinders (e.g., right-left-right, left-right-left). By virtue of this arrangement of the handedness of the cylinders 800B-1, 800B-2, and 800B-3, the cylinders compress into one another when the mechanism 800-2 is twisted in either direction. FIG. 8D illustrates a top view of the fully-locking mechanism 800-2 of FIG. 8C.

Figure 9A:
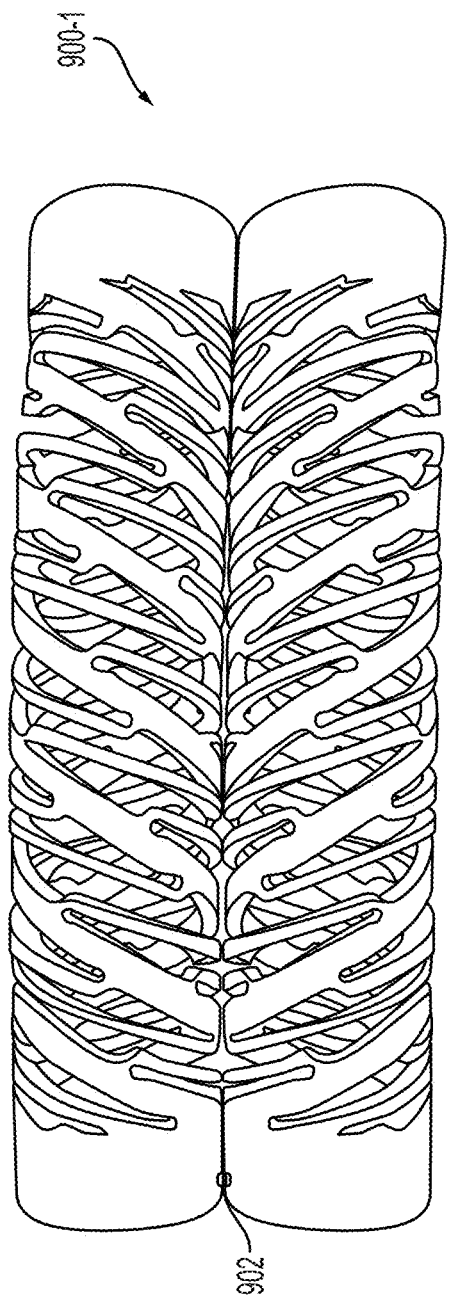
FIG. 9A illustrates a locked mechanism of parallel cylinders in a first configuration, according to an exemplary embodiment.
Figure 9B:
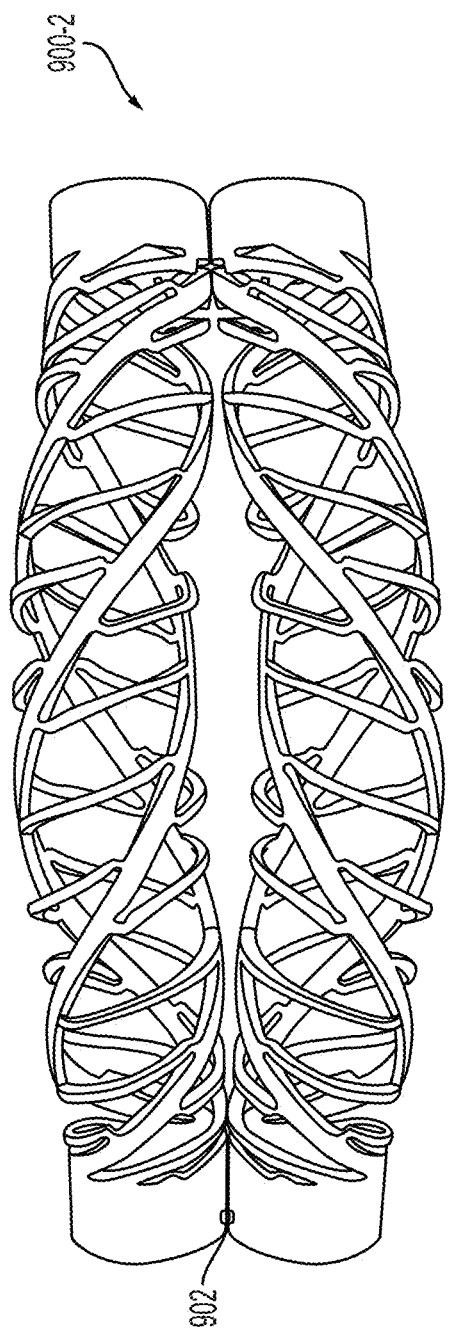
FIG. 9B illustrates a locked mechanisms of parallel cylinders in a second configuration, according to an exemplary embodiment.

In some embodiments, two or more parallel, non-concentric structures can be rigidized by connecting their ends or poles together. In such embodiments, these structures need not have opposite handedness. For example, FIGS. 9A and 9B illustrate locked mechanisms 900-1 and 900-2 according to exemplary embodiments. As shown in FIGS. 9A and 9B, the mechanism 900-1 and 900-2 are formed of cylinders that are locked or pinned to one another at each end. For example, each side of the combined structure of the set of ends can be connected with a pin 902 (visible at only one end in the figure) or other mechanism. Because the ends of the parallel cylinders (or other parallel structures, such as spheres or capsules) must rotate relative to each other in order to collapse or expand, their pinning or locking prevents relative rotation and therefore prevents them from collapsing or expanding away from their locked position.

In some embodiments, the rigid or semi-rigid structures or mechanisms that are arranged concentric or parallel to one another, as described herein, can be used as impact absorbing structures. For example, if the bond or joint between concentric structures is breakable, the system or mechanism can act as an impact absorbing structure that breaks under extreme load to soften, as dictated by the strength of the bonding or joining mechanism. In some embodiments, the rigid and semi-rigid mechanisms and structures made up of a combination of multiple handed spheres, cylinders, capsules, and other structures can be used as bridge structures, booms, mandrels, stents, protective cages, or other structures where the ability to rigidly maintain shape is desirable.

Moreover, in some embodiments, a pressure vessel or fluid container can be made from a rigid or semi-rigid sphere or capsule by combining the structure or mechanism with a flexible or elastic lining along its surface. Such a lining can be fluid and/or air tight, for example. The lining can be a separate component connected to the handed structures at one or more points, or can be fully integrated into the structure acting as a flexible, elastic, or folded skin for the structure. The lining can be placed inside, outside, or between the handed structures. When placed inside, the handed structures can provide resistance to internal pressure. When the lining is placed outside the structures, the structure can provide support against external pressure. In some embodiments, filling or access holes can be placed in the caps to allow the system to be filled. The lining can be removable and replaceable using, for example, the openings in the poles or, in other embodiments, when the structures are expanded and the system is not filled. Such a system can be useful for fuel storage pods, deployable liquid storage, transport systems, space habitats, and other mechanisms known to those of skill in the art.

In still further embodiments, a fluid conduit can be made from a cylinder or capsule with holes at both ends. Such a conduit can be a semi-rigid or rigid structure combined with a lining. The lining can be integrated into the device or removable, as noted above. The lining can be placed inside, outside, or between the handed structures. The lining can be elastic or flexible with folds in some embodiments. Moreover, in some embodiments, the lining can be a separate piece of material or integrated into the structure. Such a fluid conduit can be useful in temporary plumbing stations or when volume is a constraint on the transport of pipes. In some embodiments, such fluid conduits can be deployed inside or over other fluid conduits to patch and/or reinforce them.

As noted above, handed shearing auxetic structures can be formed from shearing auxetic patterns of unit cells. The unit cell of an auxetic structure or material can be formed of a set of elements (e.g., longitudinally rigid links, etc.) that have variable relative angles between each other but have a fixed connectivity. The auxetic trajectory of a unit cell is controlled by a phase angle, which defines the continuous deformation of the unit cell. While conventional isotropic auxetic structures can expand uniformly under applied tension, shearing auxetics can expand at different rates in different directions while shearing. Therefore, shearing auxetics do not have a single Poisson's ratio. Instead, their Poisson's ratio varies as a function of direction and phase angle.

In order for an auxetic pattern to shear and expand simultaneously, the unit cells of the auxetic pattern or structure must have $C_2$ or $C_1$ symmetry. In addition, no net shearing of the structure occurs if there are reflections or glide reflections continuously in the tiling pattern along the auxetic trajectory of the unit cells. As a result, shear auxetics are constrained to two of the seventeen wallpaper group tilings: 2222 and o in orbifold notation. As known to those of skill in the art, in orbifold notation, * represents a reflection, and integers represent rotation centers of the integer's order. Integers before or without a * are not on a line of reflection and those after a * are on a line of reflection. Moreover, x represents a repeated mirror image without a line of reflection and o represents only translations. In the orbifold notation, integers are listed next to each other, so 2222 represents four separate rotational centers of order 2 without reflections, and o represents a pattern with only translational symmetries.

Figure 10:
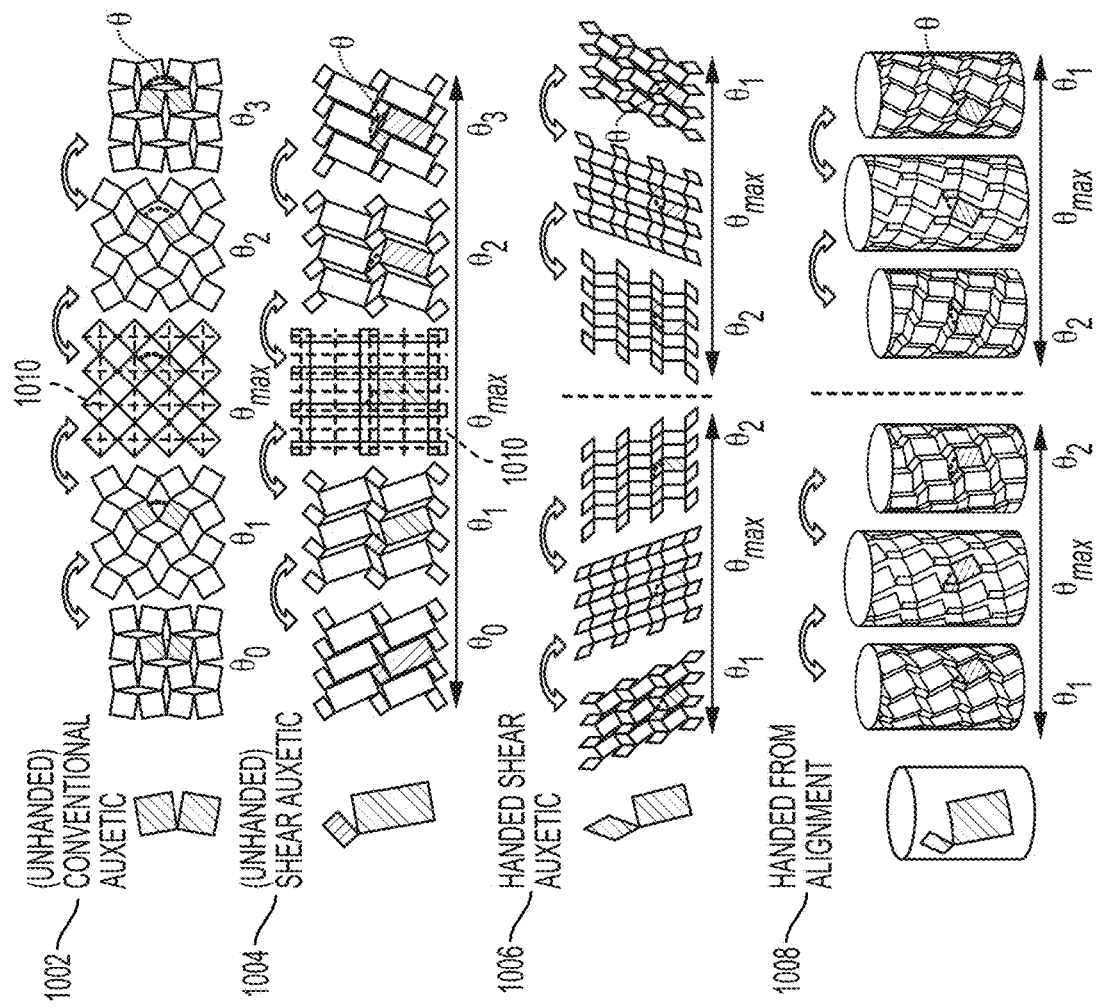
FIG. 10 illustrates patterns of unit cells along various points of their auxetic trajectories, according to an exemplary embodiment.

Auxetic structures can behave differently along their auxetic trajectories, as shown for example in FIG. 10. FIG. 10 illustrates patterns of unit cells along various points of their auxetic trajectories including $\theta_0$, $\theta_1$, $\theta_{max}$, $\theta_2$, and $\theta_3$. The patterns shown in FIG. 10 include a conventional unhanded auxetic pattern of unit cells 1002, an unhanded shearing auxetic pattern 1004, a handed shearing auxetic 1006, and a handed shearing auxetic from alignment 1008. All auxetics reach their maximum auxetic extension at a value of the phase angle θ. Further deformation from their maximum auxetic extension causes auxetic patterns or structures to either cease being auxetic or to contract, as illustrated by the unhanded patterns 1002 of FIG. 10 at points $\theta_2$ to $\theta_3$ in their auxetic trajectories (wherein they contract) or the handed shearing pattern 1006 of FIG. 10 (wherein the pattern ceases to be auxetic when pushed from $\theta_{max}$ to $\theta_2$. Because unit cells can change their shape throughout deformation of the auxetic, an auxetic pattern or tiling can transition from a 2222 or o symmetry to one that has reflections for a single point along the auxetic trajectory. The development of a line of reflection 1010 at a point along the auxetic trajectory allows a shearing auxetic that is rightward sheared to transition to shearing to the left. This produces a symmetric auxetic trajectory, and thus an unhanded shearing auxetic, as shown by series 1004 in FIG. 10. Such unhanded auxetic structures continuously shear from one direction to the other, which is equivalent to mirroring the entire structure.

On the other hand, shearing auxetic trajectories that never develop a reflection or line of reflection at $\theta_{max}$ characterize the handed shearing auxetics, such as the handed shearing pattern 1006 shown in FIG. 10 (compare pattern 1002 that always has lines of reflection 1010, pattern 1004 that has lines of reflection 1010 only at $\theta_{max}$, and patterns 1006, 1008 that have no lines of reflection). Therefore, preventing reflection symmetries at $\theta_{max}$ can generate handedness. Handed auxetics come in right and left handed pairs. Because their mirror images are equally valid tilings of space, their left- and right-handed versions have distinct auxetic trajectories. The configuration of a left-handed auxetic cannot match that of a right-handed auxetic by choosing a different θ on the auxetic trajectory.

Handedness in a shearing auxetic structure can emerge at three different levels: in the joints, in the patterning itself, or in the placement of the pattern on an oriented surface. For example, by limiting the joint angles to exclude $θ_{max}$, the symmetry of an unhanded shearing auxetic trajectory can be broken. This can prevent a shearing auxetic cell from transitioning between handedness. Accordingly, as described herein, in some embodiments, handed shearing auxetics can be generated by removing the symmetries of the constituent elements of the unit cell, as shown in FIG. 10. That is, as shown in FIG. 10, in some embodiments, the lines of reflection of the unhanded auxetic can be removed or avoided by replacing one of the rectangle shapes in the unhanded auxetic patterns with a parallelogram (compare 1002, 1004 to 1006). By virtue of providing a parallelogram in place of a rectangle, the components of the unit cell do not align to form a global symmetry at $θ_{max}$. In some embodiments, similar modifications to rigid links and links with polygons can be made to provide handed shearing auxetic patterns. For example, the above-described addition of an element C to an unhanded shearing auxetic sphere can limit the movement of the sphere in a manner that imparts a net handedness to the structure.

By way of further example, in some embodiments, a handed shearing auxetic cylinder can be formed from an unhanded shearing auxetic pattern as described herein. A planar unhanded shearing auxetic pattern can have a natural orientation along the direction of its emergent lines of reflection 1010, as can be seen in FIG. 10. As known to those of skill in the art, a line of reflection refers to a line over which, if a unit cell can is flipped, two mirror images that jointly make up the unit cell are formed. When the lines of reflection align with the circumferential or longitudinal directions of a cylinder, as shown with reference to the unhanded auxetics illustrated in FIG. 10, the cylinder is unhanded. On the other hand, when the lines of reflection do not align with the circumferential or longitudinal direction of a cylinder, the cylinder is handed. That is, in some embodiments, the angle between the lines of reflection and the longitudinal axis and circumferential axis of a cylinder can determine the handedness of the cylinder.

A shear auxetic tiling or pattern on the surface of a cylinder or sphere couples or dictates the radius, height, and orientation of the cylinder or sphere to a twist action around or about the central longitudinal axis of the cylinder or sphere. Accordingly, to make shearing auxetics, the constraints on the structures of the cylinder or sphere can be adjusted. Planar and space filling auxetics can have zero principle curvature and can be made of rigid elements. However, the surface of a sphere or cylinder has directions of non-zero principle curvature, meaning that, as the surface of a sphere or cylinder expands, the radius of curvature on its surface changes. As a result, the unit cell tiling of the surface of the cylinder or sphere can be formed from flexible elements that can bend and twist.

In some embodiments, handed auxetic cylinders and spheres can be formed using strips of spring steel (e.g., 0.01-inch thickness). In some embodiments, spheres can be constructed with a 44 symmetry of unit cells and cylinders can be constructed with a 224 pattern, as shown in FIG. 11, which illustrates a planar 224 pattern 1100 designed based on the unit cell of the re-entrant honeycomb auxetic tiling. Such cylinders can substantially expand (e.g., by more than 600 percent in length and more than 250 percent in width) between their fully contracted and fully extended states. In some embodiments, the strips of spring steel forming the links of the unit cells can be pre-bent to bias the structure to specific points along the auxetic trajectory. In some embodiments, cylinders can be constructed with 223 symmetry from continuous materials such as tubes of polytetrafluoroethylene (PTFE or Teflon) using a laser cutter.

In some embodiments, handed shearing auxetics can be generated by changing the symmetries of conventional unhanded auxetic patterns. The cells move along the auxetic trajectories by varying θ, as shown in FIG. 10. At the point of maximum auxetic extension (shown by $θ_{max}$ in the figure but, as noted above, the point of maximum auxetic extension need not align with a maximum value of θ), the auxetic pattern is either symmetric or ceases to be auxetic. To be symmetric, $θ_2$ must be a reflection of $θ_1$. If an auxetic shears and it is not symmetric around $θ_{max}$, it is a handed shearing auxetic and a vertical mirror switches between the handed patterns. Thus, as described herein, unhanded shearing auxetics tiled on a cylinder can produce a handed auxetic cylinder. That is, an unhanded shearing auxetic pattern can be tiled over a surface in a manner that imparts a net handedness on the structure.

In some embodiments, rigid composite handed shearing auxetic structures can be formed by combining right-handed and left-handed structures, such as cylinders or spheres, as shown in FIGS. 12A(1) and 12B(1). That is, FIG. 12A(1) illustrates a composite handed shearing auxetic cylinder structure 1200A according to an exemplary embodiment. The composite handed shearing auxetic cylinder structure 1200-1 can be formed of three cylinders aligned concentrically along a longitudinal central axis. FIG. 12B(B)(1) illustrates the handedness and corresponding force of the cylinders of the structure 1200A. The composite handed shearing auxetic cylinder structure 1200A includes cylinders 1200-1, 1200-2 and 1200-3, having a left-right-left (LRL) handedness configuration or arrangement. The cylinder 1200-2, aligned between the other two cylinders 1200-1 and 1200-3, having an opposite handedness, turns counter to the inner and outer structures. It should be understood that other structures, such as spheres, can be used to create a composite structure similar to the cylinder 1200-A. Moreover, it should be understood that the concentrically aligned cylinders (or other structures, such as spheres) can be instead configured with a right-left-right (RLR) handed arrangement.

The ends of the cylinders 1200-1, 1200-2 and 1200-3 can be composited, bonded, joined, or the like by constraining the poles or edges of the constituent structures to share the same position and orientation. Doing so can ensure that, if there is a twist or compression of the structure 1200A and/or any of its cylinders, the ends of each cylinder move in unison. Thus, locking the poles or edges of the cylinders can affect the entire composite structure. When the LRL composite structure 1200A (or an RLR composite structure) is twisted or loaded, two antagonistic layers compress into each other, as illustrated in FIG. 12B(1). For example, the innermost layer expands while the middle layer contracts or the outer most layer contracts while the middle layer expands. Strong mechanical bonds form where the two antagonistic layers come into contact, as shown by the regions 1304 illustrated in FIGS. 13A and 13B. Thus, as the structure is twisted, the forces between the antagonistic layers increase, fixing them relative to each other. Because of the mechanical bonds formed by the area where the layers come into contact, the structure is unable to expand or contract under a load without buckling.

When locked, the composite structure 1200A is constrained to a particular θ, and the primary resistance to deformation in the constituent layers is the energy needed to deform the elements and/or hinges of the structure. In this state, other deformation modes, such as buckling of the elements, must store the energy. In essence, concentrically aligning layers or cylinders, as in the composite structure 1200A, causes the elements of the cylinders to be effectively shortened by the node points 1304 shown in FIGS. 13A and 13B where two layers come in contact with one another. By virtue of this, composite handed shearing auxetic cylinder structures, such as the LRL cylindrical structure 1200A, can have a higher compressive strength compared to like handed composite structures (e.g., LLL structures) and single cylinder structures. Further, the rigidity of composite structures (e.g., LRL composite structure) can be retained at any point along their auxetic trajectory.

FIGS. 12A(2), 12B(2), 12A(3), 12B(3), 12A(4) and 12B(4) illustrate single and multi-cylinder configurations according to alternative embodiments. The movements and forces resulting on the cylinders by applying a rightward twisting force on the overall structures are shown in FIGS. 12B(2), 12B(3) and 12B(4). The resulting configuration is shown in FIGS. 12A(2), 12A(3) and 12A(4). As can be seen in FIGS. 12A(2) and 12B(2), an arrangement 1200B in which three concentric cylinders have the same handedness (e.g., left-left-left (LLL)) causes all of the cylinders to contract when the structure is twisted in one direction. In FIGS. 12A(3) and 12B(3), an arrangement 1200C in which two concentric cylinders have opposite handedness (e.g., right-left (RL)) causes the cylinders to move in opposite directions (e.g., expand and contract). For example, a twist in one direction causes the outer cylinder to expand while the inner cylinder contracts because of their opposite handedness. Such a structure can be categorized as half-locking, as twisting in one direction will cause the cylinders to expand or contract into one another, while twisting in an opposite direction will cause the cylinders to expand or contract away from one another. In FIGS. 12A(4) and 12B(4), an arrangement of a single cylinder 1200D can result in the cylinder simply contracting (or expanding) when it is twisted in one direction. Note, however, that because the cylinder can be a handed shearing auxetic cylinder, it can resist further movement from the compacted configuration of FIG. 12A(4) in response to further twisting in the same direction. This is in comparison to, for example, an unhanded auxetic structure that can simply begin expanding again after reaching maximum contraction in response to a continued twist in the same direction (see, e.g., auxetics 1002, 1004 in FIG. 10).

Figure 12C:
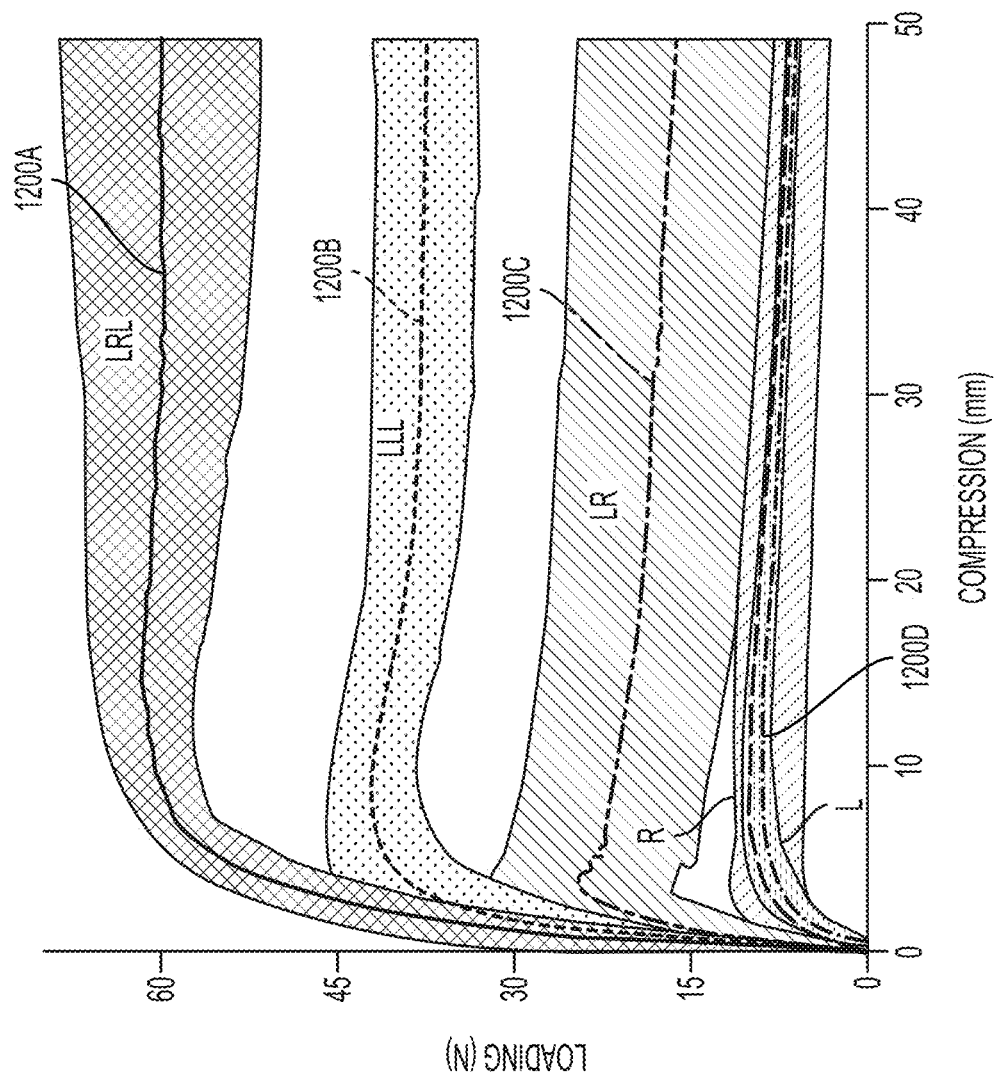
FIG. 12C illustrates different strengths of the embodiments of handed auxetic cylinders and composite structures shown in FIGS. 12A(1)-12A(4)
Figure 12G:
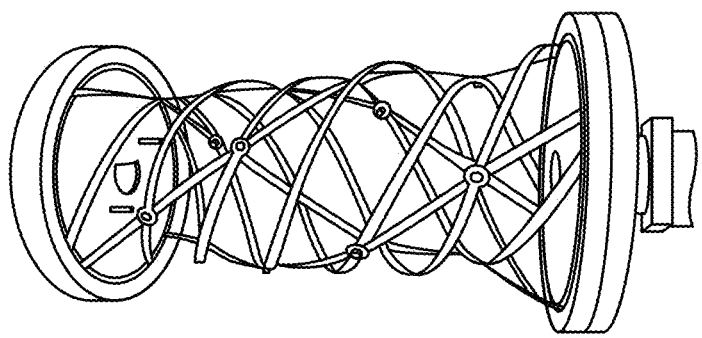
FIG. 12G illustrates a handed shearing auxetic cylinder with twisting compression, according to an exemplary embodiment.
Figure 12F:
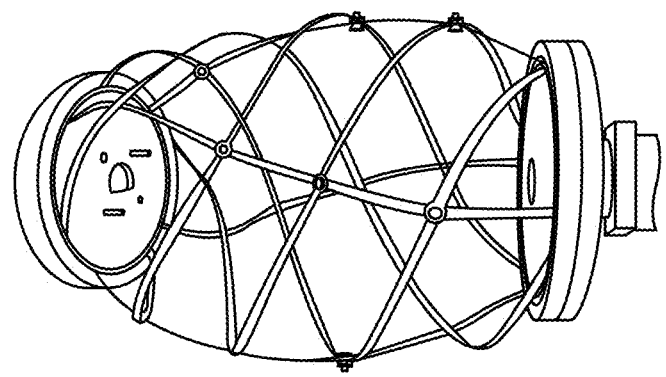
FIG. 12F illustrates a handed shearing auxetic cylinder with bulging, according to an exemplary embodiment.
Figure 12E:
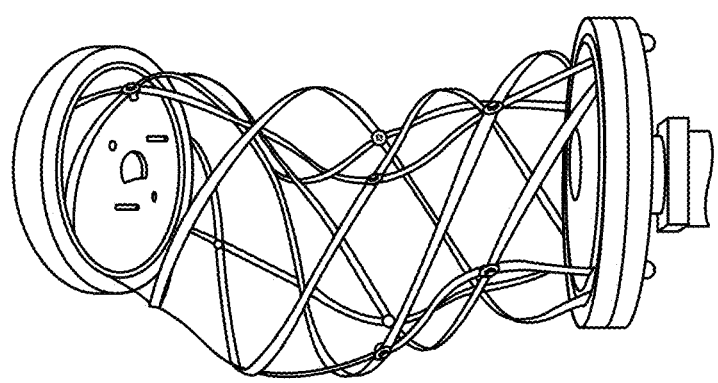
FIG. 12E illustrates a handed shearing auxetic cylinder with buckling, according to an exemplary embodiment.
Figure 13B:
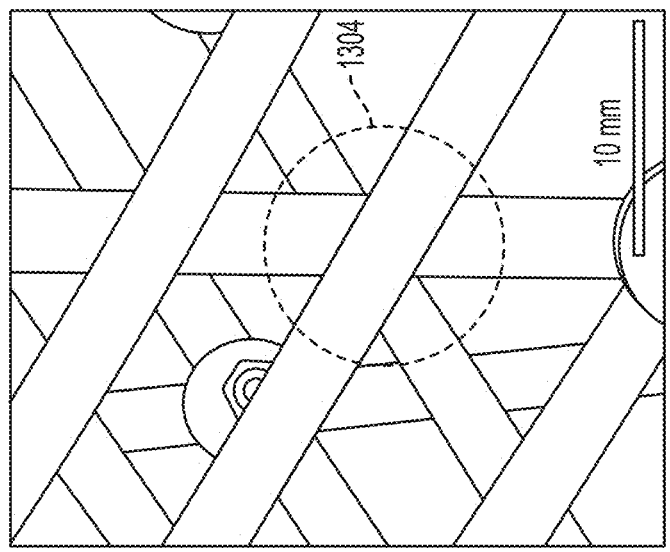
FIG. 13B illustrates another view of a node point or contact area where elements of two or more cylinders of a composite handed shearing auxetic structure make contact with each other, according to an exemplary embodiment.
Figure 13A:
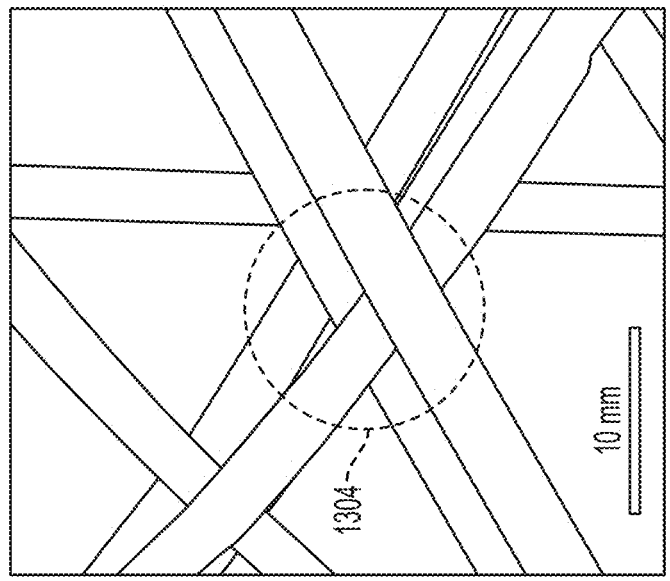
FIG. 13A illustrates a node point or contact area where elements of two or more cylinders of a composite handed shearing auxetic structure make contact with each other, according to an exemplary embodiment.

FIG. 12C illustrates the strength of the structures illustrated in FIGS. 12A(1) to 12A(4) and FIGS. 12B(1) to 12B(4). As shown in FIG. 12C, the single cylinder configuration (FIGS. 12A(4) and 12B(4)) has the lowest strength, while the three oppositely-handed (LRL) cylinder configuration (FIGS. 12A(1) and 12B(1)) has the highest strength. As described above, the contact between elements and unit cells of different layers (e.g., cylinders) of a structure can create additional strength and rigidity. Thus, a multi-cylinder structure that is oppositely-handed and actuated in a direction that causes the cylinders to contact and compress against each other can generate strength for the structure.

By way of further example, in one exemplary embodiment cylinders for composite structures (e.g., as shown in FIGS. 12A(1) to 12(A)(4)) can be formed using four 10-inch strips and four 20-inch strips cut out of ¹⁄₁₆th inch thick spring steel. Each strip can be, for example, 4 mm wide, with through-holes to fit screws and lock nuts to connect two strips in place. The composite structures can be created by sliding one complete cylinder inside another, for example, and using a plastic tie to connect two cylinders or putting both within the same aluminum end cap.

In some embodiments, these composite structures can be mechanically tested using, e.g., an Instron 3344 single column compression testing machine. The structure can be securely clamped within the instrument such that one end is static while the other can rotate. Each sample can be compressed by, e.g., 50 mm, with load (N) and compression (mm) measured. For each category of sample (L, R, LR, LLL, LRL), e.g., three samples can be measured, with each sample being measured three times.

To calculate the effective stress and effective strain, an initial diameter (e.g., 101 mm) and an initial length (e.g., 254 mm) of the spring steel composite structure can be used. The tangent modulus can be calculated through least-squares regression using the most linear section of the stress-strain curve, in order to measure stiffness. Table 1 below illustrates the stiffness of materials, according to exemplary embodiments.

TABLE 1

| Sample | Effective Stiffness (MPA) | Ultimate Compressive Strength (N) |
| --- | --- | --- |
| Left | 0.19 ± 0.01 | 8.6 ± 0.97 |
| Right | 0.20 ± 0.01 | 9.4 ± 1.3 |
| Left-Right | 0.43 ± 0.01 | 24.6 ± 2.8 |
| Left-Left-Left | 1.10 ± 0.05 | 42 ± 4.3 |
| Left-Right-Left | 1.16 ± 0.34 | 62 ± 8.0 |

Figure 12D:
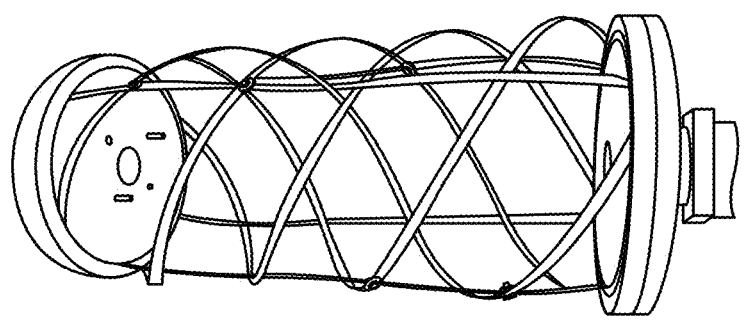
FIG. 12D illustrates an uncompressed handed shearing auxetic cylinder, according to an exemplary embodiment.
Figure 12J:
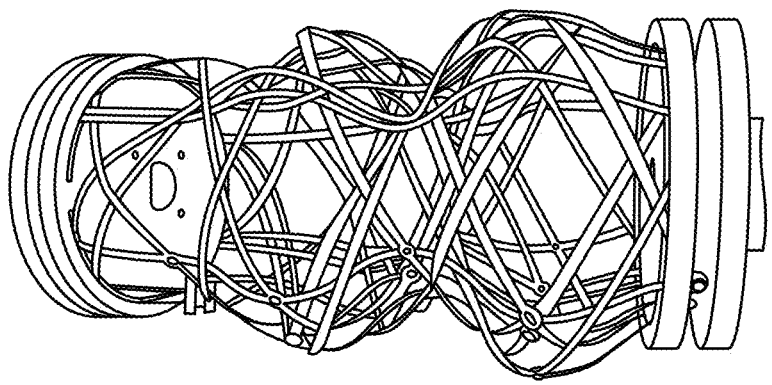
FIG. 12J illustrates a composite handed shearing auxetic cylinder structure with bulging, according to an exemplary embodiment.
Figure 12I:
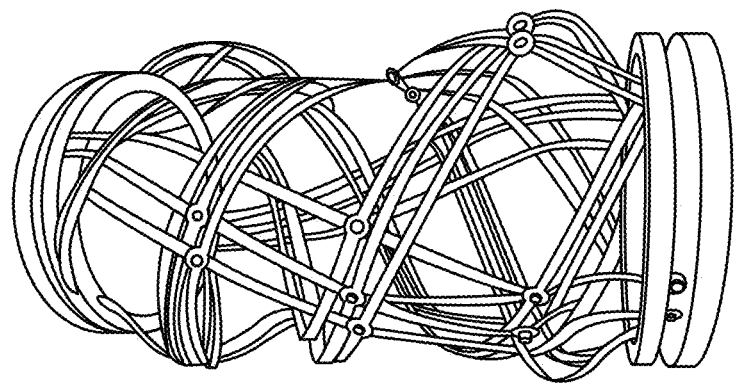
FIG. 12I illustrates a composite handed shearing auxetic cylinder structure with buckling, according to an exemplary embodiment.
Figure 12H:
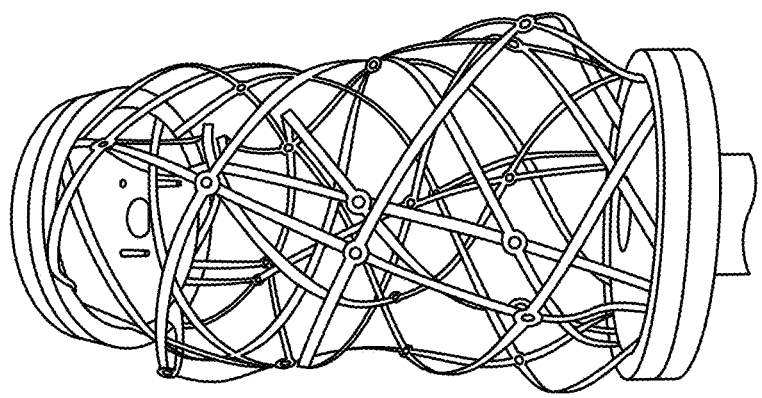
FIG. 12H illustrates an uncompressed composite handed shearing auxetic cylinder structure, according to an exemplary embodiment.

In some embodiments, upon compression of the structure, different modes of behavior can occur depending on how much torsional preload is placed or applied to the structure. For example, buckling, bulging, and twisting compression can occur, as shown in FIGS. 12D-12G. More specifically, FIG. 12D illustrates an uncompressed cylinder; 12E illustrates such a cylinder with buckling; 12F illustrates such a cylinder with bulging; and 12G illustrates such a cylinder with twisting compression. Likewise, FIGS. 12H-12J illustrate an uncompressed composite structure (FIG. 12H), a composite structure with buckling (FIG. 12I), and a composite structure with bulging (FIG. 12J). Composite structures with high rotational stiffness (e.g., LR, LRL handedness) can exhibit a combination of bulging and buckling, while composites with low rotational stiffness (e.g., L, R, LLL handedness) can experience twisting compression.

As noted above, the structures described herein can be scale independent and can be formed from a variety of materials at a variety of sizes. For example, in addition to the above-described spring steel exemplary embodiments, in other embodiments a laser cutter (e.g., a Universal 120 W laser cutter) can be used along with a rotary engraving attachment on a 1 inch diameter, 1/16th inch thick Teflon rod to selectively remove material and leave the desired auxetic pattern of elements (e.g., struts or links) and living hinges. The rods can then be bolted into three-dimensional printed caps and driven with multi-turn HS-785 HB electric motors using a servo controller, as shown in FIGS. 14A-15H. In still other embodiments, any of a variety of alternative materials, sizes, drivers, etc. can be utilized.

In addition to forming rigid composite structures, compliant composite shearing auxetic structures can also be formed. In some embodiments, compliant structures can be formed by eliminating bonds along the lengths of differently handed cylinders (in contrast to rigid structures) while maintaining the end bonds of composited structures. For example, cylinders of different handedness can be joined, bonded, or composited parallel to one another. Such joining of cylinders can be achieved, for example, by mechanically coupling their ends. Although a variety of materials can be used, in some embodiments, cylinders can be hollow and formed of Teflon. By connecting the ends of the cylinders to each other in a parallel arrangement, the cylinders can avoid interfering with each other and therefore flex substantially.

FIGS. 14A to 14D illustrate a linear actuator including a compliant composite structure 1400 formed of two parallel cylinders at different points of time in a sequence, according to an exemplary embodiment. The composite structure 1400 includes cylinders 1401-1 and 1401-2. Lower ends $L_E$ of the cylinders 1400-1 and 1400-2 can be connected to a set of gears 1402, 1404 (see FIGS. 14G-14J), while the upper ends $U_E$ can be connected to a rigid plate 1406 or otherwise coupled to one another. The lower ends $L_E$ connected to the gears can rotate counter to each other but maintain a fixed distance from one another. When the gears rotate, the composite structure 1400 can be elongated. The two counter rotating cylinders oppose each other, ensuring no net torque is applied to the rigid plate. FIGS. 14A to 14D show the composite structure 1400 at times t1, t2, t3, and t4, respectively, along an elongating sequence. As shown, as the structure 1400 elongates, it can nonetheless deflect according to external forces.

Figure 14D:
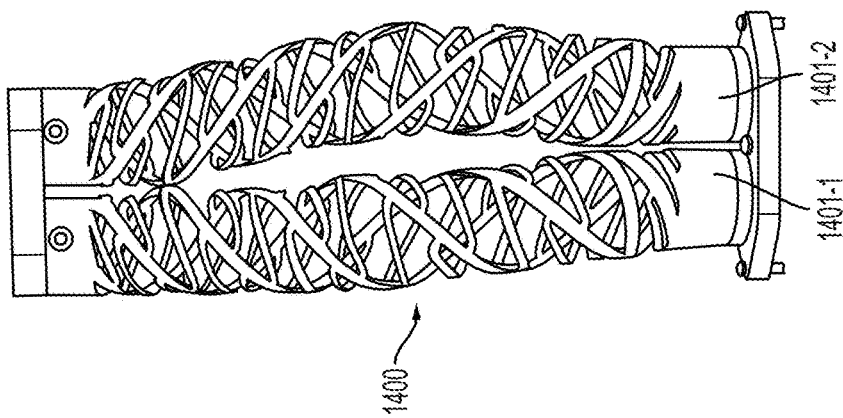
FIG. 14D illustrates the linear actuator of FIG. 14A at a fourth time point in an elongating sequence, according to an exemplary embodiment.
Figure 14C:
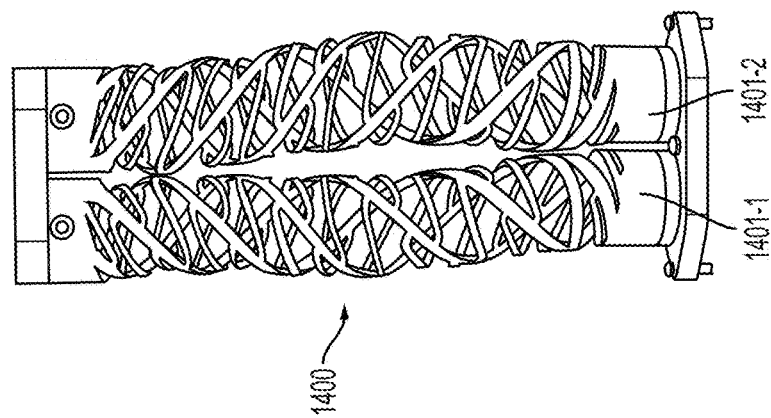
FIG. 14C illustrates the linear actuator of FIG. 14A at a third time point in an elongating sequence, according to an exemplary embodiment.
Figure 14B:
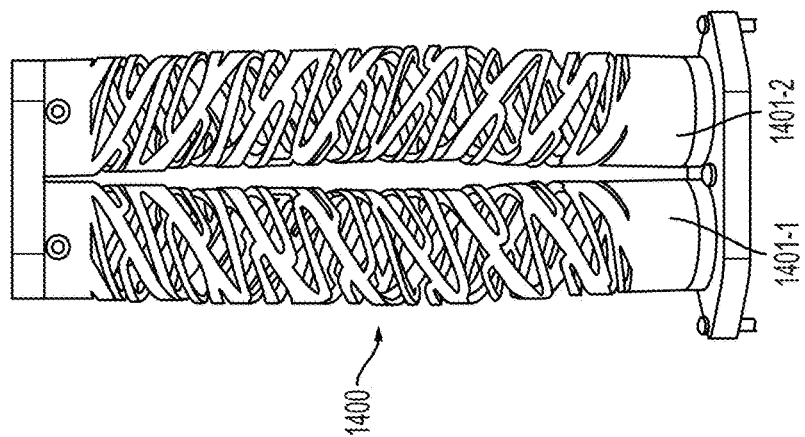
FIG. 14B illustrates the linear actuator of FIG. 14A at a second time point in an elongating sequence, according to an exemplary embodiment.
Figure 14A:
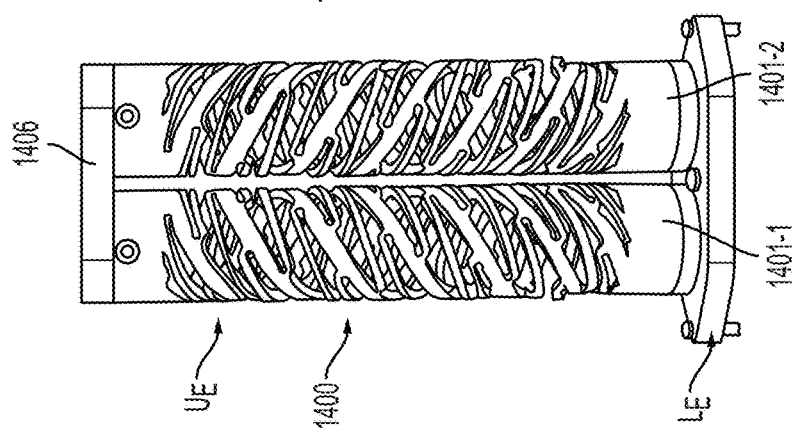
FIG. 14A illustrates a linear actuator including a compliant composite structure formed of two parallel cylinders at a first time point in an elongating sequence, according to an exemplary embodiment.
Figure 14J:
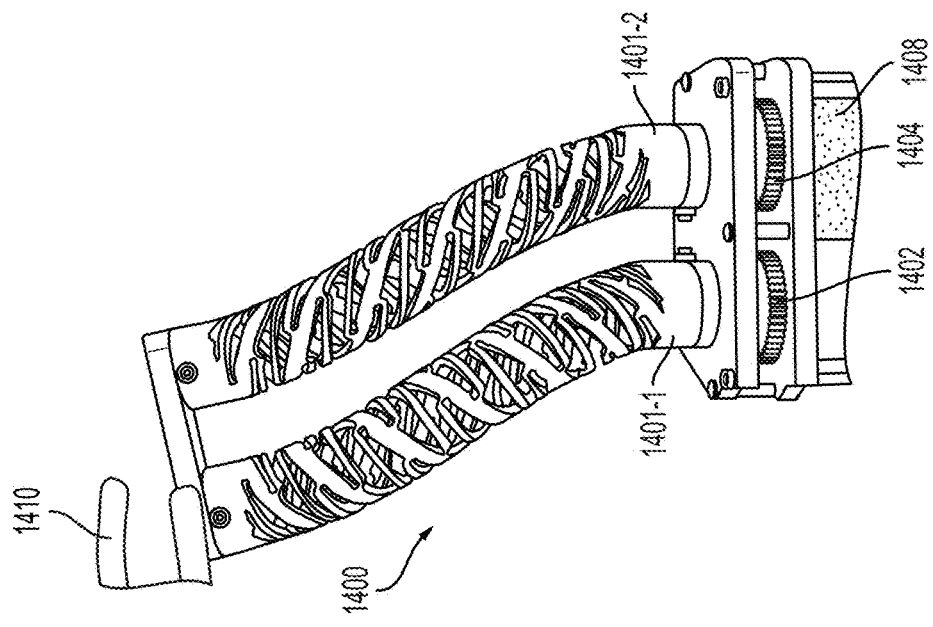
FIG. 14J illustrates a front view corresponding to FIG. 14G.

FIGS. 14E to 14J illustrate the linear actuator 1400 from different angles and experiencing different external stresses. Also shown in certain of these figures is a rotary driver 1408, such as an electric motor, that can be used to impart a torque to the cylinders 1400-1 and 1400-2. As shown in the illustrations, the electric motor 1408 can be concentrically positioned with respect to one of the cylinders (e.g., 1401-2) and can utilize the connection of the gears 1402, 1404 to impart an opposite torque on the other cylinder. In other embodiments, however, a variety of other motor positions and gear trains can be utilized, including, for example, embodiments in which independent rotary drivers can be coupled to each cylinder without utilizing the gears 1402, 1404. Further, if the cylinders 1401-1 and 1401-2 are made of deformable material, the compliant composite structure 1400 can bend, twist and/or otherwise buckle (e.g., under external loading or force). FIGS. 14G and 14J illustrate one example of this wherein a grasper 1410 is depicted drawing the upper ends of the cylinders away from an initially straight or vertical cylindrical configuration.

Figure 14I:
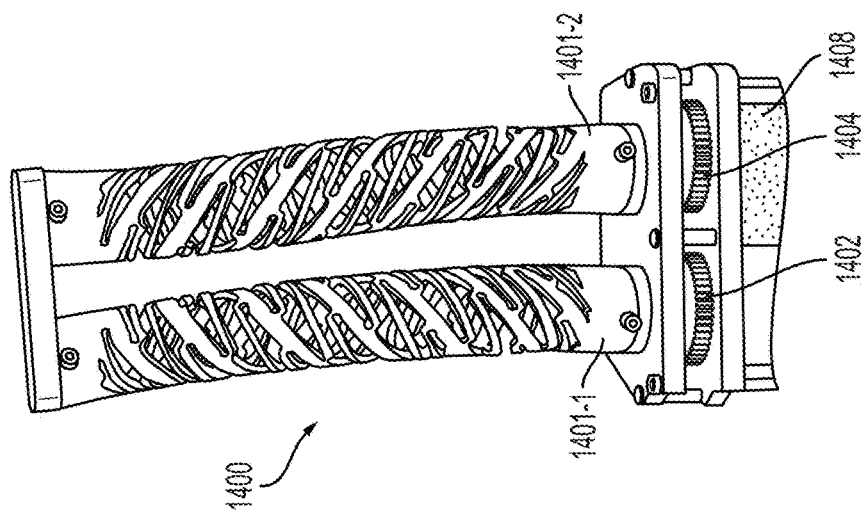
FIG. 14I illustrates a front view corresponding to FIG. 14F.
Figure 14H:
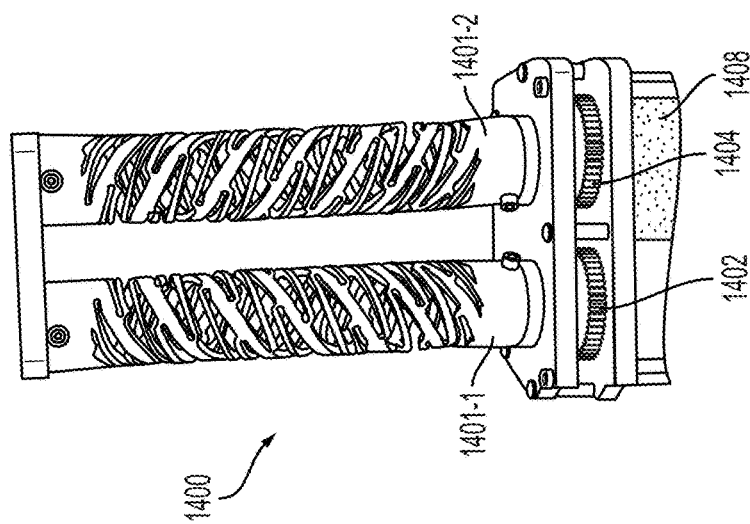
FIG. 14H illustrates a front view corresponding to FIG. 14E.

More particularly, FIGS. 14E, 14F, and 14G illustrate a side view of the compliant composite structure 1400 during a process of activating the actuator, according to an exemplary embodiment. FIGS. 14H, 14I, and 14J illustrate a front view of the compliant composite structure 1400 during the process illustrated in FIGS. 14E, 14F, and 14G, respectively. FIGS. 14E and 14H illustrate the cylinders 1401-1 and 1401-2 in an at least intermediately compressed or compact state. FIGS. 14F and 14I illustrate linear extension of the cylinders 1401-1 and 1401-2, which can be achieved activating the rotary driver 1408 to twist the cylinders in opposite directions using the gears 1402, 1404, thereby causing the shearing auxetic cylinders 1401-1 and 1401-2 to expand. FIGS. 14G and 14J illustrate bending of the cylinders 1401-1 and 1401-2 in response to external force, e.g., from the grasper 1410. As described herein, bending of one or more structures such as cylinders can be facilitated by forming the structures using a compliant or flexible material.

FIGS. 15A to 15H illustrate a multiple degree of freedom actuator including a compliant composite structure 1500 formed of four parallel cylinders arranged in a two-by-two grid of alternating right and left handed cylinders, according to an exemplary embodiment. The structure 1500 can provide a 4 degree-of-freedom composite actuator. One end (e.g., the upper end $U_E$) of each of the cylinders 1500-1, 1500-2, 1500-3, and 1500-4 of the structure 1500 can be connected to a rigid plate 1502 or otherwise coupled to one another, and the other end (e.g., the lower end $L_E$) can be constrained to a plane and attached to a rotary driver 1504, such as an electric servomotor or the like. The actuator of FIGS. 15A to 15H can allow subsections of the actuator to be activated, enabling control over linear extension, twisting, and bending in multiple directions. The handed shear auxetic composite structure 1500 can convert the rotation caused by the rotary driver into linear displacement (e.g., without the use of a screw and nut, rack and pinion, or linkage system typically found in a linear actuator). In some embodiments, the actuator can be hollow and can allow wiring or other structures to occupy or run through the center of the actuator.

As described above, subsections of the actuator (e.g., one or more cylinders) can be separately activated to provide control over linear extension, twisting, and bending in two directions. For example, in FIG. 15A, no cylinders are activated; in FIG. 15B, the front left (right handed) cylinder 1500-1 and back left (left handed) cylinder 1500-3 are activated; in FIG. 15C, the front left (right handed) cylinder 1500-1 and front right (left handed) cylinder 1500-2 are activated; in FIG. 15D, the front left (right handed) cylinder 1500-1 and back right (right handed) cylinder 1500-4 are activated; in FIG. 15E, all four cylinders are activated; in FIG. 15F, the front right (left handed) cylinder 1500-2 and back right (right handed) cylinder 1500-4 are activated; in FIG. 15G, the back left (left handed) cylinder 1500-3 and back right (right handed) cylinder 1500-4 are activated; and in FIG. 15H, the back left (left handed) cylinder 1500-3 and front right (left handed) cylinder 1500-2 are activated. As can be seen from FIGS. 15A to 15H, each distinct activation of cylinders of the composite structure 1500 can cause a different extension, twisting, and/or bending to occur.

Table 2 below illustrates mechanical properties of one embodiment of a single handed shearing auxetic cylinder (e.g., FIG. 14A, cylinder 1401-1), a linear actuator formed of two handed shearing auxetic cylinders (e.g., FIG. 14A, actuator 1400), and a robotic platform with four cylinders configured to provide four degrees of freedom (e.g., FIG. 15A, structure 1500):

TABLE 2

|  | HSA Cylinder | Linear Actuator (e.g., two handed shearing auxetic cylinders) | Robotic Platform (e.g., four handed shearing auxetic cylinders) |
|---|---|---|---|
| Unactuated System Dimensions | 152 mm long; 25.6 mm diameter | 90 mm × 24 mm × 267 mm | 160 mm × 105 mm × 270 mm |
| System Weight | 30.8 g | 351 g (with servos) | 925 g (with servos) |
| Maximum Range of Travel | 80 mm in z | 60 mm in z | 100 mm in z; 75 degrees about x, y; 225 degrees about z |

In some embodiments, the cylinders described above in connection with FIGS. 14A to 14G, FIGS. 15A to 15H, and Table 1, can be based on a 25.6 mm diameter Teflon tube having a 1.58 mm wall-thickness. The pattern can be selected so that three base units are provided around the circumference. The pattern can be laser cut into the Teflon to create the base units around the circumference, for example, using a rotary engraving attachment on a Universal 120 W laser cutter. Each tube can be bolted into 3D printed caps to pair left- and right-handed cylinders together. The cylinders can be driven by, for example, multi-turn HS-785 HB servo-controlled actuators. In one example, hysteresis tests can be performed by cyclically pulling a 92 mm long cylinder to 80 mm extension at a rate of approximately 50 mm/min three times. FIG. 15I illustrates exemplary results of such a hysteresis test. As can be seen from FIG. 15I, the freely rotating cylinder (1506) can have a stiffness of approximately 200+/−2 N/m, while the static cylinder (1508) can have a stiffness of 291+/−2 N/m. Thus, FIG. 15I illustrates that lower stiffness of the cylinders can occur when the cylinders are free to rotate and thereby extend in length.

In some embodiments, the tiling of a two-dimensional plane to generate a handed shearing auxetic structure can be performed as follows. Tiling a plane with a pattern can cause points within the pattern to repeat with a translational offset. FIGS. 16A and 16B illustrate an isotropic auxetic pattern 1602 and a shear auxetic pattern 1604, respectively, according to exemplary embodiments. A unit cell $U_C$ is the minimal structure that repeats in the tiling of the plane. The unit cells transform as a function of the internal parameter θ. Translational cells are marked with lines and dots at the intersections. The vector $\vec{T}_1$ and $\vec{T}_2$ at each point denote the translations of the cell. Isotropic auxetics 1602 shown in FIG. 16A have derivatives of the translation in line with the translation. Shear auxetics 1604 shown in FIG. 16B have $\vec{T}_1$ in line with $\vec{T}_1$ but $\vec{T}_2$ is not in line with $\vec{T}_2$.

Still with reference to FIGS. 16A and 16B, at each repeated point of the patterns, two vectors $\vec{T}_1$ and $\vec{T}_2$ are calculated or selected. The two vectors $\vec{T}_1$ and $\vec{T}_2$ point towards another repeated point, as shown in the figures. The lengths of the vectors are proportional to the distances between the points, and the lengths define the translations of the tiling. That is, the two vectors $\vec{T}_1$ and $\vec{T}_2$ can define the matrix $\overline{L}=[\vec{T}_1, \vec{T}_2]$ where the determinate of $\overline{L}$ is the signed area of the unit cell. The unit cells of the patterns (e.g., the patterns illustrated in FIGS. 16A and 16B) can transform according to a single internal parameter θ of the auxetic tiling. As the unit cells transform, the vectors can have associated derivatives such that $\overline{L}'(\theta)=\overline{G}(\theta)\cdot\overline{L}(\theta)$ where $\overline{L}'(\theta)$ defines the instantaneous transformation of the tiling, and $\overline{G}(\theta)$ is the system matrix. $\overline{L}(\theta)$ can be used to map the vectors of the unit cells for a given internal angle to another such that $\vec{T}_i(\theta)=\overline{L}(\theta)\cdot\vec{T}_i(\theta_0)$ since $$\overline{L}(\theta) = \lim_{\delta \to 0} \Pi_{i=0}^{\frac{\theta-\theta_0}{\delta}} (\overline{I} + G(\theta_i + \delta))\cdot\overline{L}(\theta_0).$$

To ensure that the periodicity of the tiling is not broken, all auxetic tilling patterns can undergo transformations of the unit cell such that transformations of $\overline{L}(\theta)$ are affine. Two types of affine transformations can occur: continuous and discrete.

Continuous transformations are defined by the auxetic trajectories that the unit cells undergo as θ varies. Continuous transformations include shearing and scaling. As the tiling undergoes continuous transformation, the affine transforms of scaling and shearing are driven by the same internal parameter θ. $\overline{G}$ is of the form $$\begin{pmatrix} g_{11}(\theta) & g_{12}(\theta) \\ 0 & g_{22}(\theta) \end{pmatrix},$$

where $g_{ij}$ is a continuous function, shears in one direction, and scales in both simultaneously. Since $\overline{G}$ is an upper triangular matrix, $\overline{I}+\overline{G}$ is upper triangular and $\overline{L}$ is upper triangular. Since $g_{11}$ and $g_{22}$ must be the same sign to have the unit cell expand or contract, the system is auxetic while det $\overline{G}\geq 0$. When tr($\overline{G}$)>0 the system is expanding, when tr($\overline{G}$)<0 the system is contracting. Therefor $\overline{L}(\theta)$ defines a trajectory in the UT(1,1) Lie group and $\overline{G}(\theta)$ defines the derivative of the trajectory in the tangent space. $\overline{L}(\theta)$ is an auxetic trajectory while det $\overline{G}\geq 0$ and is a shear auxetic while $\overline{G}$ is upper triangular.

Discrete transformations of the unit cell that are discrete affine transformations of $\overline{L}(\theta)$ represent discrete symmetries of the pattern, such as the cyclic groups and reflections. The rotation operators of a cyclic group $C_n$ are $$\bar{r}_{n,k} = \begin{pmatrix} \cos(\theta_{n,k}) & -\sin(\theta_{n,k}) \\ \sin(\theta_{n,k}) & \cos(\theta_{n,k}) \end{pmatrix}, \text{ where } \theta_{n,k} = \frac{2\pi k}{n}.$$

We can define the reflection operator $\bar{F}_\phi$ about a line of angle $\phi$ as $$\begin{pmatrix} \cos(2\phi) & \sin(2\phi) \\ \sin(2\phi) & -\cos(2\phi) \end{pmatrix}.$$

The continuous and discrete transformations form a group for the symmetries to be compatible with tiling the plane and being part of an auxetic trajectory, so $\bar{r}_{n,k}$ and $\bar{F}_\phi$ must be compatible with shearing.

The family of continuous shear transformations, S, in 2D is represented as the operators $$\bar{S}_m = \begin{pmatrix} 1 & m \\ 0 & 1 \end{pmatrix}$$

in matrix form, where $m \in \mathbb{R}$. S forms a group since $\bar{S}_m \cdot \bar{S}_n = \bar{S}_{m+n}$. There are other operators that perform shearing:

$$\bar{A}_m = -\bar{S}_m, \bar{B}_m = \begin{pmatrix} 1 & m \\ 0 & -1 \end{pmatrix}, \text{ and } \bar{E}_m = \begin{pmatrix} -1 & -m \\ 0 & 1 \end{pmatrix} = -\bar{B}_m$$

These operators, along with $\bar{S}_m$, form a group called SABE, whose multiplication table is illustrated in FIG. 17. In SABE, $\bar{S}_m$ and $\bar{A}_m$ form a first subgroup, $\bar{S}_m$, and $B_m$ form a second subgroup, and $\bar{S}_m$ and $\bar{E}_m$ form a third subgroup.

For the operators of $C_n$ to form a group with the shear operators, $\bar{r}_{n,k} \cdot \bar{S}_m$ must equal either $\bar{r}_{n,l}$, $\bar{S}_p$, $\bar{A}_p$, $\bar{B}_p$, or $\bar{E}_p$. This only occurs if $\theta_{n,k}$ is 0 or $\pi$; so, shear transforms are only compatible with $C_2$ or $C_1$ cyclic groups. In fact $\bar{r}_{2,1} = \bar{A}_0$ and $\bar{r}_{2,0} = \bar{r}_{1,0} = \bar{S}_0 = \bar{I}_2$. Therefor any group formed with $\bar{S}_m$ and $\bar{A}_m$ has $C_2$ symmetry and those with $\bar{S}_m$ without $\bar{A}_m$ have only $C_1$ symmetry.

For a flip operator to form a group with S, $\bar{F}_{\phi_n} \cdot \bar{S}_m$ must equal either $\bar{F}_{\phi_p}$, $\bar{S}_p$, $\bar{A}_p$, $\bar{B}_p$, or $\bar{E}_p$. This only occurs at $\phi=0$ or $$\frac{\pi}{2}$$

with the operators $$\bar{F}_\uparrow = \begin{pmatrix} -1 & 0 \\ 0 & 1 \end{pmatrix} \text{ and } \bar{F}_\rightarrow = \begin{pmatrix} 1 & 0 \\ 0 & -1 \end{pmatrix}$$

that represent mirrors about the X and Y-axes. In fact $\bar{F}_\uparrow = \hat{B}_0$ and $\bar{F}_\rightarrow = \bar{E}_0$. $C_1$ and either $\bar{F}_\uparrow$ or $\bar{F}_\rightarrow$ can form the $D_1$ group, $C_2$, and both F operators form the dihedral group $D_2$.

Figure 18:
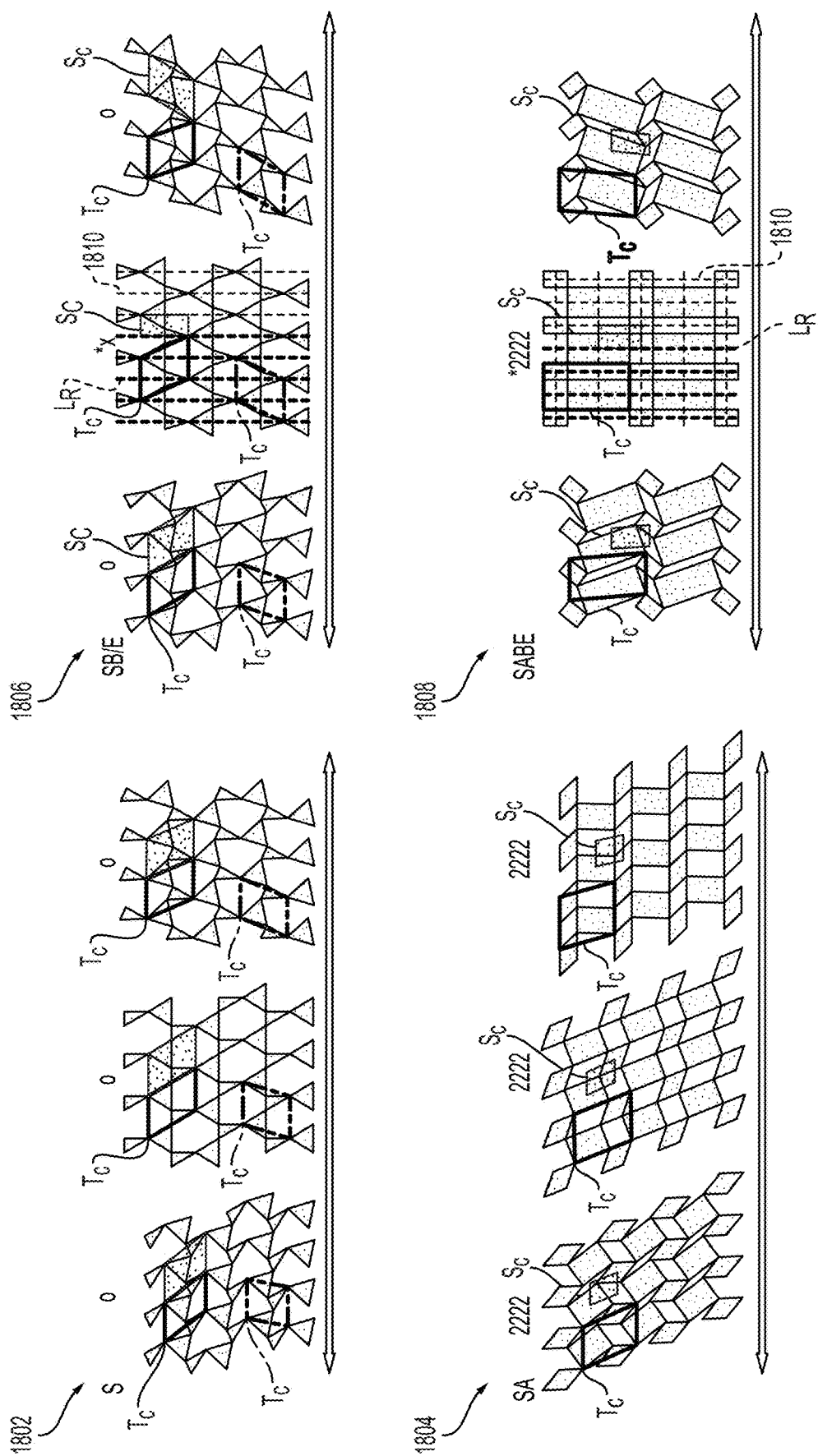
FIG. 18 illustrates four shear compatible symmetry groups, according to an exemplary embodiment.

Therefore, for a given basis, five sets of transformation operators can combine shearing with discrete transforms: $\{\bar{S}_m\}$, $\{\bar{S}_m, \bar{r}_{2,1}\}$, $\{\bar{S}_m, \bar{F}_\uparrow\}$, $\{\bar{S}_m, \bar{F}_\rightarrow\}$, and $\{\bar{S}_m, \bar{r}_{2,1}, \bar{F}_\uparrow, \bar{F}_\rightarrow\}$. These sets each have a group structure and are subgroups of the SABE group. FIG. 18 illustrates shearing auxetic pattern groups, according to an exemplary embodiment. The translational cells are marked as $T_C$; the symmetry unit cells are marked as Sc, and lines of reflection are marked as $L_R$. The S (1802) and SA (1804) groups are handed auxetics, shearing and expanding, and then become non-auxetic at maximum extent. The SB/E (1806), and SABE (1808) groups develop reflections at maximum extent and are unhanded. S and SB/E are $C_1$ symmetric, and SA and SABE are $C_2$ symmetric.

As shown in FIG. 18, the group with elements $\bar{S}_m$ is the group S (1802); the group with operators $\{\bar{S}_m, \bar{r}_{2,1}\}$ is the group SA (1804); and the groups $\{\bar{S}_m, \bar{F}_\uparrow\}$ and $\{\bar{S}_m, \bar{F}_\rightarrow\}$ both represent $D_1$ with a shear, therefore they are the same group SB/E (1806). Thus, the four shear compatible symmetry groups illustrated in FIG. 18 include: group S (1802) with no discrete symmetries; group SA (1804) with $C_2$ symmetry; group SB/E (1806) with $D_1$ symmetry; and group SABE (1808) with $D_2$ symmetry.

The SABE (1808) and SB/E (1806) groups illustrate how reflection symmetries can be compatible with net shearing. While a tiling of rhombi (e.g., parallelograms with $D_2$ symmetry) can each individually shear, the net tiling has aligned lines of reflection 1810. By placing the repeated points at the intersection of lines of reflection 1810, there is no net shear, simply scaling. Reflections or glide reflection symmetries in the tiling prevent the system from having a net shear since every right-handed shear is paired with a left-handed shear. Therefore, $D_2$ or $D_1$ symmetry cannot be present in the tiling throughout the auxetic trajectory and result in a shear auxetic. However, $D_2$ and $D_1$ symmetries can exist for a single $\theta$ of the auxetic trajectory.

If one can apply a reflection operator on any arbitrary point along an auxetic trajectory and reach another point on the same auxetic trajectory, then either that point $(\theta_1)$ must map onto itself or another point $(\theta_2)$ along the trajectory. If it maps onto itself, the unit cell is symmetric under reflections at that point. If it maps onto another point, then det $\bar{L}(\theta_1)$=det $\bar{L}(\theta_2)$. Because the reflection operators are their own inverse, $\theta_2$ must map to $\theta_1$ under reflection, creating a bijection. Therefore, one-half of the range of $\theta$ must map onto the other half and there must be one point $\theta_r$ that maps to itself or each point on the trajectory maps to itself. If half the trajectory maps onto the other, then the function det $\bar{L}$ is symmetric around $\theta_r$. The point $\theta_r$ therefore must be where $$\frac{\partial \det \bar{L}}{\partial \theta} = 0.$$

This means that a shearing auxetic cell cannot shear and expand through a point where it develops a reflection symmetry. SB/E (1806) and SABE (1808) therefore represent auxetic trajectories that develop momentary lines of reflection.

Accordingly, the wallpaper groups that are compatible with shearing are as follows. Group S (1802), with no discrete symmetries, is part of the o pattern in orbifold notation; group SA (1804), with only $C_2$ symmetries, represents the 2222 pattern; group SB/E (1806), with a single reflection direction, represents o patterns that become ** or *x; and group SABE (1808) has a 2222 pattern which at a single $\theta$ is *2222, 2*22, or 22*. S and SA are inherently handed since they are not symmetric under reflection. SB/E and SABE are unhanded since they are symmetric under reflection.

The auxetic trajectory of the handed shearing auxetic patterns described herein can, in some embodiments, be bound to conditions as follows. For example, analyzing the auxetic trajectory can provide insights into the symmetries of the system and the system's maximum extent. When det $\bar{G}$=0, three things can happen: First, there can be a momentary zero crossing, tr($\overline{G}$)=0 and $g_{ii}$ return to their previous sign as θ varies, and the system remains auxetic and expanding/contracting. The second option is tr($\overline{G}$)=0 and $g_{ii}$ both switch sign (positive to negative or negative to positive). In this case, the system switches between shearing and expanding to shearing and contracting. The third option is tr($\overline{G}$)≠0 and $g_{11}$ and $g_{22}$ take on different signs from each other, and the system stops being auxetic at that point. This is connected to det $\overline{L}(\theta)$, the area of the unit cell, by its derivative.

$$\frac{\partial \det \overline{L}}{\partial \theta} = \det \overline{L} * \operatorname{tr}\left(\overline{L}^{-1}\frac{\partial L}{\partial \theta}\right) = \det \overline{L} * \operatorname{tr}\left(\overline{L}^{-1}\overline{GL}\right) = \det \overline{L} * \operatorname{tr}(\overline{G})$$

For a trajectory in UT(1,1), tr($\overline{G}$)=0 only occurs if $g_{11}$=$g_{22}$=0. So if det $\overline{G}$=0 then $$\frac{\partial \det \overline{L}}{\partial \theta} = 0.$$

To determine if the unit cell will remain auxetic and continue expanding or contract at a point, look at the curvature (second derivative) of det $\overline{L}$ at that point:

$$\frac{\partial^2 \det \overline{L}}{\partial \theta^2} = \det \overline{L} * \left(\operatorname{tr}(\overline{G}^2) + \operatorname{tr}\left(\frac{\partial \overline{G}}{\partial \theta}\right)\right) = \det \overline{L} * \operatorname{tr}\left(\frac{\partial \overline{G}}{\partial \theta}\right)$$

$$\text{If } \left(\frac{\partial \overline{G}}{\partial \theta}\right) = 0, \frac{\partial^2 \det \overline{L}}{\partial \theta^2} = 0$$

at that point, then the curvature of det $\overline{L}$ changes at that point, and the system remains auxetic and continues expanding/contracting as before. Should $$\operatorname{tr}\left(\frac{\partial \overline{G}}{\partial \theta}\right) \neq 0$$

at that point, then the system must switch between expanding and contracting.

These conditions are not specific to handed shearing auxetics. For example, a number of auxetic tiling patterns are known, including the double arrowhead model, the herringbone model, the inverted honeycomb model, the oblique box model, and the achiral expanding polyhedral model. These models are all made from rigid links or polyhedra and do not lie a continuous smooth two-dimensional surface. Rather, they are planar or occupy three-dimensional space without lying along a surface, e.g., the structure of a Hoberman sphere. More specifically, the double arrowhead model, the herringbone model, and the inverted honeycomb model are planar patterns that all have a point along their auxetic trajectory where they are at maximal auxetic extension and cease to be auxetic. Certain of these models, such as the double arrowhead model, can be wrapped around a cylinder, for example, but do not create a structure with net shear. This is because these models are represented as networks of rigid bar links that cannot be tiled over a curved surface because the rigid bar links cannot conform to the curved surface. Instead, curved surfaces are approximated using polygons with planar faces, e.g., a prism to approximate a cylinder, that can be conventionally tiled using the rigid bar links. Development of a net shear on the surface is not possible, however, because it requires points on the edge of the planar faces to move across the edge (i.e., around the circumference of the structure as opposed to axially along its length), an operation that would put a discontinuity into a rigid link. Net shear on a curved or compact surface, as described herein, can result from using compliant elements to tile over the curved surface, such as a cylinder. In some embodiments, this can be accomplished using compliant materials and/or element shapes having a large aspect ratio of width along the surface to height extending normal thereto to facilitate bending and twisting along the surface. Finally, three-dimensional space-filling models, such as the oblique box structure and the achiral expanding polyhedral structure, have points where they reach maximal auxetic extension and then switch between expansion and contraction.

Figure 19A:
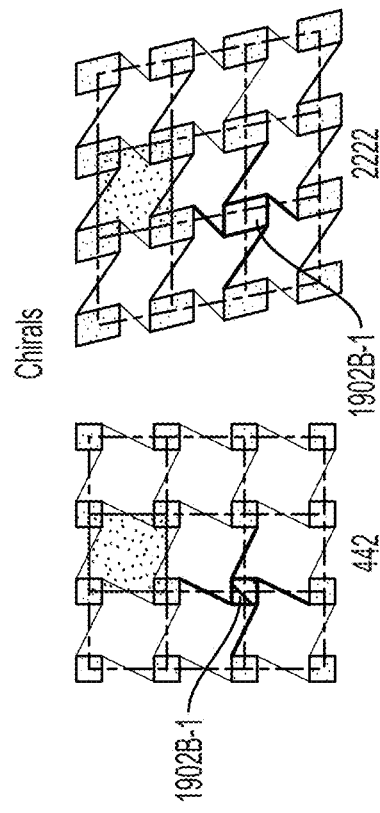
FIG. 19A illustrates the symmetry of and among unit cells or moving elements, according to an exemplary embodiment.
Figure 19B:
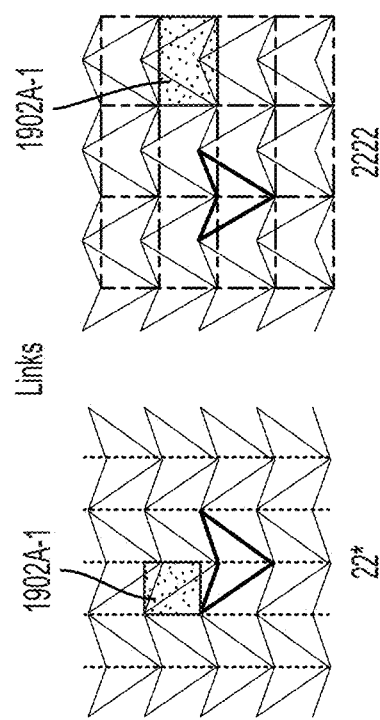
FIG. 19B illustrates the symmetry of and among unit cells or moving chiral elements, according to an exemplary embodiment.
Figure 19C:
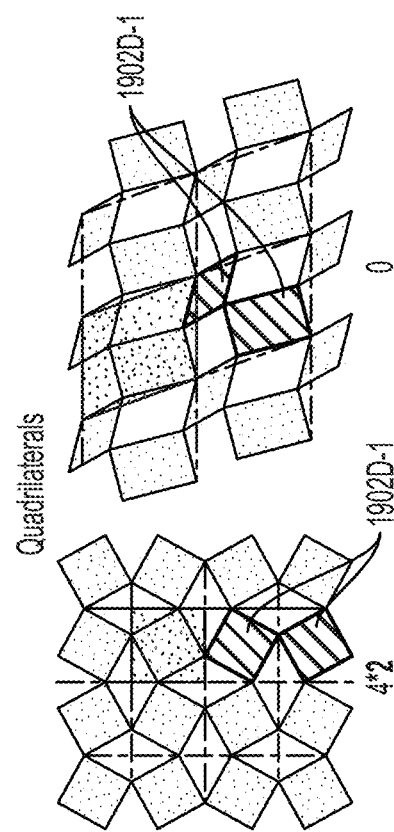
FIG. 19C illustrates the symmetry of and among unit cells or moving triangle elements, according to an exemplary embodiment.
Figure 19D:
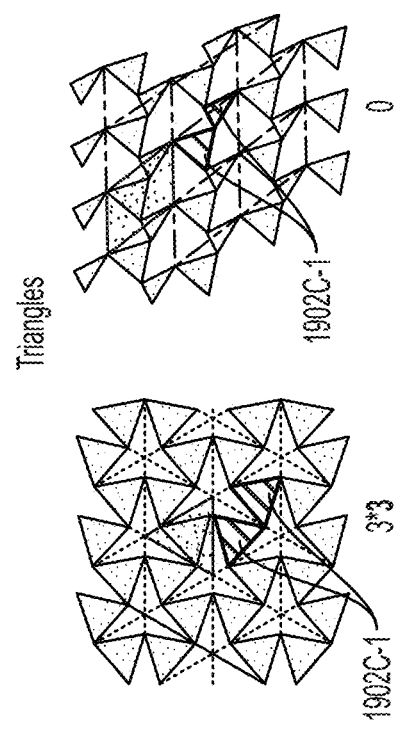
FIG. 19D illustrates the symmetry of and among unit cells or moving quadrilateral elements, according to an exemplary embodiment.

As descried herein, given the symmetries of shearing auxetics, it is possible to turn conventional auxetic patterns into shearing auxetics. As shown in FIG. 10, conventional auxetics, as well as both handed and unhanded shearing auxetics, can transition into each other by breaking or adding symmetries. FIGS. 19A to 19D illustrate how conventional auxetic patterns can have handed shearing auxetic counterparts. The moving elements 1902A-1, 1902B-1, 1902C-1, and 1902D-1 shown in FIGS. 19A to 19D, respectively, are either arranged into a 2222 symmetry or have their internal symmetries broken to produce 2222 or o symmetric tilings. More particularly, in some embodiments a handed shearing auxetic can be formed by applying a net shear to any auxetic pattern at its point of maximum auxetic extension. FIGS. 19A and 19B illustrate exemplary transformations of conventional auxetic patterns (left side of figures) to handed shearing auxetic patterns (right side of figures) as a result of a net shear applied at a point of maximal auxetic extension of the conventional auxetic pattern. In other embodiments, a handed shearing auxetic can be formed by replacing one or more of its elements to alter the dimensions of the repeating unit cell. FIGS. 19C and 19D illustrate exemplary transformations of conventional auxetic patterns (left side of figures) to handed shearing auxetic patterns (right side of figures) as a result of such replacement.

Figure 20:
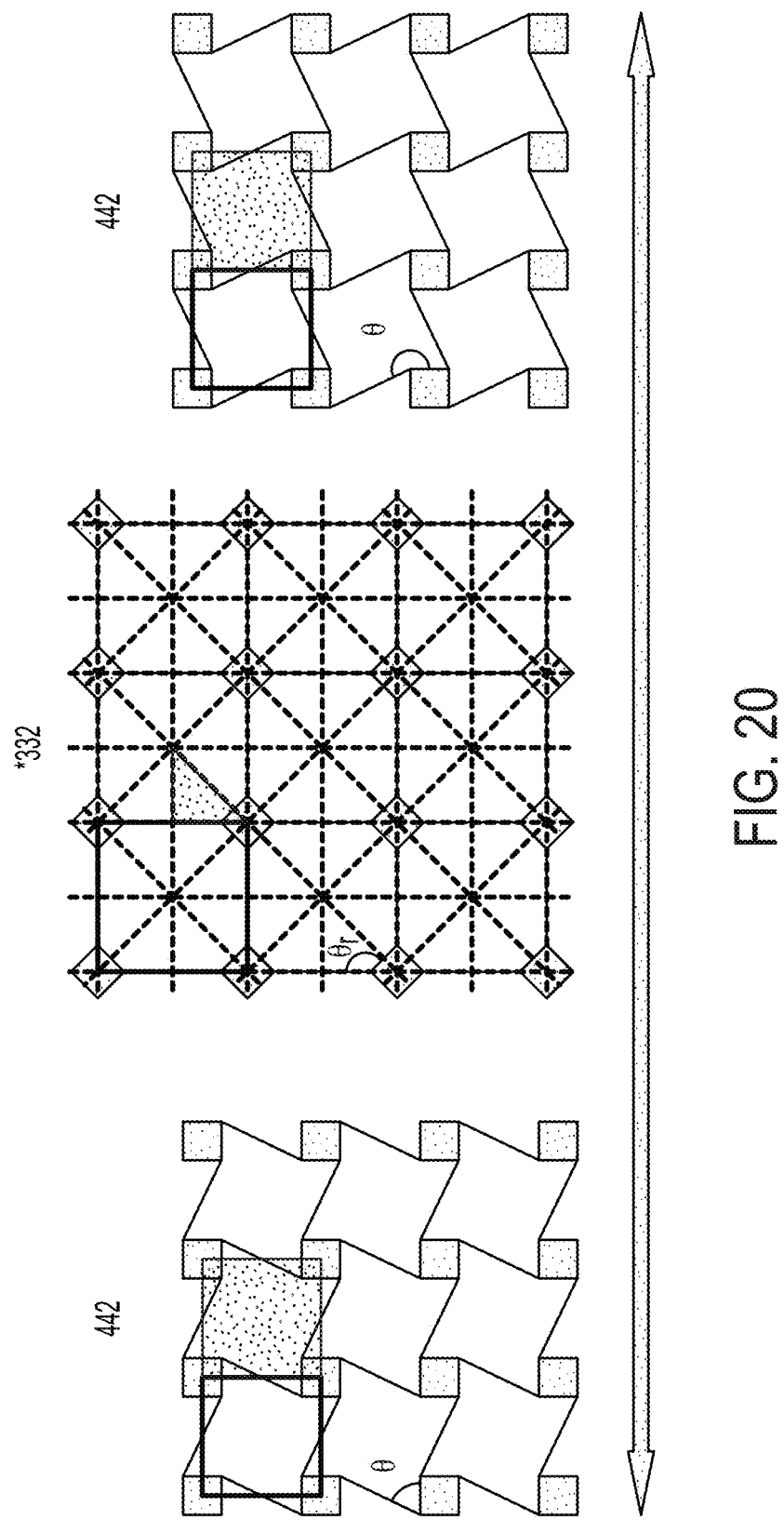
FIG. 20 illustrates the symmetry and handedness of chiral auxetics along an auxetic trajectory, according to an exemplary embodiment.

As described herein, to make a handed shearing auxetic pattern from an unhanded shearing auxetic pattern, the reflection symmetry of $\overline{L}(\theta)$ must be broken. This can be done in one of two ways. One way can be to change the symmetries of the constituent elements to eliminate emergent lines of reflection. For example, in FIG. 19A, replacing $p_4$ symmetries of one or two different rectangles with d4 symmetries turns an SABE pattern into an SA pattern. As noted above, this can be accomplished in some embodiments by applying a net shear to the structure at its point of maximal auxetic extension. In FIG. 18, SB can be turned into S by eliminating the reflection symmetry of one of its triangles. Another way can be to restrict the range of θ to exclude $\theta_r$, or to be asymmetric around $\theta_r$. For example, in FIG. 20, such handedness emerges in chiral auxetics. Right and left-handed chiral auxetics can be part of the same auxetic trajectory. Tetrachirals can be symmetric around a point with *332 symmetry. When fabricated, the elements of the chiral auxetics can be designed to prevent them from reaching the *332 point, and therefore can be handed. It should be noted that simply breaking the diagonal symmetries but keeping the vertical symmetries can produce antitetrachiral auxetics.

Handedness on a cylinder can be generated by either the alignment of the tiling on the surface, or the nature of the pattern being tiled. A handed planar shearing auxetic tiling can produce a handed cylinder since the auxetic trajectory is asymmetric. An unhanded tiling, such as SABE, SB, or SE, can generate a handed auxetic by aligning $\vec{T}_1$ at an angle to the circumferential directions at $\theta_r$. FIG. 21A shows a tiling of a cylinder using a planar SABE tiling. The cylinder is tiled with the same number of rectangular unit cells of height H and width W along the circumferential and axial directions. As $\theta$ varies, H and W change to maintain the tiling. The unit cell of the unhanded tiling is symmetric in $\theta$ around $\theta_r$ along the $\hat{1}_1$ direction. In fact, the $\hat{1}_1$ direction is a constant of the shearing tiling since $\vec{T}_1$ is always in line with $\vec{T}_1$. If at $\theta_r$, $\vec{T}_1$ is at an angle $\phi_r$ to the circumferential direction, then it will spiral around the cylinder with a right or left handed direction. If the pattern were reflected along the unhanded shearing auxetic's lines of reflection at that point, $\vec{T}_1$ would switch chirality around the cylinder. The pattern cannot shear to become the other chirality since no other point along the auxetic trajectory has the same area as $\theta_r$, so if $\vec{T}_1$ could reach the reflected angle, the pattern would not be the same. Therefore, handed cylinders can be made from planar unhanded shearing auxetic patterns.

A cylinder can be defined from a planar shearing auxetic pattern with two vectors. In FIG. 21A, a series of nodes, such as exemplary node n, can be identified such that each node is an integer number of $\vec{T}_1$ and $\vec{T}_2$ away from an origin, so each node is at $n|\vec{T}_1|\hat{1}_1+m|\vec{T}_2|\hat{1}_2$. Two vectors $\vec{A}$ and $\vec{D}$ that each point from the origin to another node so that $\vec{A}=n_A|\vec{T}_1|\hat{1}_1+m_A|\vec{T}_2|\hat{1}_2$ and $\vec{D}=n_D|\vec{T}_1|\hat{1}_1+m_D|\vec{T}_2|\hat{1}_2$ define the nodes points A and D. For the case in FIG. 21A, $m_a<0$. The point B is defined by $\vec{B}=\vec{A}+\vec{D}$. The line $\overline{AB}$ is parallel to $\overline{OD}$ and equal length, and $\overline{DB}$ is parallel and equal in length to $\overline{OA}$. Because O, A, D, and B are defined by the nodes along $\vec{T}_1$ and $\vec{T}_2$ as $\theta$ changes, the lines will keep these relations. So $\overline{OD}$ and $\overline{AB}$ can be identified with each other to make the cylinder. The bottom of the cylinder is then along $\overline{OA}$ and the top is along $\overline{DB}$. Therefore, the circumference of the cylinder is $|\vec{A}|=\sqrt{(n_A|l_1|)^2+(m_A|l_2|)^2+2n_Am_A|l_1||l_2|\cos(\theta)}$ and the N of the symmetry group is therefor $\min(n_A, m_A)$, so $$W = \frac{|\vec{A}|}{N}.$$

The area or me cylinder is $|\vec{A}\times\vec{D}|$, so the height is $$\frac{|\vec{A}\times\vec{D}|}{|\vec{A}|}$$

Further, $M=\min(n_D, m_D)$, so $$H = \frac{|\vec{A}\times\vec{D}|}{|\vec{A}|M}.$$

Figure 21B:
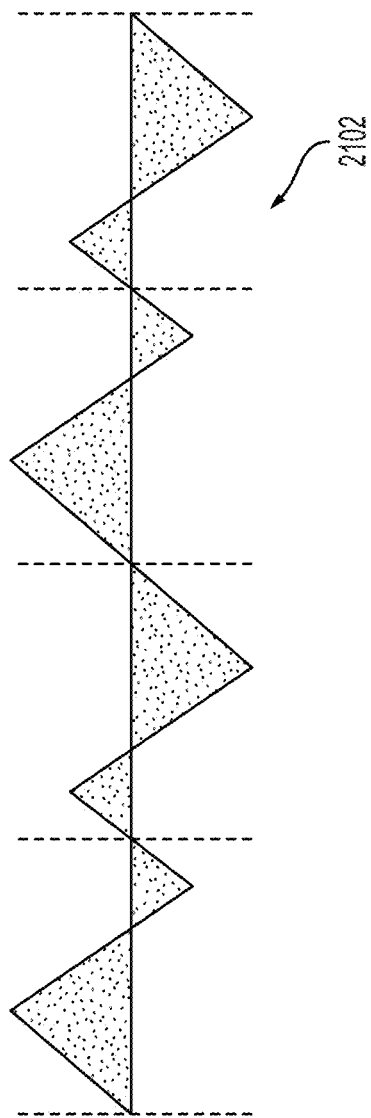
FIG. 21B illustrates a frieze pattern corresponding to the planar shearing auxetic pattern of FIG. 21A.

In some embodiments, the pattern of FIG. 21A forms a frieze pattern 2102 (e.g., a 224 pattern) relative to a circumference line of the cylinder, as shown in FIG. 21B.

A shearing auxetic cylinder cannot be approximated by a prism or made using rigid links. The sides of the prism are flat and have no curvature in any direction. The edges have infinite curvature along the circumferential direction and 0 along the axial direction. An auxetic pattern can have a point on an edge provided it moves only along the edge. Shearing auxetics require a point on the edge to move across the edge, putting a discontinuity into a rigid link. Therefore, for a point on an edge to move circumferentially, the edge must twist. When the face with a shearing auxetic pattern expands, it deforms from a rectangle into a parallelogram, moving the points on the edge of the face circumferentially, or shifting the edge vertically. If the edge moves circumferentially, they twist to form a continuous helix. However, if the parallelogram is between two helixes, then the faces are no longer flat and it no longer forms a prism. If the edges move vertically and the faces shear in the same direction, the pattern can only loop around the structure if it is constructed from separate helices made from discrete bends, since each successive edge of the faces must compound the vertical movement of the edge. Therefore, a shearing auxetic prism with net handedness cannot be used. If a net handedness is not desired, the faces at the edge can be mirrored to produce a structure that has no handedness (e.g., is unhanded), but is made from shearing auxetic patterns on the faces. This can require an even number of faces since each right-handed shear must be counter balanced by a left-handed shear.

Figure 22:
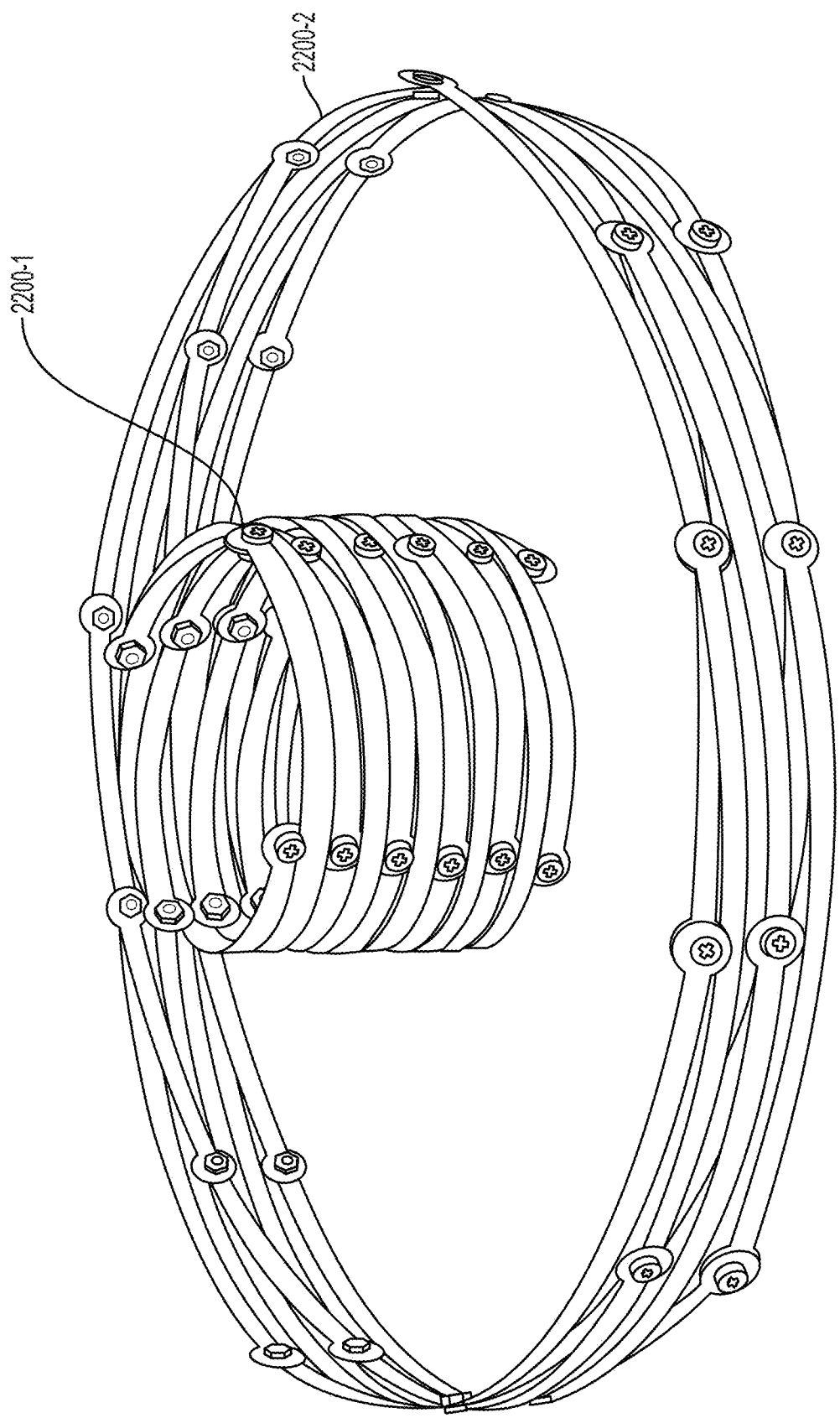
FIG. 22 illustrates two handed shearing auxetic structures at their stable configurations at opposite ends of the auxetic trajectory, according to an exemplary embodiment.

As described herein, a method of manufacture of a cylinder can bias it along the auxetic trajectory. For example, FIG. 22 illustrates two handed shearing auxetic structures 2200-1 and 2200-2 at their stable configurations at the opposite ends of the auxetic trajectory. The inner cylinder 2200-1 is bent to a specific radius and biases inwards. The outer cylinder 2200-2 is made from flat unbent strips. The pattern cut into a cylinder using laser cutting can also bias the cell to a point along the auxetic trajectory.

As described herein, shearing auxetic structures can also include spheres. FIG. 23A illustrates a series of identical parallelograms that can wrap around a sphere. FIG. 23B illustrates a tiling formed by linkages on the sphere of FIG. 23A based on the identical parallelograms, according to an exemplary embodiment. The sides can form two circles connected with link elements. As they shear, the circles can rotate relative to each other. The great circle in the middle of the parallelograms can define an equator on the sphere. Poles can be formed by tracing along great circles from the corners of the parallelograms; the point where they all intersect is a pole. The number of parallelograms along the great circle (N) can form a rotational symmetry at the poles. Thus, arbitrary rotational symmetry can be provided at the poles. Based on the conditions from shear, shearing is only compatible with $C_2$ or $C_1$ symmetry. Therefore, shearing auxetics on a sphere can only exist for patterns with 22N or NN symmetry.

In some embodiments, auxetic sphere patterns can be made from cast silicone in a 432 symmetric pattern with a $\theta_r$ where the symmetries are *432. Similar to the chiral auxetics, limiting the range of $\theta$ to exclude $\theta_r$ can produce a non-shearing handed auxetic from the structure. In such a design, the twisting can be local and each rotating section can be surrounded by counter rotating structures. Antipodal structures on the sphere can rotate relative to each other, making a local twist, but there can be no net rotation of the structure.

As shown in the various views illustrated in FIG. 23D, a 22N symmetry shearing auxetic tiling that is unhanded is provided. The system starts to the left, twists until it becomes a *22N then contracts and becomes rightward. The repeated unit of the pattern is shown in FIG. 23A. Using spherical trigonometry we can derive the angle A of the unit as a function of r, where the normalized radius $$r = \frac{\rho}{\rho_0}.$$

$$A(r) = 2\cos^{-1}\left[\frac{1}{\sqrt{2}}\sqrt{1 - \cot\left(\frac{\pi}{2r}\right)\cos\left(\frac{l_b}{2r}\right)}\right] \quad (1)$$

Since A(r) is a 1-1 function, A can be used to define r, and to describe the change in radius as a function of the change in angle, with $\theta_r$ being the point where $$A = \frac{\pi}{2}.$$

This unit linkage can be used to define a NN symmetric sphere, as shown in FIG. 23C, where linkages of different lengths F and E are separated by a fixed angle א at one pole, and a variable angle ב at the other pole. The Δϕ of a link can be calculated using spherical trigonometry such that:

$$\gamma_F = \sin^{-1}\left[\sin\left(\frac{\pi}{2r}(r-1)\right)\sin\left(\frac{F}{2r}\right)\right] \quad (2)$$

$$\Delta\phi_F = 4*\tan^{-1}\left[\tan\left(\frac{1}{4r}(F - \pi(r-1))\right)\frac{\sin\left(\frac{1}{2}\left(\frac{\pi}{2}+\gamma\right)\right)}{\sin\left(\frac{1}{2}\left(\frac{\pi}{2}-\gamma\right)\right)}\right] \quad (3)$$

Because all links repeat in the ϕ direction after $$\frac{2\pi}{N}, \Delta\phi_F + \frac{2\pi}{N} = \Delta\phi_E + א + ב.$$

If F<E then the sphere is at maximum extent at Δϕ_F=0. If we define ב =0 at $r_{max}$ then, $$א = \frac{2\pi}{N} - \Delta\phi_e\bigg|_{r_{max}}.$$

Since א ≠ ב for most r, the system is NN symmetric. If א = ב, then the system becomes 22N symmetric. FIG. 23E illustrates various views of a handed shearing auxetic sphere.

Unlike a cylinder, all forms of handed spherical auxetics can be used to make a locking structure. Handed structures with local or global shear or twists can be composited to make LRL or RLR structures. On a cylinder, handed chiral patterns would not generate a twist on the ends of the structure, so attaching the ends together would not cause the system to lock. Unhanded hemi-spheres connected to handed cylinders can be used to produce handed capsules, as shown in FIGS. 6A to 6C.

As described herein, handed shearing auxetics can be used to provide compliant actuators that can be motor driven and used for a variety of applications, including as a soft robotic platform. In robotics, compliance is a fundamental characteristic. By being able to deform their entire structure in response to loading, soft robots demonstrate significantly better safety, robustness, and grip performance than rigid robots.

Figure 24:
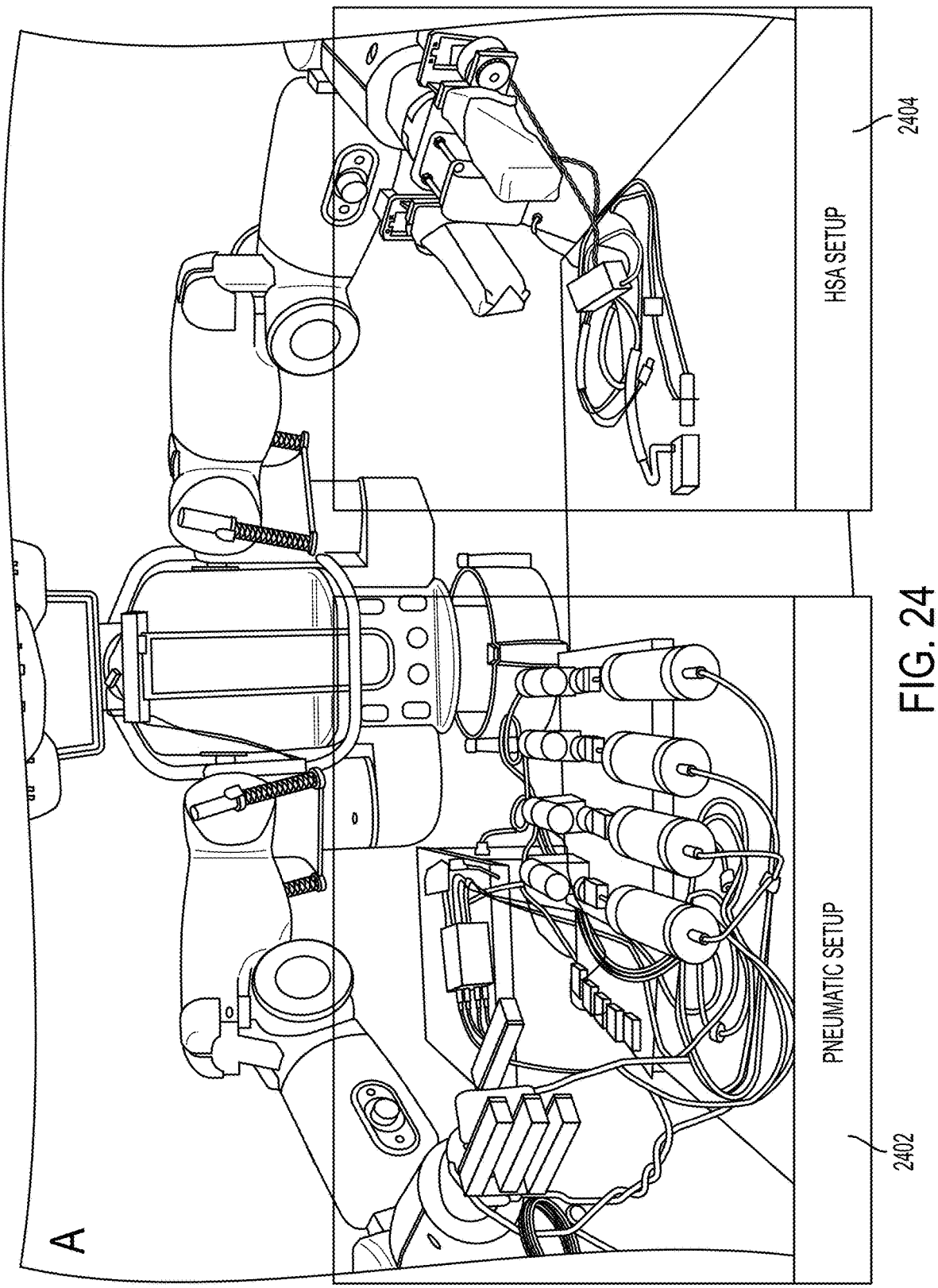
FIG. 24 illustrates a soft robotic platform including grippers formed using a pneumatic actuator setup and an electrically-driven handed shearing auxetic actuator setup.

Conventional soft robotic systems utilize fluid driven actuators, such as pneumatic, vacuum, and hydraulic actuators to create compliant soft robots. Pneumatic actuators are relatively simple to fabricate, have high strength to weight ratios, and are deformable across their length. However, since most control and power systems are electric, fluid-driven actuators require compressors, pumps, and valves to convert electric power and signals to fluid flows. This adds physical bulk, complexity, and generates power inefficiencies. Additionally, fluid based actuators suffer significant failures when punctured, limiting use outside the lab or factory environment. FIG. 24 illustrates a soft robotic platform including a pneumatic actuator setup 2402 and a handed shearing auxetic setup 2404. Notably, and as can be seen in FIG. 24, the traditional pneumatic setup 2402 includes pneumatic pistons and power supplies needed to actuate the pneumatic hand that are not required by the handed shearing auxetic (HSA) setup 2404.

Using handed shearing auxetics as compliant actuators solves or minimizes the above-mentioned shortcomings of traditional fluid driven actuators. Notably, handed shearing auxetic cylinders directly couple twists into the linear extension of a continuous medium. This allows torques from a standard rotary driver, such as an electric motor, to be translated into linear extensions. Further, handed shearing auxetic actuators do not need to contain a fluid or vacuum, so punctures do not cause system failures. Moreover, constraints on handed shearing auxetic cylinders can convert an extension into bending, just as they do for pneumatic actuators and fiber reinforced actuators, thereby enabling soft robotics through linear extension and bending.

Cylinders patterned to have handed shearing auxetic properties can be combined in sets of different handed cylinders to create a linear actuator that can substantially extend (e.g., by more than 85% its initial length), and can have a 2- or 4-degree-of-freedom (DOF) robotic platform that can pitch, roll, and heave. Moreover, the handed shearing auxetic pattern can be used to create a soft robotic gripper that can provide comparable or improved grasping performance relative to traditional systems, such as pneumatic systems. Handed shearing auxetic actuators can be significantly more space and energy efficient compared to traditional systems, have similar or better compliance, simpler construction, greater puncture resistance, and easier integration with existing robotic systems.

As described herein, auxetic materials can be defined by the material's perpendicular expansion under tension loads (e.g., the material having a negative Poisson's ratio). The auxetic property results from periodic patterns of links and joints within the material. Auxetic patterns are periodic; a single unit cell can be repeated to fill 3D space or tile 2D surfaces. The movement of the links of a single unit cell and the pattern as a whole can be driven by an angle θ between two links. As θ varies, the areas of all of the unit cells can expand or contract together.

As described above, some auxetic patterns can couple a global shearing with this expansion. For shearing auxetic materials, the area of the unit cell can increase as the unit cell itself shears. Because each unit cell can shear in the same direction, these materials can have a net shear. Since a net shear on the surface of a cylinder is the same as twisting the cylinder, a shearing auxetic cylinder can expand when twisted. Handed shearing auxetic patterns shear only towards the right or only towards the left when expanding and are unable to switch between one handedness and another, thereby providing stable left or right-handed structures which can be used as the basis for further mechanical designs. Since handed shearing auxetics can have a stable handedness, pairs of handed shearing auxetic cylinders with opposite handedness can be coupled together to enable various robotic applications.

As noted above, to twist a cylinder opposite torques can be applied to each end of the cylinder. Since right and left handed shearing auxetics are chiral to one another, when both ends of cylinders are connected to each other, each cylinder will directly oppose the other's twisting tendencies and create a self-locking structure. Thus, a pair of handed shearing auxetics is a direct analogue to a compliant linear actuator. By connecting one end of an handed shearing auxetic pairs together, the handed shearing auxetic cylinders apply counter torques to each other, creating a locked end. Thus, by applying counter torques on the opposite end (the "actuation end"), the system, structure, or mechanism can extend. To provide counter torques on the free ends of the cylinders, their ends can be connected together with gears, as shown in FIGS. 14A-14J. Turning the gears can apply opposite torques and rotational displacements to the handed shearing auxetics, causing the overall structure or mechanism to expand. In some embodiments, the handed shearing auxetic cylinders can be made out of a deformable material, thereby allowing the overall structure or mechanism to be compliant, e.g., to bend and buckle under external loading.

Figure 15A:
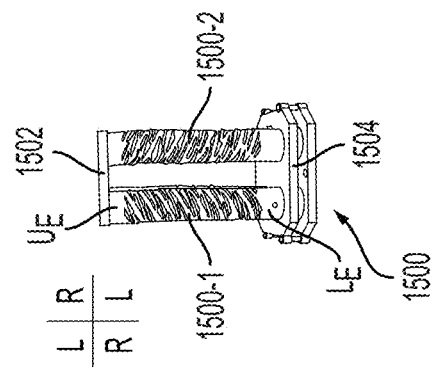
FIG. 15A illustrates a linear actuator including a compliant composite structure formed of four parallel cylinders arranged in a two-by-two grid of alternating right and left handed cylinders, activated according to a first activation pattern, according to an exemplary embodiment.
Figure 15B:
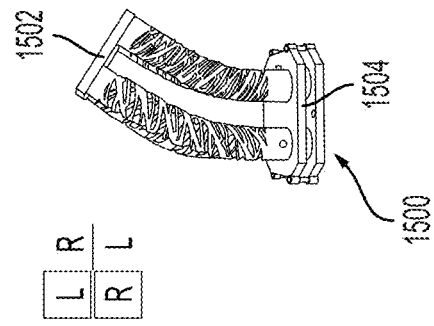
FIG. 15B illustrates the linear actuator of FIG. 15A, in which the four parallel cylinders arranged in the two-by-two grid of alternating right and left handed cylinders are activated according to a second activation pattern, according to an exemplary embodiment.
Figure 15C:
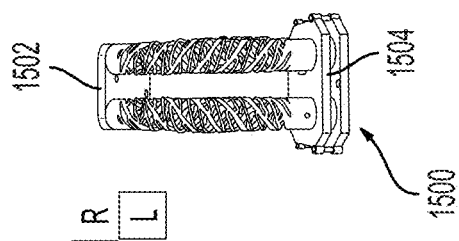
FIG. 15C illustrates the linear actuator of FIG. 15A, in which the four parallel cylinders arranged in the two-by-two grid of alternating right and left handed cylinders are activated according to a third activation pattern, according to an exemplary embodiment.
Figure 15D:
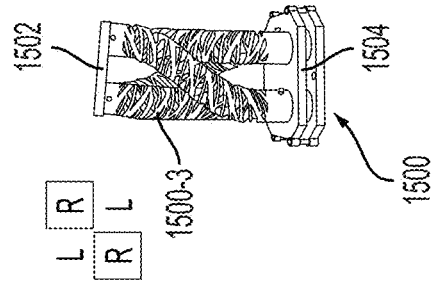
FIG. 15D illustrates the linear actuator of FIG. 15A, in which the four parallel cylinders arranged in the two-by-two grid of alternating right and left handed cylinders are activated according to a fourth activation pattern, according to an exemplary embodiment.
Figure 15E:
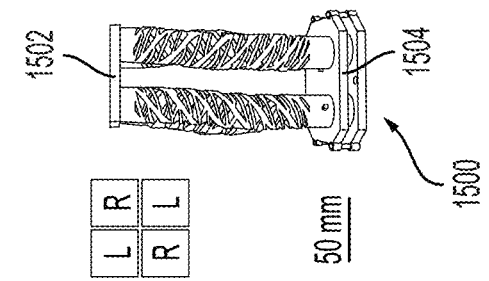
FIG. 15E illustrates the linear actuator of FIG. 15A, in which the four parallel cylinders arranged in the two-by-two grid of alternating right and left handed cylinders are activated according to a fifth activation pattern, according to an exemplary embodiment.
Figure 15F:
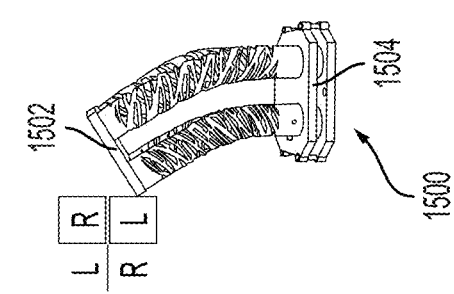
FIG. 15F illustrates the linear actuator of FIG. 15A, in which the four parallel cylinders arranged in the two-by-two grid of alternating right and left handed cylinders are activated according to a sixth activation pattern, according to an exemplary embodiment.
Figure 15G:
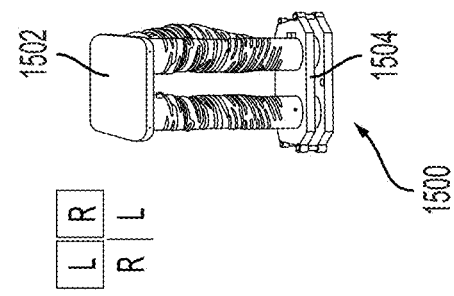
FIG. 15G illustrates the linear actuator of FIG. 15A, in which the four parallel cylinders arranged in the two-by-two grid of alternating right and left handed cylinders are activated according to a seventh activation pattern, according to an exemplary embodiment.
Figure 15H:
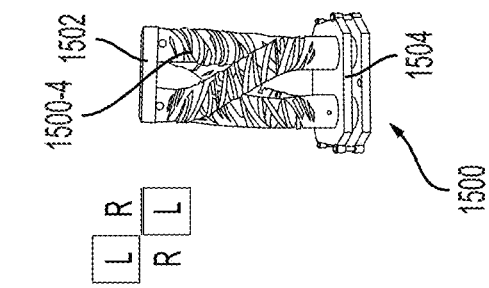
FIG. 15H illustrates the linear actuator of FIG. 15A, in which the four parallel cylinders arranged in the two-by-two grid of alternating right and left handed cylinders are activated according to an eight activation pattern, according to an exemplary embodiment.
Figure 15I:
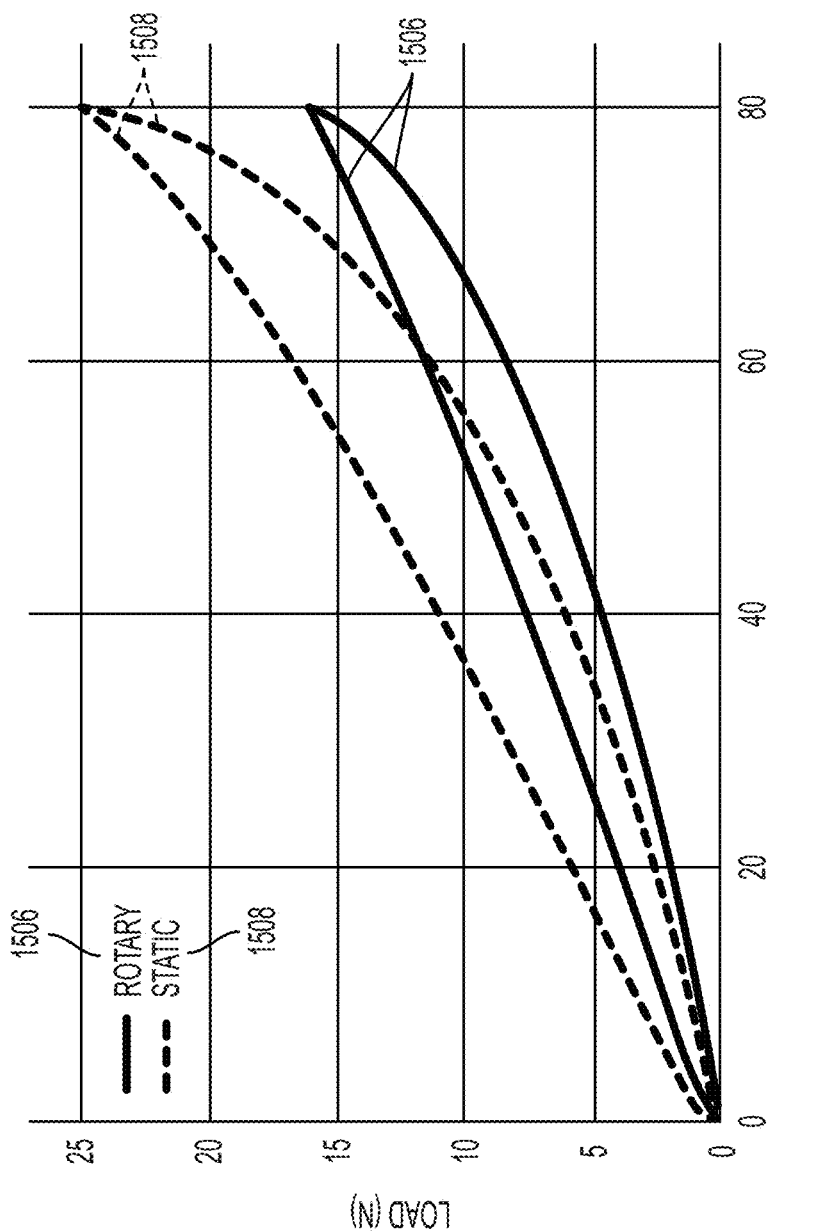
FIG. 15I illustrates cyclic loading of a single handed shearing auxetic cylinder with and without allowing rotation at the ends, according to an exemplary embodiment.

As described above, two sets of handed shearing auxetic cylinder pairs can be provided together to provide a two degree of freedom actuator, e.g., similar to the structure shown in FIGS. 15A-15H. Actuating one pair of cylinders can cause one pair of cylinders to bend towards the other. Actuating both pairs of cylinders can cause it to extend. Moreover, by alternating left and right-handed shearing auxetic cylinders in a 2×2 grid and actuating each cylinder independently, a four degree of freedom actuator can be provided, e.g., as shown in FIGS. 15A-15H. As each side of the 2×2 grid activates, the structure bends away from the activated side, e.g., as shown in FIGS. 15B, 15C, 15F, and 15G. Simultaneously activating both right or both left handed cylinders can generate a net torque on the far end of the structure, causing it to twist, e.g., as shown in FIGS. 15D and 15H. Further, simultaneously activating all cylinders can cause linear expansion without bending or twisting, e.g., as shown in FIG. 15E.

In some embodiments, when a handed shearing auxetic is held at a specific position by a motor, it can act as an elastic element, allowing additional loading to deform the structure. By controlling the rotation of the handed shearing auxetic cylinders' ends, the effective stiffness of the handed shearing auxetic cylinder can be controlled. In some embodiments, the four degree of freedom platform can extend further than any individual cylinder and the surrounding handed shearing auxetic cylinders can help support and prevent buckling, allowing for overstraining of the material.

Figure 25E:
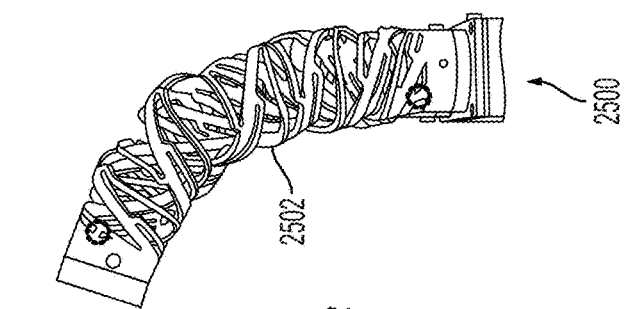
FIG. 25E illustrates a side view of the actuator in a second configuration shown in FIG. 26C.
Figure 25D:
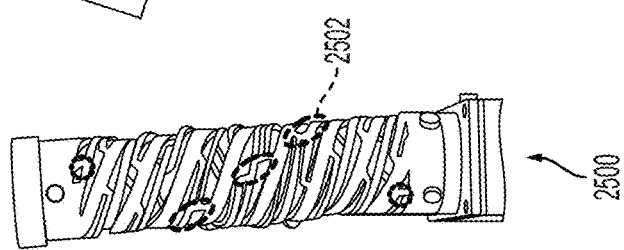
FIG. 25D illustrates a side view of the actuator in a first configuration shown in FIG. 26B.
Figure 25C:
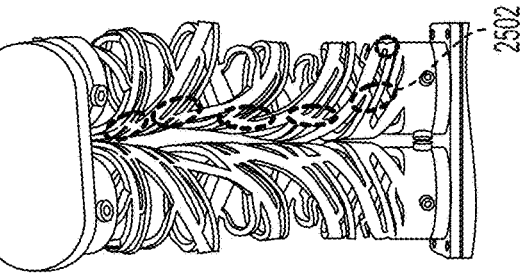
FIG. 25C illustrates a front view of an actuator in a second configuration that includes a handed shearing auxetic cylinder having the strain-limiting feature of FIG. 26A, according to an exemplary embodiment.
Figure 25B:
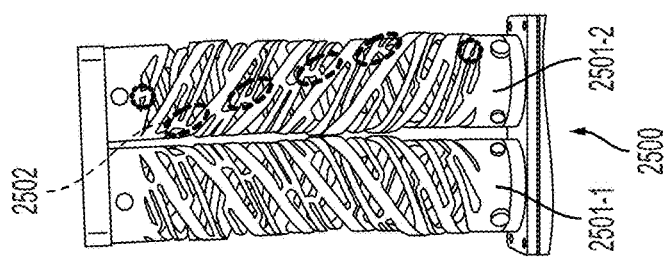
FIG. 25B illustrates a front view of an actuator in a first configuration that includes a handed shearing auxetic cylinder having the strain-limiting feature of FIG. 26A, according to an exemplary embodiment.
Figure 25A:
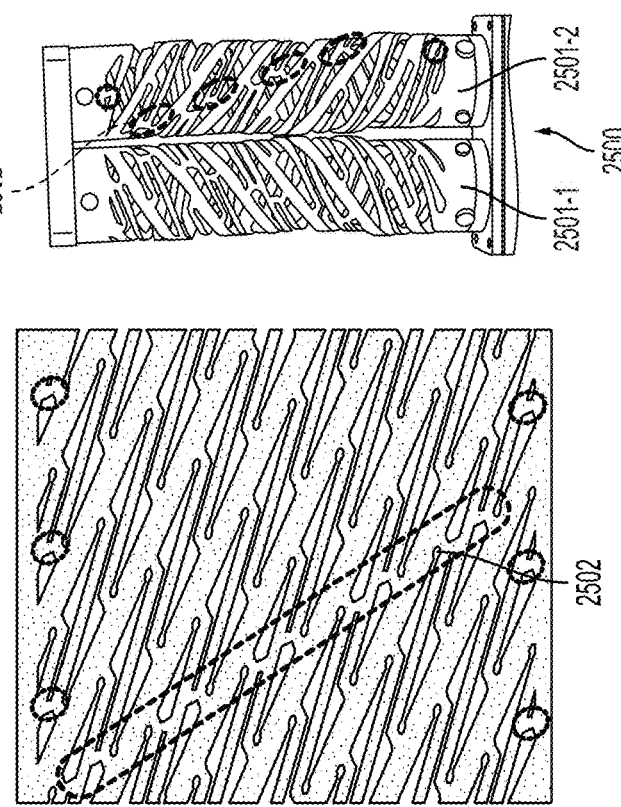
FIG. 25A illustrates a strain-limiting feature formed in a pattern of a handed shearing auxetic cylinder, according to an exemplary embodiment.

Adding further constraints to handed shearing auxetic cylinders can cause a pair of handed shearing auxetic cylinders to convert extension into non-linear movement, such as a bending movement, which can be desirable in, for example, a compliant gripper. To create internal constraints that can convert extension into bending or other non-linear movement, a connecting line or strain-limiting connection 2502 can be added through an HSA cylinder to bond neighboring handed shearing auxetic unit cells, as shown in FIG. 25A. The line can be parallel to the diagonal of the handed shearing auxetic unit cell and can be staggered to avoid constraining the living hinge joints needed for the auxetic pattern to function. These constraints can be mirrored between the left and right handed shearing auxetic cylinders 2501-1, 2501-2 of an actuator, such as the actuator 2500 of FIGS. 25B-25E. As the cylinders 2501-1, 2501-2 rotate, the constrained handed shearing auxetic pair can bend and the constraint 2502 can rotate to become the inner radius of the curved pair. These constraints can be formed in the auxetic tiling pattern itself without the need to introduce a separate layer containing such constraints, etc. Indeed, conventional approaches utilizing such strain-limiting layers that can be, e.g., bonded to other actuators, can be incompatible with HSA cylinders due to, e.g., the required counter-rotation of the paired cylinders.

Figure 26:
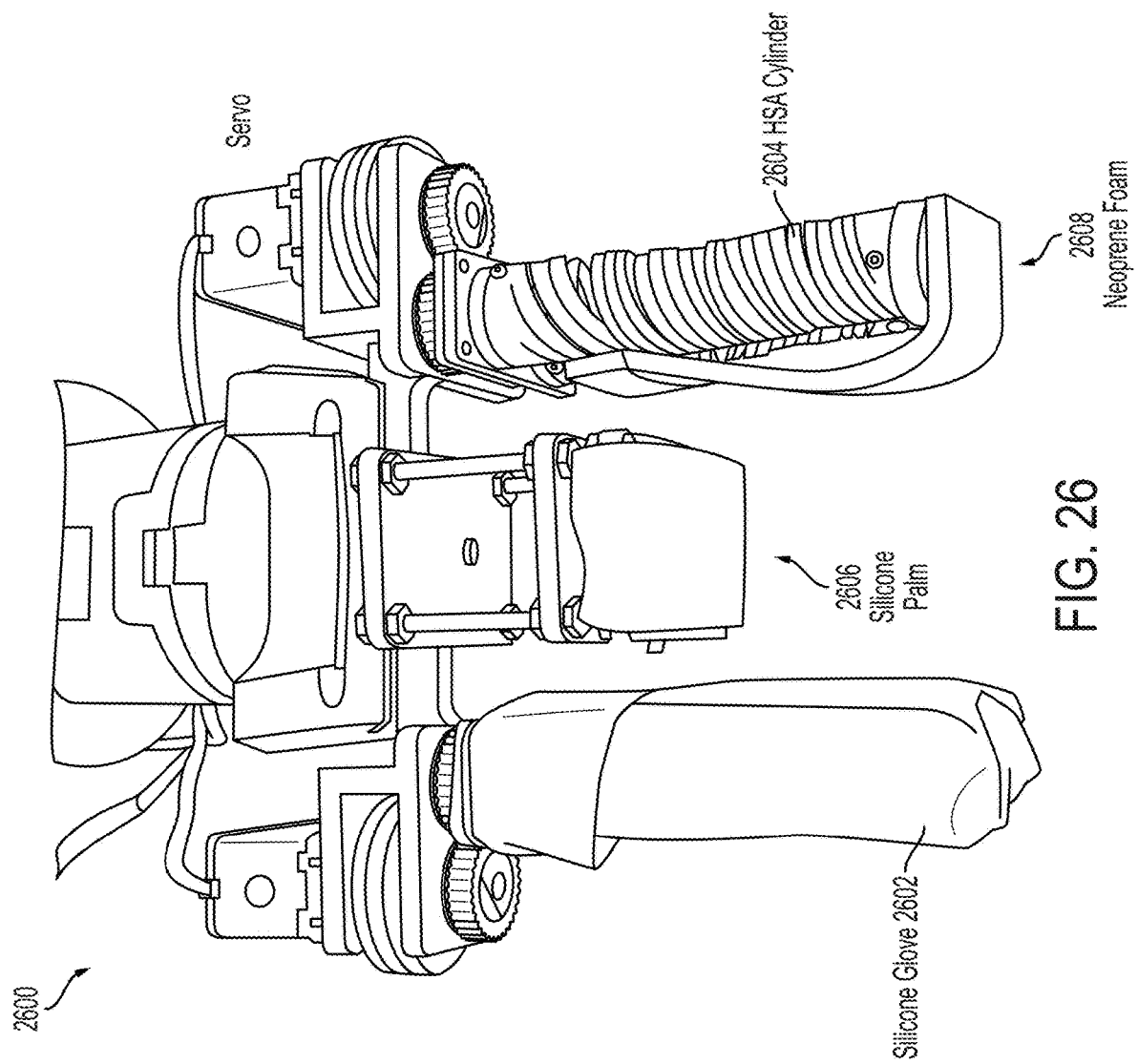
FIG. 26 illustrates the electrically-driven handed shearing auxetic actuator setup of FIG. 24 in greater detail.

Such constrained handed shearing auxetic pairs can be used, for example, as fingers for a soft robotic hand, as shown in FIGS. 24 and 26. For example, by mounting two constrained handed shearing auxetic pairs 2602, 2604 opposite one another, a compliant two finger handed shearing auxetic hand 2600 can be created. In some embodiments, a silicone-covered palm 2606 can be added to the hand, allowing the gripper to more closely resemble existing pneumatic grippers and to grasp with three or more points of contact. In some embodiments, each finger 2602, 2604 can be wrapped in a sheet of silicone or the like, to form a glove, as shown by the finger 2602 in FIG. 26. In some embodiments, such a glove can be secured at a locked end of the handed shearing auxetic pair by a friction fit against a plastic cap, and on the actuation or rotating end the glove can be secured to a plate disposed between gears and the handed shearing auxetic cylinders using, for example, a rubber band or other compression mechanism. The silicone glove can expand as the handed shearing auxetic bends but does not slide off the ends. Moreover, in some embodiments, a strip of neoprene 2608 or other padding material can be inserted between the handed shearing auxetic cylinders and any glove formed from silicone or other material to increase conformation of the finger to an object being grasped, as shown by finger 2604 in FIG. 26.

Table 3 below illustrates comparison data for one embodiment of a robotic system as shown in FIG. 26 that is formed using electrically actuated handed shearing auxetic actuator grippers described herein (Electric HSA) versus a conventional pneumatically actuated soft grippers, as shown by the pneumatic setup 2402 of FIG. 24:

TABLE 3

| | Pneumatic | Electric HSA |
|---|---|---|
| Mechanical Properties | | |
| Unactuated Finger Dimensions | 120 mm × 27 mm × 20 mm | 130 mm × 30 mm × 67 mm |
| Finger Weight | 71.0 g | 59.4 g |
| Actuator Dimensions | 370 mm × 95 mm × 110 mm | 50 mm × 28 mm × 58 mm |
| Actuator Weight | 1160 g | 105.8 g |
| Radius of Finger at Maximum Curvature | 35 mm | 75 mm |

TABLE 3-continued

|  | Pneumatic | Electric HSA |
| --- | --- | --- |
| Approximate Fabrication Time | 5.5 hr (silicone casting) | 1.5 hr (laser cutting) |
| Puncture Resistance | Low | High |
| Grasping Tests | | |
| Grasp Success Rate - Total | 72% | 72% |
| Grasp Success Rate - Regular Geometry | 84% | 80% |
| Grasp Success Rate - Irregular Geometry | 54% | 62% |
| Gripper Power Consumption | | |
| Peak Power Usage | 4.81 A @ 12 V | 1.08 A @ 5 V |
| Energy Required to Close Gripper | 107.4 J ± 1.04 J | 4.92 ± 0.23 J |
| Time to Close Gripper | 2.90 ± 0.05 s | 1.48 ± 0.05 s |
| Power Required to Maintain Closed State | 1.21 ± 0.0023 W | 5.32 ± 0.04 W |
| Energy Required to Open Gripper | 93.5 ± 6.12 J | 4.67 ± 0.22 J |
| Time to Open Gripper | 2.82 ± 0.02 s | 1.42 ± 0.04 s |

Of note in this exemplary comparison is that although the HSA and pneumatic fingers were about the same size and had similar contact surface areas, the actuator system for the pneumatic hand is significantly larger and bulkier, a direct consequence of the need to translate electrical signals to airflow through large pressures. Further, fabrication time for the pneumatic gripper is estimated to be much greater than for the HAS gripper: likely about 5 hours vs. about 1.5 hours. The HSA gripper also exhibits greater resilience to punctures, with the pneumatic gripper experiencing immediate pressure and performance loss if an internal bladder is ruptured. Finally, the HSA gripper was significantly faster and more power efficient than the pneumatic system, opening and closing in about half the time as the pneumatic gripper and requiring nearly 20 times less energy. The HSA gripper did require more power to remain closed than the pneumatic gripper, but this could be mitigated by using a mechanism to maintain a closed state without requiring further energy expenditure, such as a worm drive or other mechanism.

One skilled in the art will appreciate further features and advantages of the disclosure based on the above-described embodiments. Accordingly, the disclosure is not to be limited by what has been particularly shown and described, except as indicated by the appended claims.

What is claimed is:

1. A non-planar shearing auxetic structure, comprising:
a surface that is mathematically compact in at least one direction, the surface including a plurality of repeating unit cells arranged according to an auxetic pattern;
wherein each unit cell is defined by a plurality of elements and by an internal angle between two of the plurality of elements that are connected together by a pivot joint;
wherein the plurality of unit cells are connected to one another by pivot joints;
wherein the shearing auxetic structure has a first contracted configuration and a second expanded configuration;
wherein the shearing auxetic structure, when in the first compact configuration, is configured to move to the second expanded configuration while generating a net shear on the surface.

2. The shearing auxetic structure of claim 1, wherein the auxetic structure is formed from a continuous material and the pivot joints connecting the plurality of elements are living hinges.

3. The shearing auxetic structure of claim 1, wherein the plurality of elements are discrete components connected together by a mechanical pivot joint.

4. The shearing auxetic structure of claim 1, wherein the surface has a shape of any of a cylinder, a sphere, a spheroid, a capsule, and combinations thereof.

5. The shearing auxetic structure of claim 1, wherein the auxetic structure has a handedness such that it is biased to move to the second expanded configuration only when net shearing to one of the right or the left.

6. The shearing auxetic structure of claim 5,
wherein the shape is any of a sphere and a spheroid;
wherein the auxetic pattern is unhanded; and
wherein at least one of the plurality of elements constrains the shearing auxetic structure to any of a marginally-stable and a bi-stable configuration.

7. The shearing auxetic structure of claim 6, wherein the at least one of the plurality of elements that constrains the shearing auxetic structure moves off the surface as the structure moves between the first and second configurations.

8. The shearing auxetic structure of claim 5, wherein the auxetic pattern is handed and imparts the handedness on the shearing auxetic structure.

9. The shearing auxetic structure of claim 5, wherein the auxetic pattern is unhanded and aligned over the surface in a manner that imparts the handedness on the shearing auxetic structure.

10. The shearing auxetic structure of claim 5, wherein the auxetic pattern is unhanded and one of the plurality of elements limits movement to impart the handedness on the shearing auxetic structure.

11. The shearing auxetic structure of claim 1, wherein the structure is biased to the first compact configuration or the second expanded configuration.

12. The shearing auxetic structure of claim 1, wherein each of the plurality of unit cells has a polygon shape.

13. The shearing auxetic structure of claim 1, wherein the plurality of elements are formed of a material that can flex perpendicular to the surface of the structure as the structure expands or contracts, but does not extend in length.

14. The shearing auxetic structure of claim 1, further comprising a lining coupled to any of the plurality of elements and pivot joints.

15. The shearing auxetic structure of claim 14, wherein the lining is disposed on an exterior side of the plurality of elements and pivot joints.

16. The shearing auxetic structure of claim 14, wherein the lining is disposed on an interior side of the plurality of elements and pivot joints.

17. The shearing auxetic structure of claim 14, wherein the lining is elastic.

18. The shearing auxetic structure of claim 1, further comprising a second shearing auxetic structure having a same handedness as the shearing auxetic structure.

19. A composite structure, comprising:
a plurality of differently-handed shearing auxetic structures that each form a non-planar shape, each shearing auxetic structure including:
a plurality of handed tiles repeating over a surface of the respective non-planar shape;
the plurality of handed tiles each including a plurality of elements connected together with a pivot joint; and
the plurality of handed tiles being connected to one another by pivot joints;
wherein the plurality of differently-handed shearing auxetic structures lock against one another to form a semi-rigid or rigid structure.

20. The composite structure of claim 19, wherein the plurality of differently-handed shearing auxetic structures includes two structures that form a semi-rigid structure that is self-supporting and compliant.

21. The composite structure of claim 19,
wherein the plurality of differently-handed shearing auxetic structures includes three concentrically-disposed structures; and
wherein the middle structure has a different handedness from the other two structures.

22. The composite structure of claim 19, wherein the plurality of differently-handed shearing auxetic structures are disposed adjacent to one another.

23. The composite structure of claim 19, wherein the plurality of differently-handed shearing auxetic structures are concentrically disposed relative to one another.

24. The composite structure of claim 23, wherein a handedness of each of the plurality of differently-handed shearing auxetic structures along a concentric sequence is different, such that the handedness of adjacent handed shearing auxetic structures is the opposite of one another.

25. The composite structure of claim 19, wherein the plurality of differently-handed shearing auxetic structures are each formed from a continuous material and the pivot joints connecting the plurality of elements are living hinges.

26. The composite structure of claim 19, wherein the plurality of elements are discrete components connected together by a mechanical pivot joint.

27. The composite structure of claim 19, wherein the non-planar shape is any of a cylinder, a sphere, a spheroid, a capsule, and combinations thereof.

28. The composite structure of claim 19, further comprising a lining coupled to at least one of the plurality of shearing auxetic structures.

29. The composite structure of claim 28, wherein the lining is disposed around the plurality of shearing auxetic structures.

30. The composite structure of claim 28, wherein the lining is disposed within the plurality of shearing auxetic structures.

31. The composite structure of claim 28, wherein the lining is disposed between two of the plurality of shearing auxetic structures.

32. The composite structure of claim 28, wherein the lining is elastic.

33. An actuator, comprising:
at least one pair of shearing auxetic structures, wherein each pair includes at least one structure that shears toward the left and one structure that shears toward the right; and
at least one rotary driver coupled to first ends of each structure in the at least one pair of shearing auxetic structures;
wherein second ends of each structure in the at least one pair of shearing auxetic structures are rigidly coupled to one another; and
wherein the at least one rotary driver transfers opposing torques onto each structure in the at least one pair of shearing auxetic structures.

34. The actuator of claim 33,
wherein the at least one rotary driver comprises a plurality of rotary drivers; and
wherein each rotary driver is coupled to one shearing auxetic structure.

35. The actuator of claim 33, further comprising at least one gear coupling the at least one rotary driver to both structures in the at least one pair of shearing auxetic structures.

36. The actuator of claim 33, wherein the shearing auxetic structures are cylinders.

37. The actuator of claim 33, wherein the rotary driver is an electric motor.

38. The actuator of claim 33, wherein the shearing auxetic structures are formed from a compliant material.

39. The actuator of claim 33, wherein each shearing auxetic structure includes a strain-limiting connection extending through a surface thereof that is configured to limit expansion of the structure in at least one dimension.

40. The actuator of claim 39, wherein strain-limiting connection causes non-linear movement of the structure during expansion.

41. The actuator of claim 40, wherein the non-linear movement is bending.

42. An actuator, comprising:
a plurality of pairs of differently-handed shearing auxetic structures; and
a plurality of rotary drivers configured to apply torque to at least one of the shearing auxetic structures;
wherein first ends of each shearing auxetic structure in the plurality of pairs are rigidly coupled to one another.

43. The actuator of claim 42, wherein the shearing auxetic structures are cylinders.

44. The actuator of claim 42, wherein the rotary driver is an electric motor.

45. The actuator of claim 42, wherein the shearing auxetic structures are formed from a compliant material.

46. The actuator of claim 42, wherein the plurality of pairs includes two pairs arranged such that the shearing auxetic structures of each pair form a 2×2 grid of shearing auxetic structures with alternating handedness.

47. The actuator of claim 42, wherein the actuator is capable of 2 degrees of freedom in movement.

48. The actuator of claim 42, wherein the actuator is capable of 4 degrees of freedom in movement.

49. A robotic system, comprising:
a gripper including a plurality of shearing auxetic structures that bend as they expand; and
a rotary driver coupled to at least one shearing auxetic structure.

50. The system of claim 49, wherein each of the plurality of shearing auxetic structures that bend as they expand comprise a pair of differently-handed shearing auxetic structures having first ends thereof rigidly coupled to one another.

51. The system of claim 50, wherein the rotary driver is configured to simultaneously apply opposing torques to second ends of the pair of differently-handed shearing auxetic structures.

52. The system of claim 49, wherein the plurality of shearing auxetic structures are disposed opposite one another to facilitate grasping an object there between.

53. The system of claim 49, further comprising any of a pad and a cover disposed over an outer surface of one or more of the plurality of shearing auxetic structures.

\* \* \* \* \*